United States Patent
Gardner et al.

(10) Patent No.: US 10,963,802 B1
(45) Date of Patent: Mar. 30, 2021

(54) DISTRIBUTED DECISION VARIABLE TUNING SYSTEM FOR MACHINE LEARNING

(71) Applicant: SAS Institute Inc., Cary, NC (US)

(72) Inventors: Steven Joseph Gardner, Cary, NC (US); Joshua David Griffin, Harrisburg, NC (US); Yan Xu, Cary, NC (US); Yan Gao, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/120,340

(22) Filed: Dec. 14, 2020

Related U.S. Application Data

(60) Provisional application No. 62/950,489, filed on Dec. 19, 2019.

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
USPC .......................................................... 706/12
See application file for complete search history.

(56) References Cited

U.S. PATENT DOCUMENTS

| | | | |
|---|---|---|---|
| 9,524,471 B2 * | 12/2016 | Narisetty | G06N 20/00 |
| 9,684,538 B1 * | 6/2017 | Liu | G06F 17/16 |
| 10,049,302 B1 * | 8/2018 | Liu | G06N 20/10 |
| 10,360,517 B2 * | 7/2019 | Koch | G06N 3/126 |
| 10,769,528 B1 * | 9/2020 | Wang | G06N 3/084 |
| 10,776,721 B1 * | 9/2020 | Shi | G06N 3/04 |
| 2017/0132528 A1 | 5/2017 | Aslan | |

OTHER PUBLICATIONS

R. Polyak. Modied barrier functions (theory and methods). Math. Programming, 54(2, Ser. A):177-222, 1992.

P. Armand and R. Omheni. A globally and quadratically convergent primal-dual augmented lagrangian algorithm for equality constrained optimization. Optimization Methods and Software, 32(1):1{21, 2017.

(Continued)

*Primary Examiner* — Michael B Holmes
(74) *Attorney, Agent, or Firm* — Bell & Manning, LLC

(57) ABSTRACT

A computing device selects decision variable values. A lower boundary value and an upper boundary value is defined for a decision variable. (A) A plurality of decision variable configurations is determined using a search method. The value for the decision variable is between the lower boundary value and the upper boundary value. (B) A decision variable configuration is selected. (C) A model of the model type is trained using the decision variable configuration. (D) The model is scored to compute an objective function value. (E) The computed objective function value and the selected decision variable configuration are stored. (F) (B) through (E) is repeated for a plurality of decision variable configurations. (G) The lower boundary value and the upper boundary value are updated using the objective function value and the decision variable configuration stored. Repeat (A)-(F) with the lower boundary value and the upper boundary value updated in (G).

30 Claims, 21 Drawing Sheets

(56) References Cited

OTHER PUBLICATIONS

P. Armand and R. Omheni. A mixed logarithmic barrier-augmented lagrangian method for nonlinear optimization. J. Optim. Theory Appl., 173(2):523{547, May 2017.
P. Armand, J. Benoist, R. Omheni, and Vincent Pateloup. Study of a primal-dual algorithm for equality constrained minimization. Computational Optimization and Applications, 59(3):405{433, 2014.
A. Ben-Tal and M. Zibulevsky. Penalty/barrier multiplier methods for convex programming problems. SIAM Journal on Optimization, 7(2):347{366, 1997.
M. G. Breitfeld and D. F. Shanno. Computational experience with penalty-barrier methods for nonlinear programming. Ann. Oper. Res., 62:439{463, 1996. Interior point methods in mathematical programming.
S. G. Nash, R. Polyak, and A. Sofer. A numerical comparison of barrier and modified barrier methods for large-scale bound-constrained optimization. In Large scale optimization (Gainesville, FL, 1993), pp. 319-338. Kluwer Acad. Publ., Dordrecht, 1994.
R. Silva, J. Soares, and L. N. Vicente. Local analysis of the feasible primal-dual interior-point method. Comput. Optim. Appl., 40(1):41{57, 2008.
A. R. Conn, Nick Gould, and Ph. L. Toint. A globally convergent lagrangian barrier algorithm for optimization with general inequality constraints and simple bounds. Math. of Computation, 66:261{288, 1992.
A. Wachter and L. T. Biegler. On the implementation of an interior-point filter linesearch algorithm for large-scale nonlinear programming. Math. Program., 106(1, Ser. A):25{57, 2006.
Chapter 4 of a book by Golub, G. H., and C. F. Van Loan, Matric Computations, 3rd ed. (Johns Hopkins University Press 1996).
G. Breitfeld and D. F. Shanno. Preliminary Computational experience with modified log-barrier Functions for Large-scale Nonlinear Programming, Rutcor Research Report, Jul. 1993.
Byrd et al., "A trust region method based on interior point techniques for nonlinear programming," Math. Program., Ser. A 89: 149-185 (2000).
Dolan et al., "Benchmarking optimization software with performance profiles," Math. Program., Ser. A 91:201-213 (2002).
Goldfarb et al., "A Modified Barrier-Augmented Lagrangian Method for Constrained Minimization," Computational Optimization and Applications 14, 55-74 (1999).
Griffin et al, "A primal-dual modified log-barrier method for inequality constrained nonlinear optimization," Optimization Letters, published Mar. 10, 2020.
W. Murray, "Analytical Expressions for the Eigenvalues ane Eigenvectors of the Hessian Matrices of Barrier and Penalty Functions," Journal of Optimization Theory and Applications: vol. 7, No. 3, 1971.
Shanno et al., "Interior-point methods for nonconvex nonlinear programming: orderings and higher-order methods," Math. Progam., Ser. B 87:303-316 (2000).
Backtracking line search, Wikipedia, retrieved from https://en.widipedia.org/w/index.php?title=Backtracking_line_search&oldid=960063023, last edited on May 31, 2020.

SAS/OR 15.1 User's Guide Mathematical Programming The Optmodel, SAS Institute Inc, 2018.
Griffin et al., "An Efficient Primal-Dual Modified Barrier Method for Nonlinear Optimization with Inequality Constraints," SAS Institute, Mar. 26, 2020.
Gardner et al., Constrained Multi-Objective Optimization for Automated Machine Learning, arXiv:1908.04909, Aug. 2019, 10 pages.
Wikipedia, Cholesky decomposition, retrieved from http://en.wikipedia.org/index/php?title=Cholesky_decomposition&oldid=958717026, last edited May 25, 2020.
Wikipedia, Error function, https://en.wikipedia.org/wiki/Error_function, last edited May 26, 2020.
Christopher K.I. Williams, "Bayesian Classification With Gaussian Processes," IEEE Transactions on Pattern Analysis and Machine Intelligence3, vol. 20, No. 12, Dec. 1998, pp. 1342-1351.
Yiangjian Wang, "Guassian Process Classification," Power Point Presented at SAS Institute Inc. Aug. 2, 2019.
Gardner et al., Parallel Hybrid Multiobjective Derivate-Free Optimization for Machine Learning, SAS Power Point Presentation, Sas Institute, Inc., 2018.
Wikipedia, Lemmatisation, retrieved from https://en.wikipedia.org/w/index.php?title=lemmatisation&oldid=948344582, last edited on Mar. 31, 2020.
Wikipedia, Pareto Front, retrieved from https://en.widipedia.org/w/index.php?title=Pareto_efficiency&oldid=950769447, last edited on Apr. 13, 2020.
Wikipedia, Logit, retrieved from https://en.wikipedia.org/w/index.pho?title=Logit&oldid=966729139, last edited Jul. 8, 2020.
Wikipedia, Probit, retrieved from https://en.widipedia.org/w/index.php?title=Probit&oldid=956140558, last edited May 11, 2020.
Rasmussen and Williams, "Gaussian Processes for Machine Learning" Chapter 3, Classification, the MIT Press, 2006.
Josh Griffin, "Constrained Multiobjective Derivate-Free Optimization for Machine Learning," 2019 SIAM Computational Science and Engineering Conference talk on Feb. 25, 2019.
Wikipedia, Sigmoid Function, retrieved from https://en.wikipedia.org/w/index.pho?title=Sigmond_function&oldid=963563127, last edited Jun. 20, 2020.
1.7 Gaussian Processes, 2007-2019, scikit-learn developers.
J. D. Griffin, T. G. Kolda, and R. M. Lewis, "Asynchronous parallel generating set search for linearly constrained optimization," SIAM Journal on Scientific Computing, vol. 30, pp. 1892-1924, 2008.
J. D. Griffin and T. G. Kolda, "Nonlinearly constrained optimization using heuristic penalty methods and asynchronous parallel generating set search," Applied Mathematics Research Express, vol. 2010, pp. 36-62, 2010.
O. Schutze, X. Esquivel, A. Lara, and C. A. Coello Coello, "Using the averaged hausdorff distance as a performance measure in evolutionary multiobjective optimization," IEEE Transactions on Evolutionary Computation, vol. 16, pp. 504-522, 2012.
Gardner et al., Hyperbound: a step towards automating machine learning's "auto-tuning" algorithms, *Optimization Methods & Software*, Dec. 2019.
Raschka, "Model evaluation, model selection, and algorithm selection in machine learning Part III—Cross validation and hyperparameter tuning", 2016, 24 pages, https://sebastianraschka.com/blog/2016/model-evaluation-selection-part3.html.

* cited by examiner

DISTRIBUTED DECISION VARIABLE TUNING SYSTEM FOR MACHINE LEARNING

CROSS-REFERENCE TO RELATED APPLICATIONS

The present application claims the benefit of 35 U.S.C. § 119(e) to U.S. Provisional Patent Application No. 62/950,489 filed Dec. 19, 2019, the entire contents of which are hereby incorporated by reference.

BACKGROUND

Facilitating effective decision making often requires the transformation of relevant data to high-quality models whether they are machine learning models or constrained optimization models. The transformation presents several challenges however. For example, a neural network type model often generates predicted outputs by transforming a set of inputs through a series of hidden layers that are defined by activation functions linked with weights. Determining the activation functions and the weights to determine the best model configuration is a complex optimization problem. The activation functions, number of hidden layers, annealing rate, and learning rate, among other parameters, are referred to herein as "decision variables" that are defined by a user to control determination of a model using various model types such as the neural network model type, a gradient boosting tree model type, a decision tree model type, a forest model type, a support vector machine model type, an optimization model, etc. For example, a chemical process may be optimized to determine parameters (decision variables) such as pressure, temperature, flow velocity, etc. Different decision variables are used based on the type of model. Each decision variable can be any value of a set of possible values that may be continuous or categorical. Though the model solutions are governed by the decision variables, there are typically no clear default values for the decision variables that generate a satisfactory model for a wide range of applications. Not only do the input values defined for the decision variables dictate the performance of the training process, but more importantly they govern the quality of the resulting models.

The approach to finding the ideal values for decision variables (tuning a model type to a particular dataset) has traditionally been a manual effort. For guidance in setting these values, researchers often rely on their past experience with the models to train new models. However, even with expertise in the model type and its associated decision variables, the best values of these decision variables change with different data. As a result, it is difficult to define the decision variable values based on previous experience. However, there is an inherent expense in training numerous candidate models to evaluate various values and combinations of values for the decision variables in terms of computing resources, computing time, and user time.

SUMMARY

In an example embodiment, a non-transitory computer-readable medium is provided having stored thereon computer-readable instructions that when executed by a computing device, cause the computing device to automatically select decision variable values based on objective criteria for training a model. A plurality of tuning evaluation parameters is accessed. The plurality of tuning evaluation parameters include a model type, a search method type, and one or more values to evaluate for each decision variable of a plurality of decision variables associated with the model type. A lower boundary value and an upper boundary value is defined for at least one decision variable of the plurality of decision variables. (A) A plurality of decision variable configurations is determined using a search method of the search method type. A decision variable configuration includes a value for each decision variable of the plurality of decision variables. Each decision variable configuration of the plurality of decision variable configurations is unique. The value for the at least one decision variable of the plurality of decision variables is between the lower boundary value and the upper boundary value. (B) A decision variable configuration is selected from the plurality of decision variable configurations. (C) A model of the model type is trained using the selected decision variable configuration and a training dataset. (D) The trained model is scored to compute an objective function value. The trained model is scored using the selected decision variable configuration and a validation dataset. (E) The computed objective function value and the selected decision variable configuration are stored. (F) (B) through (E) is repeated until each decision variable configuration of the plurality of decision variable configurations is selected in (B). (G) The lower boundary value and the upper boundary value of the at least one decision variable are updated using the objective function value and the decision variable configuration stored for the plurality of decision variable configurations in (E). (H) (A) through (F) is repeated wherein the lower boundary value and the upper boundary value are those updated in (G). A best decision variable configuration is identified based on an extreme value of the stored objective function values. The value for the at least one decision variable of the plurality of decision variables is between the updated lower boundary value and the updated upper boundary value. The identified best decision variable configuration output.

In another example embodiment, a computing device is provided. The computing device includes, but is not limited to, a processor and a non-transitory computer-readable medium operably coupled to the processor. The computer-readable medium has instructions stored thereon that, when executed by the processor, cause the computing device to automatically select decision variable values based on objective criteria for training a model.

In yet another example embodiment, a method of automatically selecting decision variable values based on objective criteria for training a model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

A decision variable selection system 100 described herein provides efficient distributed and parallel computing device implementations for training and tuning the decision variables used by machine learning and optimization models to make decisions. Decision variable selection system 100 overcomes the problems associated with the inherent expense of training numerous candidate models by using binning and/or bounding of the decision variable values each iteration of the tuning process.

Figure 11:
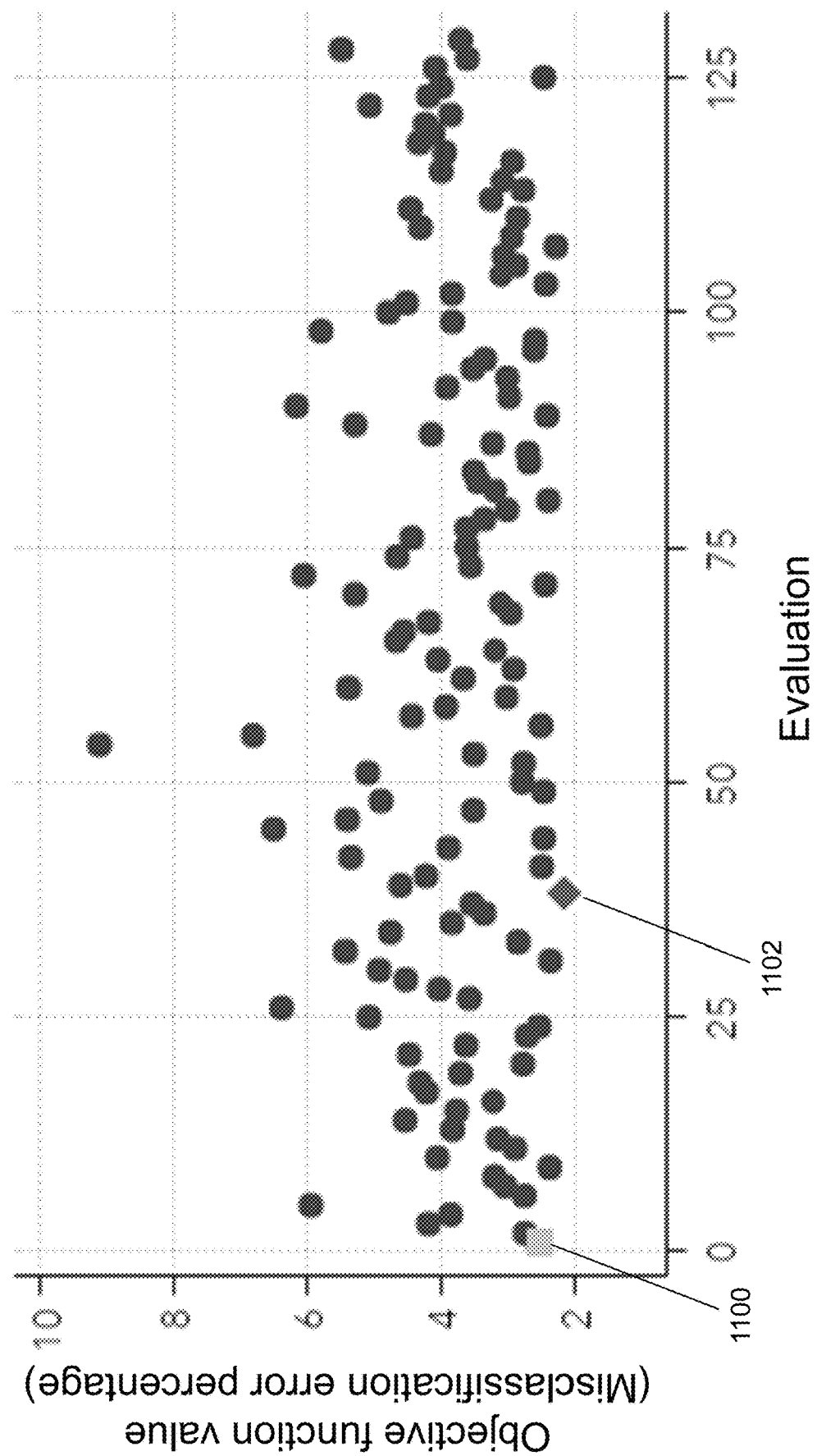
FIG. 11 shows an objective function value computed for a plurality of decision variable configuration evaluations computed by a previous decision variable selection system in accordance with an illustrative embodiment.

Some of the challenges of decision variable tuning can be seen referring to FIG. 11, which shows the error for decision variable configurations evaluated in a first iteration of tuning that used Latin hypercube sampling (LHS) to obtain an initial sample of the space. The majority of the evaluated decision variable configurations produced a validation error larger than that of the default configuration and shown as default value 1100, which is 2.57%. Numerous different decision variable configurations produced very similar error rates. These similar error rates indicate flat regions in the search space, which are difficult for an optimizer or tuner to traverse, and make it difficult for random decision variable configurations to identify an improved model. An improved model was found in the first iteration shown as first iteration value 1102 that had an error of 2.21%. The results presented herein demonstrate improved model accuracies achieved with far fewer tuning iterations.

Figure 1:
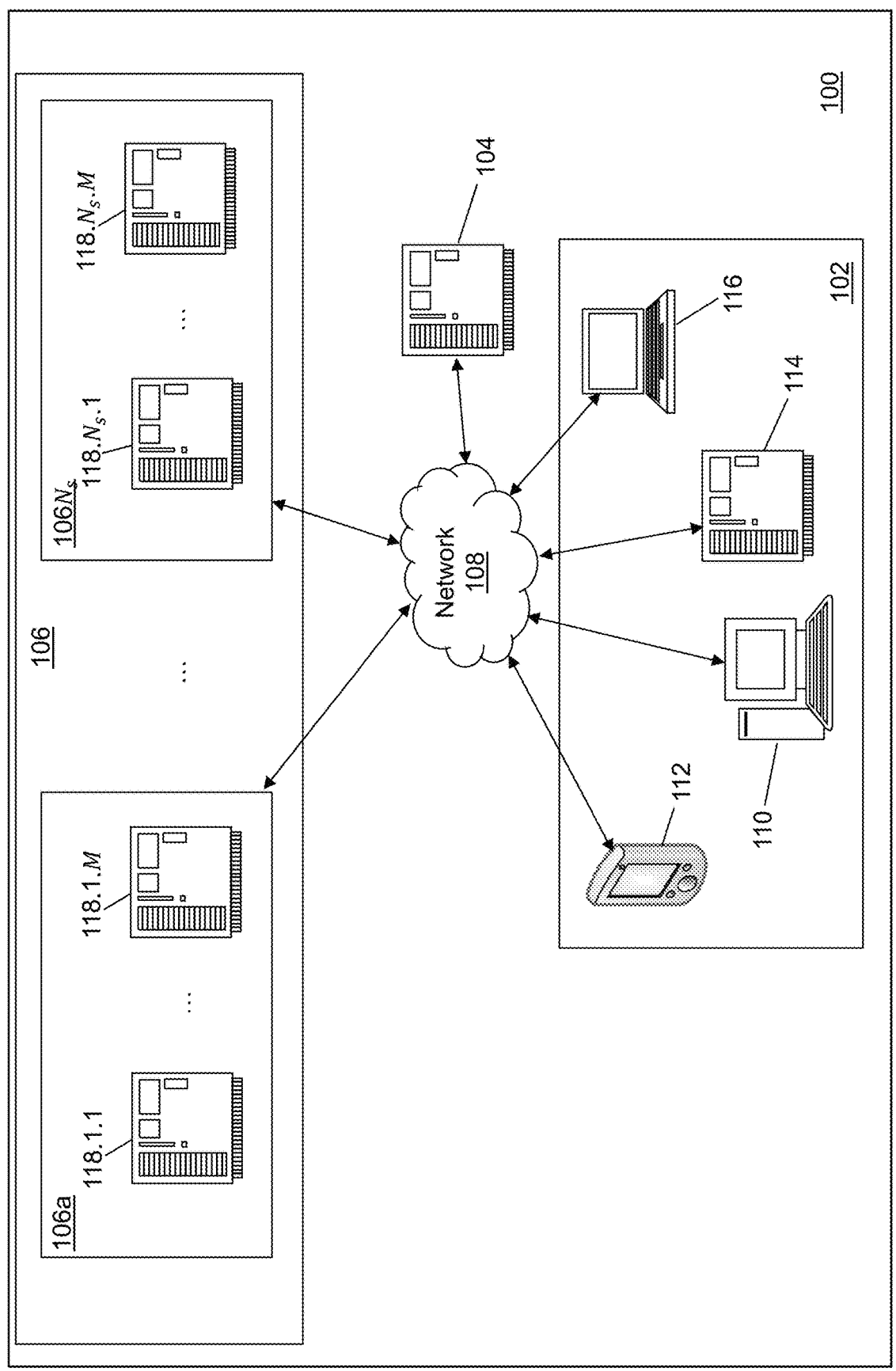
FIG. 1 depicts a block diagram of a decision variable selection system in accordance with an illustrative embodiment.

Referring to FIG. 1, a block diagram of decision variable selection system 100 is shown in accordance with an illustrative embodiment. In an illustrative embodiment, decision variable selection system 100 may include a user system 102, a selection manager device 104, a worker system 106, and a network 108. Each of user system 102, selection manager device 104, and worker system 106 may be composed of one or more discrete computing devices in communication through network 108. Alternatively, user system 102, selection manager device 104, and worker system 106 may be integrated into a single computing device capable of computing using a plurality of different threads.

Network 108 may include one or more networks of the same or different types. Network 108 can be any type of wired and/or wireless public or private network including a cellular network, a local area network, a wide area network such as the Internet or the World Wide Web, etc. Network 108 further may comprise sub-networks and consist of any number of communication devices.

The one or more computing devices of user system 102 may include computing devices of any form factor such as a desktop 110, a smart phone 112, a server computer 114, a laptop 116, a personal digital assistant, an integrated messaging device, a tablet computer, etc. User system 102 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 102 may send and receive signals through network 108 to/from another of the one or more computing devices of user system 102 and/or to/from selection manager device 104. The one or more computing devices of user system 102 may communicate using various transmission media that may be wired and/or wireless as understood by those skilled in the art. The one or more computing devices of user system 102 may be geographically dispersed from each other and/or co-located.

Figure 2:
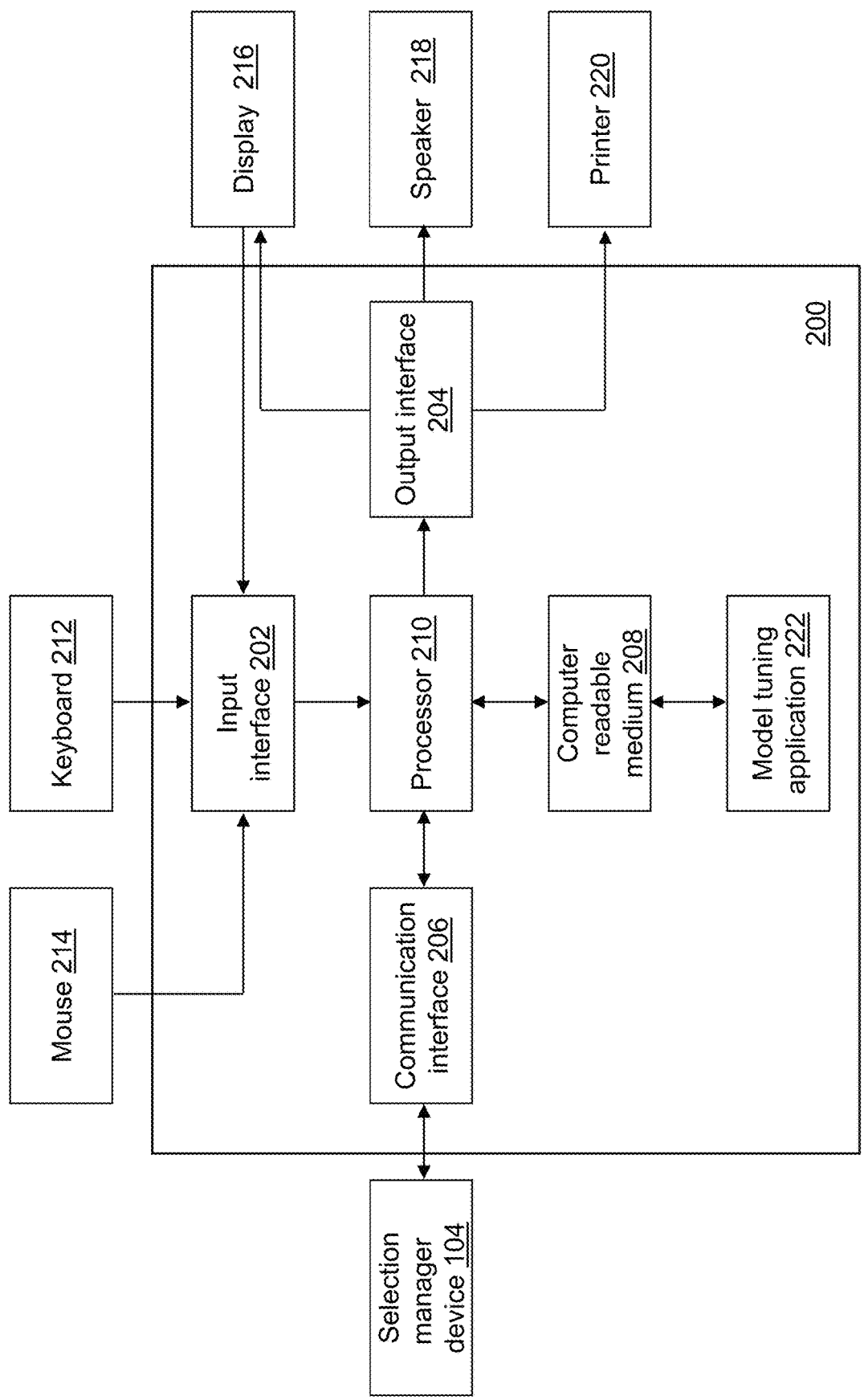
FIG. 2 depicts a block diagram of a user device of the decision variable selection system of FIG. 1 in accordance with an illustrative embodiment.

For illustration, referring to FIG. 2, a block diagram of a user device 200 is shown in accordance with an example embodiment. User device 200 is an example computing device of user system 102. For example, each of desktop 110, smart phone 112, server computer 114, and laptop 116 may be an instance of user device 200. User device 200 may include an input interface 202, an output interface 204, a communication interface 206, a computer-readable medium 208, a processor 210, and a model tuning application 222. Each computing device of user system 102 may be executing model tuning application 222 of the same or different type.

Referring again to FIG. 1, selection manager device 104 can include any form factor of computing device. For illustration, FIG. 1 represents selection manager device 104 as a server computer. Selection manager device 104 may send and receive signals through network 108 to/from user system 102 and/or to/from worker system 106. Selection manager device 104 may communicate using various transmission media that may be wired and/or wireless as understood by those skilled in the art. Selection manager device 104 may be implemented on a plurality of computing devices of the same or different type. Decision variable selection system 100 further may include a plurality of selection manager devices.

Figure 3:
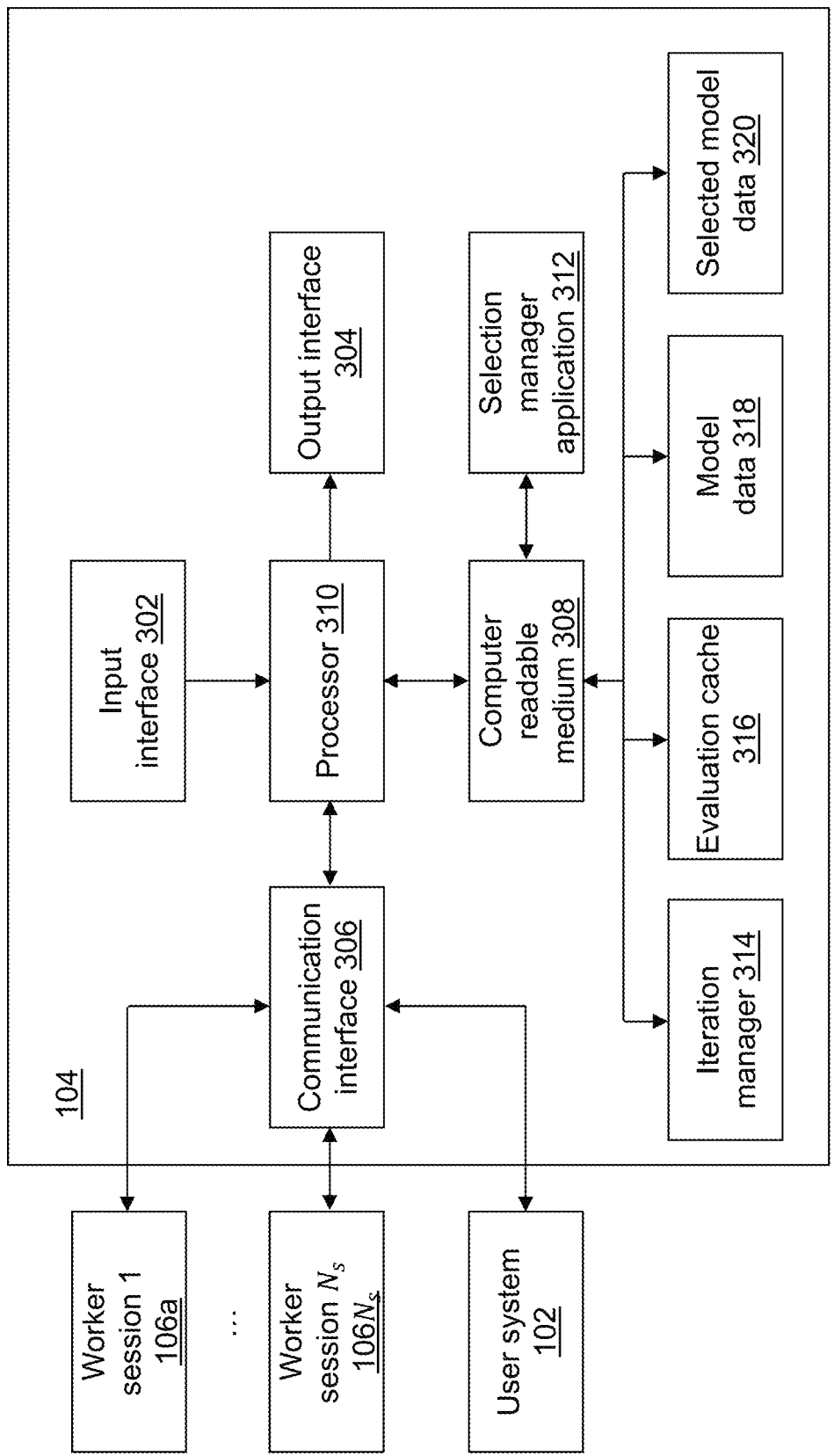
FIG. 3 depicts a block diagram of a selection manager device of the decision variable selection system of FIG. 1 in accordance with an illustrative embodiment.

For illustration, referring to FIG. 3, a block diagram of selection manager device 104 is shown in accordance with an illustrative embodiment. Selection manager device 104 may include a second input interface 302, a second output interface 304, a second communication interface 306, a second computer-readable medium 308, a second processor 310, a selection manager application 312, an iteration manager 314, an evaluation cache 316, model data 318, and selected model data 320. Selection manager device 104 may execute selection manager application 312 that instantiates iteration manager 314. Iteration manager 314 defines a configuration list each iteration. Evaluation cache 316, model data 318, and selected model data 320 are created from results generated by worker system 106.

Referring again to FIG. 1, the one or more computing devices of worker system 106 may include computers of any form factor that may be organized into one or more sessions, where a number of the one or more sessions is indicated by N. Worker system 106 may include a number of computing devices indicated by $N_W$. Worker system 106 may include computers of other form factors such as a desktop or a laptop, etc. Worker system 106 can include any number and any combination of form factors of computing devices organized into any number of sessions. For example, in the illustrative embodiment, worker system 106 includes a first worker session 106a, . . . , and an $N_s$th worker session 106$N_s$. Each session may include one or more computing devices, where a number of session computing devices in each session is indicated by M. In the illustrative embodiment, first worker session 106a may include a first computing device 118.1.1, . . . , and an Mth computing device 118.1.M, and $N_s$th worker session 106n may include a first computing device 118.$N_s$.1, . . . , and an Mth computing device 118.$N_s$.M. The number of computing devices indicated by $N_W$ may or may not also include selection manager device 104. A number of threads may be associated with each computing device of worker system 106.

The computing devices of worker system 106 may send and receive signals through network 108 to/from selection manager device 104 and/or to/from user system 102 and/or to/from another computing device of worker system 106. The one or more computing devices of worker system 106 may be geographically dispersed from each other and/or co-located. The one or more computing devices of worker system 106 may communicate using various transmission media that may be wired and/or wireless as understood by those skilled in the art.

Figure 4A:
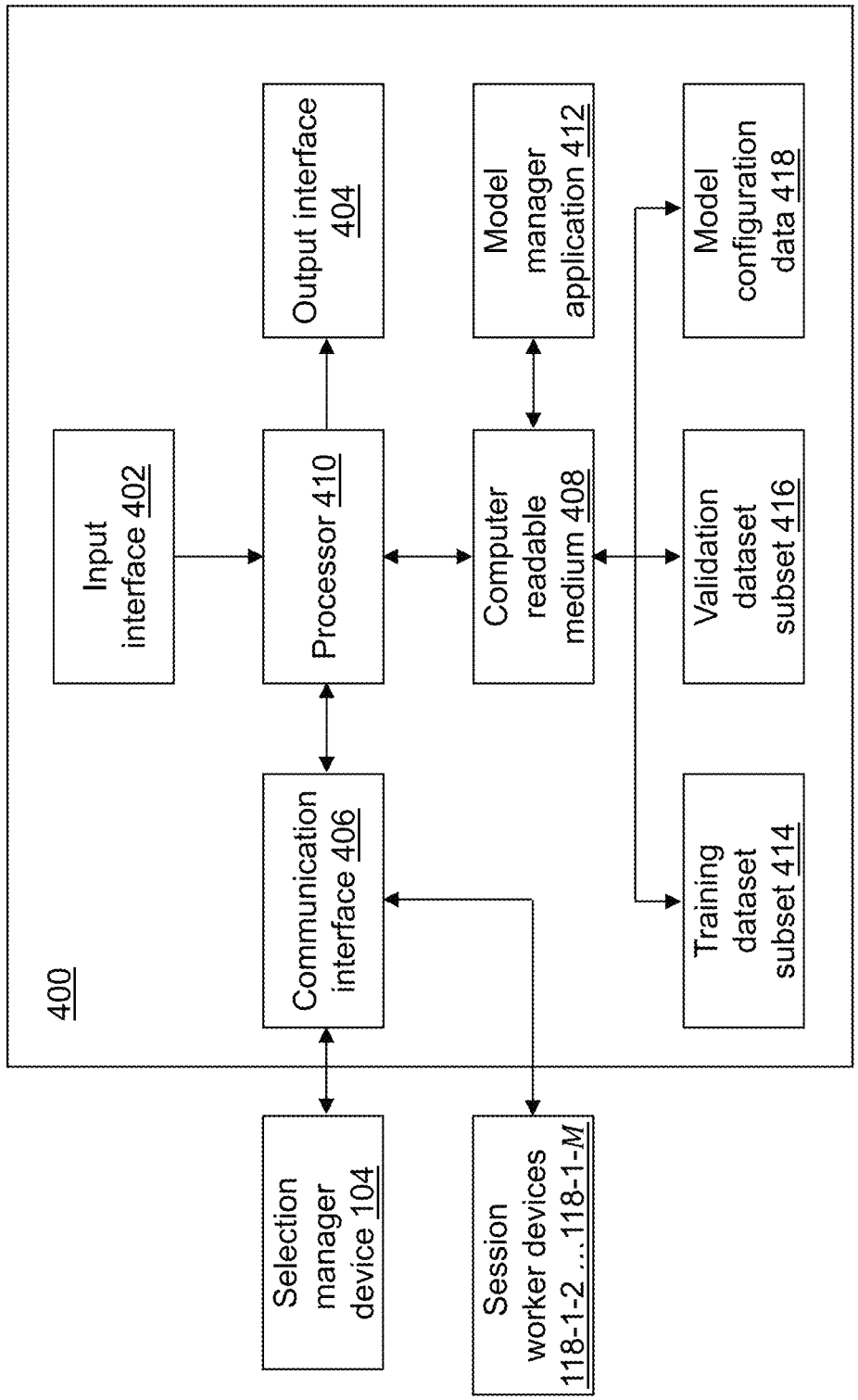
FIG. 4A depicts a block diagram of a session manager device of the decision variable selection system of FIG. 1 in accordance with an illustrative embodiment.

For illustration, referring to FIG. 4A, a block diagram of a session manager device 400 is shown in accordance with an example embodiment. Session manager device 400 is an example computing device of each session of worker system 106. For example, a first computing device of each session, such as first computing device 118.1.1 of first worker session 106a and first computing device 118.$N_s$.1 of $N_s$th worker session 106$N_s$, may be an instance of session manager device 400. Session manager device 400 may include a third input interface 402, a third output interface 404, a third communication interface 406, a third computer-readable medium 408, a third processor 410, a model manager application 412, a training dataset subset 414, a validation dataset subset 416, and model configuration data 418.

Figure 4B:
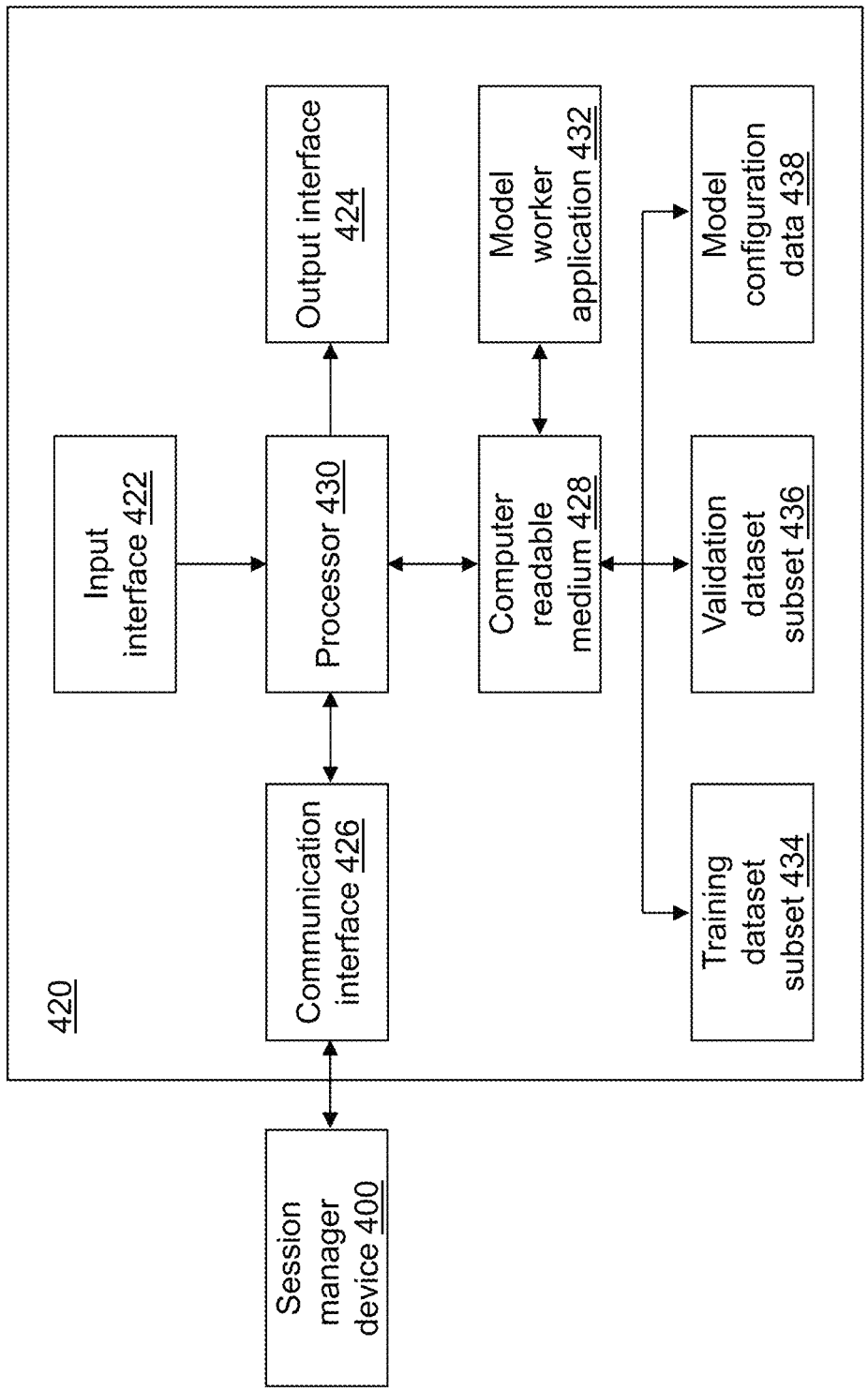
FIG. 4B depicts a block diagram of a session worker device of the decision variable selection system of FIG. 1 in accordance with an illustrative embodiment.

For illustration, referring to FIG. 4B, a block diagram of a session worker device 420 is shown in accordance with an example embodiment. Session worker device 420 is an example worker computing device of each session of worker system 106. For example, remaining computing devices of each session, such as . . . , and Mth computing device 118.1.M of first worker session 106a and . . . , and Mth computing device 118.$N_s$.M of $N_s$th worker session 106$N_s$, may each be an instance of session worker device 420. Session worker device 420 may include a fourth input interface 422, a fourth output interface 424, a fourth communication interface 426, a fourth computer-readable medium 428, a fourth processor 430, a model worker application 432, a training dataset subset 434, a validation dataset subset 436, and model configuration data 438.

Because the input dataset may need to be distributed across a plurality of computing devices, each session may include a plurality of computing devices with one of the computing devices acting as the session manager and referred to as session manager device 400. The input dataset first may be distributed into data subsets at each computing device included in the respective session, with each session distributing the input dataset in a similar manner among its computing devices. For example, if first worker session 106a includes three computing devices, approximately a third of the input dataset is distributed to each computing device of first worker session 106a that may or may not include a first session manager device 400a of first worker session 106a. $N_s$th worker session 106$N_s$ similarly distributes the input dataset among the computing devices of $N_s$th worker session 106$N_s$. The data subset of the input dataset stored at each computing device is also divided into a training dataset subset and a validation dataset subset created from the local data subset in similar manners. Training dataset subset 414 and validation dataset subset 416 may be created at session manager device 400. Training dataset subset 434 and validation dataset subset 436 may be created at session worker device 420 included in each session Evaluation cache 316, model data 318, and selected model data 320 are created from results generated by worker system 106 executing model manager application 412 with first training dataset subset 414 and first validation dataset subset 416. The model training uses training dataset subset 414 and/or training dataset subset 434 to generate a model, and model scoring uses validation dataset subset 416 and/or validation dataset subset 436 to determine how well the generated model performed. Model manager application 412 may coordinate generation of the model using model worker application 432 executing at the one or more session worker devices 420 assigned to the session with their allocated subset of the input dataset. Session manager device 400 may or may not include a portion of the input dataset divided into first training dataset subset 414 and first validation dataset subset 416. Instead, session manager device 400 may coordinate the distribution without storing a portion of the input dataset on third computer-readable medium 408.

When cross-validation is performed to determine how well the generated model performed, a number of folds F is defined and the training is performed F−1 times with the performance measure averaged across the F−1 scoring executions with a validation holdout. When cross-validation is performed, the input dataset is partitioned into F subsets (folds). For each fold, a new model is trained on each of the F-1 folds and validated using the selected (holdout) fold. An objective function value is averaged over each set of training and scoring executions to obtain a single objective function value.

Referring again to FIG. 2, each user device 200 of user system 102 may include the same or different components and combinations of components. Fewer, different, and additional components may be incorporated into user device 200.

Input interface 202 provides an interface for receiving information for entry into user device 200 as understood by those skilled in the art. Input interface 202 may interface with various input technologies including, but not limited to, a keyboard 212, a mouse 214, a display 216, a track ball, a keypad, one or more buttons, etc. to allow the user to enter information into user device 200 or to make selections presented in a user interface displayed on display 216. The same interface may support both input interface 202 and output interface 204. For example, display 216 that includes a touch screen both allows user input and presents output to the user. User device 200 may have one or more input interfaces that use the same or a different input interface technology. The input interface technology further may be accessible by user device 200 through communication interface 206.

Output interface 204 provides an interface for outputting information from user device 200, for example, to a user of user device 200 or to another device. For example, output interface 204 may interface with various output technologies including, but not limited to, display 216, a speaker 218, a printer 220, etc. User device 200 may have one or more output interfaces that use the same or a different interface technology. The output interface technology further may be accessible by user device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. User device 200 may have one or more communication interfaces that use the same or a different communication interface technology. For example, user device 200 may support communication using an Ethernet port, a Bluetooth antenna, a telephone jack, a USB port, etc. Data and messages may be transferred between user device 200 and selection manager device 104 using communication interface 206.

Computer-readable medium 208 is a non-transitory electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. User device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. User device 200 also may have one or more drives that support the loading of a memory media such as a CD or DVD, an external hard drive, etc. One or more external hard drives further may be connected to user device 200 using communication interface 106.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. User device 200 may include a plurality of processors that use the same or a different processing technology.

Model tuning application 222 performs operations associated with selecting a decision variable configuration for a model type where the decision variable configuration defines a value for each decision variable for the model type. The operations may be implemented using hardware, firmware, software, or any combination of these methods. Referring to the example embodiment of FIG. 2, model tuning application 222 is implemented in software (comprised of computer-readable and/or computer-executable instructions) stored in computer-readable medium 208 and accessible by processor 210 for execution of the instructions that embody the operations of model tuning application 222. Model tuning application 222 may be written using one or more programming languages, assembly languages, scripting languages, etc.

Model tuning application 222 may be implemented as a Web application. For example, model tuning application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an XML file, or any other type of file supported by HTTP.

Model tuning application 222 may be integrated with other analytic tools. As an example, model tuning application 222 may be part of an integrated data analytics software application and/or software architecture such as that offered by SAS Institute Inc. of Cary, N.C., USA. For example, model tuning application 222 may be part of SAS® Enterprise Miner™ and/or SAS® Viya™ developed and provided by SAS Institute Inc. of Cary, N.C., USA that may be used to create highly accurate predictive and descriptive models based on analysis of vast amounts of data from across an enterprise. Merely for further illustration, model tuning application 222 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, SAS® Forecast Server, all of which are developed and provided by SAS Institute Inc. of Cary, N.C., USA. Data mining is applicable in a wide variety of industries.

Referring again to FIG. 3, fewer, different, or additional components may be incorporated into selection manager device 104. Second input interface 302 provides the same or similar functionality as that described with reference to input interface 202 of user device 200 though referring to selection manager device 104. Second output interface 304 provides the same or similar functionality as that described with reference to output interface 204 of user device 200 though referring to selection manager device 104. Second communication interface 306 provides the same or similar functionality as that described with reference to communication interface 206 of user device 200 though referring to selection manager device 104. Data and messages may be transferred between selection manager device 104 and/or user device 200 and session manager device 400 using second communication interface 306. Second computer-readable medium 308 provides the same or similar functionality as that described with reference to computer-readable medium 208 of user device 200 though referring to selection manager device 104. Second processor 310 provides the same or similar functionality as that described with reference to processor 210 of user device 200 though referring to selection manager device 104.

Selection manager application 312 performs operations associated with selecting sets of decision variable configurations to evaluate for the model type based on inputs provided from user device 200. Selection manager application 312 requests that the computing devices of worker system 106 generate a model for each decision variable configuration in the selected sets of decision variable configurations. A set of decision variable configurations may be associated with an iteration and may be stored in various manners such as an array, list, etc. The operations may be implemented using hardware, firmware, software, or any combination of these methods. Referring to the example embodiment of FIG. 3, selection manager application 312 is implemented in software (comprised of computer-readable and/or computer-executable instructions) stored in second computer-readable medium 308 and accessible by second processor 310 for execution of the instructions that embody the operations of selection manager application 312. Selection manager application 312 may be written using one or more programming languages, assembly languages, scripting languages, etc. Selection manager application 312 may be implemented as a Web application.

Selection manager application 312 may be integrated with other analytic tools. As an example, selection manager application 312 may be part of an integrated data analytics software application and/or software architecture such as that offered by SAS Institute Inc. of Cary, N.C., USA. For example, selection manager application 312 may be part of SAS® Enterprise Miner™ and/or SAS® Viya™. Merely for further illustration, selection manager application 312 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, SAS® Forecast Server.

Referring again to FIG. 4A, fewer, different, and additional components may be incorporated into session manager device 400. Each session manager device 400 of each session of worker system 106 may include the same or different components or combination of components.

Third input interface 402 provides the same or similar functionality as that described with reference to input interface 202 of user device 200 though referring to session manager device 400. Third output interface 404 provides the same or similar functionality as that described with reference to output interface 204 of user device 200 though referring to session manager device 400. Third communication interface 406 provides the same or similar functionality as that described with reference to communication interface 206 of user device 200 though referring to session manager device 400. Data and messages may be transferred between session manager device 400 and another computing device of worker system 106 and/or selection manager device 104 using third communication interface 406. Third computer-readable medium 408 provides the same or similar functionality as that described with reference to computer-readable medium 208 of user device 200 though referring to session manager device 400. Third processor 410 provides the same or similar functionality as that described with reference to processor 210 of user device 200 though referring to session manager device 400.

Model manager application 412 may be integrated with other analytic tools. As an example, model manager application 412 may be part of an integrated data analytics software application and/or software architecture such as that offered by SAS Institute Inc. of Cary, N.C., USA. For example, model manager application 412 may be part of SAS® Enterprise Miner™ and/or SAS® Viya™ Merely for further illustration, model manager application 412 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, SAS® Forecast Server.

Referring again to FIG. 4B, fewer, different, and additional components may be incorporated into session worker device 420. Each session worker device 420 of each session of worker system 106 may include the same or different components or combination of components.

Fourth input interface 422 provides the same or similar functionality as that described with reference to input interface 202 of user device 200 though referring to session worker device 420. Fourth output interface 424 provides the same or similar functionality as that described with reference to output interface 204 of user device 200 though referring to session worker device 420. Fourth communication interface 426 provides the same or similar functionality as that described with reference to communication interface 206 of user device 200 though referring to session worker device 420. Data and messages may be transferred between session worker device 420 and another computing device of the associated session of worker system 106 and/or session manager device 400 using fourth communication interface 426. Fourth computer-readable medium 428 provides the same or similar functionality as that described with reference to computer-readable medium 208 of user device 200 though referring to session worker device 420. Fourth processor 430 provides the same or similar functionality as that described with reference to processor 210 of user device 200 though referring to session worker device 420.

Model worker application 432 may be integrated with other analytic tools and may be integrated with model manager application 412 to generate a model using the input dataset distributed across the worker computing devices of each session. As an example, model worker application 432 may be part of an integrated data analytics software application and/or software architecture such as that offered by SAS Institute Inc. of Cary, N.C., USA. For example, model worker application 432 may be part of SAS® Enterprise Miner™ and/or SAS® Viya™ Merely for further illustration, model worker application 432 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, SAS® Forecast Server.

Model tuning application 222, selection manager application 312, model manager application 412, and/or model worker application 432 may be the same or different applications that are integrated in various manners to select a decision variable configuration for a model type using the input dataset divided into the training dataset and the validation dataset in a single computing device or a plurality of distributed computing devices.

Input data from which each training dataset subset 414, each validation dataset subset 416, each training dataset subset 434, and each validation dataset subset 436 are drawn, may include, for example, a plurality of rows and a plurality of columns. The plurality of rows may be referred to as observation vectors or records (observations), and the columns may be referred to as variables. In an alternative embodiment, the input data may be transposed. The plurality of variables defines a vector $x_i$ for each observation vector $i=1, 2, \ldots, N$, where N is a number of the observation vectors included in the input data.

The input data may further include a target variable value $y_i$ for zero or more of the plurality of observation vectors that indicates a label, or class, or other characteristic defined for the respective observation vector $x_i$. The input data may include additional variables that are not included in the plurality of variables. When input data includes target variable value $y_i$, the input data includes observation vectors that have been labeled or classified, for example, by a human or other machine learning labeling process. For example, the label or classification may indicate a class for the observation vector or otherwise indicate an identification of a characteristic of the observation vector. For example, a $y_i$ value may indicate the label determined for the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc.

In data science, engineering, and statistical applications, data often consists of multiple measurements (across sensors, characteristics, responses, etc.) collected across multiple time instances (patients, test subjects, etc.). These measurements may be collected in the input data for analysis and processing. The input data may include data captured as a function of time for one or more physical objects. The data stored in the input data may be captured at different time points periodically, intermittently, when an event occurs, etc. The input data may include data captured at a high data rate such as 200 or more observation vectors per second for one or more physical objects. One or more columns of the input data may include a time and/or date value. The input data may include data captured under normal and abnormal operating conditions of the physical object.

One or more variables of the plurality of variables may describe a characteristic of a physical object. For example, if the input data includes data related to operation of a vehicle, the variables may include a type of vehicle, an oil pressure, a speed, a gear indicator, a gas tank level, a tire pressure for each tire, an engine temperature, a radiator level, etc. some or all of which may be measured by a sensor.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system. For example, the input data may include image data captured by medical imaging equipment (i.e., computed tomography image, magnetic resonance image, x-ray image, ultrasound image, etc.) of a body part of a living thing. The image data may be labeled, for example, as either indicating existence of a medical condition or non-existence of the medical condition. The input data may include a reference to image data that may be stored, for example, in an image file or in a video file. The input data may include a plurality of such references. The existence/non-existence label or other label may be defined by a clinician or expert in the field to which data stored in the input data relates.

The data stored in the input data may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in the input data may be generated as part of the Internet of Things (IoT), where things (e.g., machines, devices, phones, sensors) can be connected to networks and the data from these things collected and processed within the things and/or external to the things before being stored in the input data. For example, the IoT can include sensors in many different devices and types of devices, and high value analytics can be applied to identify hidden relationships and drive increased efficiencies. This can apply to both big data analytics and real-time analytics. Some of these devices may be referred to as edge devices and may involve edge computing circuitry. These devices may provide a variety of stored or generated data, such as network data or data specific to the network devices themselves. Again, some data may be processed with an ESPE, which may reside in the cloud or in an edge device before being stored in the input data.

The data stored in the input data may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

The input data may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

The input data may be stored using various data structures as known to those skilled in the art including one or more files of a file system, a relational database, one or more tables of a system of tables, a structured query language database, etc. on session manager device 400 and/or on worker system 106. Session manager device 400 may coordinate access to a copy of the input data sent to each session worker device 420 of worker system 106. Session manager device 400 further may coordinate access to the input data that is distributed across worker system 106 such that each session worker device 420 stores a subset of the input data. For example, the input data may be stored in a cube distributed across a grid of computers as understood by a person of skill in the art. As another example, the input data may be stored in a multi-node Hadoop® class. For instance, Apache™ Hadoop® is an open-source software framework for distributed computing supported by the Apache Software Foundation. As another example, the input data may be stored in a cloud of computers and accessed using cloud computing technologies, as understood by a person of skill in the art. The SAS® LASR™ Analytic Server may be used as an analytic platform to enable multiple users to concurrently access data stored in the input data. The SAS Viya open, cloud-ready, in-memory architecture also may be used as an analytic platform to enable multiple users to concurrently access data stored in the input data. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 5:
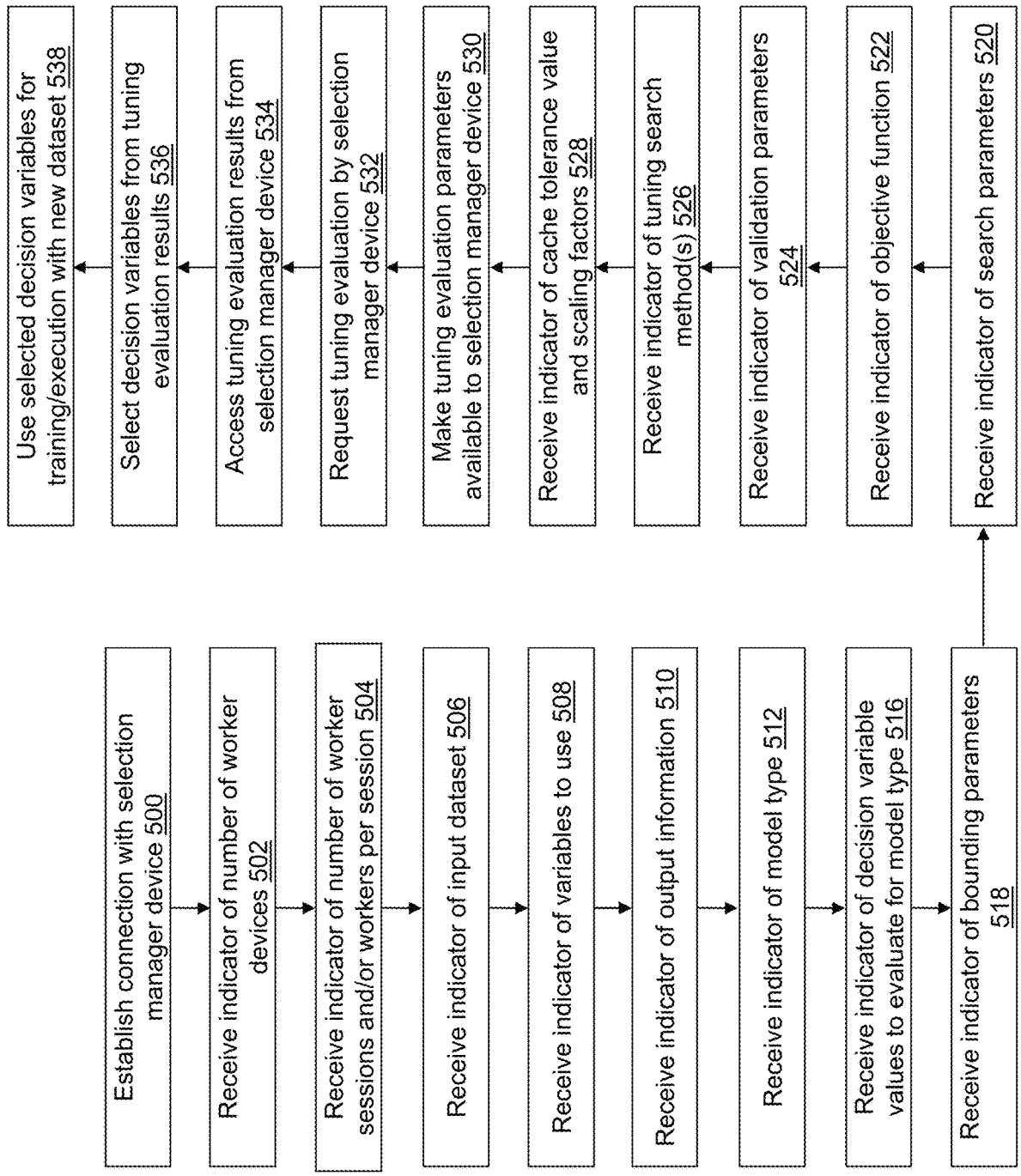
FIG. 5 depicts a flow diagram illustrating examples of operations performed by the user device of FIG. 2 in accordance with an illustrative embodiment.

Referring to FIG. 5, example operations associated with model tuning application 222 are described. Additional, fewer, or different operations may be performed depending on the embodiment. The order of presentation of the operations of FIG. 5 is not intended to be limiting. A user can interact with one or more user interface windows presented to the user in a display under control of model tuning application 222 independently or through a browser application in an order selectable by the user. Although some of the operational flows are presented in sequence, the various operations may be performed in various repetitions, concurrently, and/or in other orders than those that are illustrated. For example, a user may execute model tuning application 222, which causes presentation of a first user interface window, which may include a plurality of menus and selectors such as drop down menus, buttons, text boxes, hyperlinks, etc. associated with model tuning application 222 as understood by a person of skill in the art. As further understood by a person of skill in the art, various operations may be performed in parallel, for example, using a plurality of threads or a plurality of computing devices such as a grid or a cloud of computing devices.

In an operation 500, a connection is established with selection manager device 104. User device 200 accepts commands from a user and relays necessary instructions to selection manager device 104.

In an operation 502, a first indicator may be received that indicates a value of $N_W$ the number of computing devices or nodes of worker system 106 that may include selection manager device 104 (for example, the same or another indicator may indicate whether to include selection manager device 104 or it may or may not be included by default). The first indicator may further indicate whether selection manager device 104 is configured in a single-machine mode or a distributed mode. In an alternative embodiment, the first indicator may not be received. For example, a default value may be stored, for example, in computer-readable medium 208 and used automatically. In another alternative embodiment, $N_W$ may not be selectable. Instead, a fixed, predefined value may be used. The value further may be automatically determined based on a number of computing devices connected to selection manager device 104.

Single-machine mode is a computing model in which multiple processors or multiple cores are controlled by a single operating system and can access shared resources, such as disks and memory. Single-machine mode refers to an application running multiple concurrent threads on a multi-core machine to take advantage of parallel execution on selection manager device 104. More simply, single-machine mode means multithreading on selection manager device 104. Single-machine mode uses the number of CPUs (cores) on selection manager device 104 to determine the number of concurrent threads. For example, one thread per core may be used though a number of threads on any computing device may be changed under control of the user. A grid host may be specified for a distributed mode and identify a domain name system (DNS) or IP address of selection manager device 104, when selection manager device 104 is a separate device from user device 200.

In an operation 504, a second indicator may be received that indicates the value of $N_s$ the number of the one or more sessions and/or the value of M the number of computing devices included in each session. Within each session, when a train or score action is executed, each computing device of that session also may use multiple threads. In an alternative embodiment, the second indicator may not be received. For example, default values may be stored, for example, in computer-readable medium 208 and used automatically. In another alternative embodiment, M or $N_s$ may not be selectable. Instead, a fixed, predefined value may be used. The value(s) further may be automatically determined based on $N_W$ and other criteria as described further below such that the user does not specify either or one of $N_s$ the number of the one or more sessions and M the number of computing devices included in each session.

In an operation 506, a third indicator may be received that indicates the input dataset. For example, the first indicator indicates a location and a name of the input dataset. As an example, the first indicator may be received by model tuning application 222 after selection from a user interface window or after entry by a user into a user interface window.

In an operation 508, a fourth indicator may be received that indicates a plurality of variables of the input dataset to define $x_i$ and, optionally, target variable value $y_i$. For illustration, the neural network model type may not use a target variable; whereas, for the forest model type, the target variable indicates which variable the model predicts. The fourth indicator may indicate that all or only a subset of the variables stored in the input dataset be used to define $x_i$. For example, the fourth indicator indicates a list of variables to use by name, column number, etc. Each observation vector $x_i$, i=1, . . . , d read from the input data may include a value for each variable of the plurality of variables to define d dimensions or features. The input data includes a set of observation vectors $X=[x_{j,i}]$, i=1, . . . , d, j=1, . . . , N. When a value for a variable of the plurality of variables is missing, the observation vector may not be included in the number of observation vectors N, a value may be computed for the missing variable, for example, based on neighbor values, etc. The input data may be partitioned or otherwise divided into training dataset subset 414 and validation dataset subset 416, training dataset subset 434 and validation dataset subset 436, and/or test datasets as part of training of the model. For example, the fourth indicator may further indicate a variable to use by name, column number, etc. for target variable value $y_i$ when included in the input data.

In an alternative embodiment, the fourth indicator may not be received. For example, the last variable in the input data may be used automatically as the target variable vector $y_i$ if the user indicates that the input data includes the target variable vector $y_i$. All of the variables or all of the variables except a last column may be used automatically to define each observation vector $x_i$. A variable type may also be defined for each variable including the target variable. Illustrative variable types include continuous and categorical. For example, continuous may indicate a numeric variable; whereas, categorical indicates a set of discrete values.

In an operation 510, a fifth indicator may be received that provides output information that describes an output to be captured from execution of model tuning application 222 in combination with selection manager application 312. For example, the fourth indicator indicates a location and a name of model data 318 and/or of selected model data 320 that may include one or more tables of data. As an example, the fifth indicator may be received by model tuning application 222 after selection from a user interface window or after entry by a user into a user interface window. In an alternative embodiment, the location and the name of model data 318 and/or of selected model data 320 may not be selectable. Instead, tables are created by default in a default location automatically. Example tables include a "Tuner Information" output table that summarizes values of options specified by the user to control execution of model tuning application 222; a "Tuner Results" output table that includes a default configuration and up to ten of the best decision variable configurations (based on an extreme (minimum or maximum) objective function value) identified, where each configuration listed includes the decision variable values and objective function value for comparison; a "Tuner Evaluation History" output table that includes all of the decision variable configurations evaluated, where each configuration listed includes the decision variable values and objective function value for comparison; a "Best Configuration" output table that includes values of the decision variables and the objective function value for the best configuration identified; a "Tuner Summary" output table that includes statistics about execution of the tuning process; a "Tuner Task Timing" output table that includes timing information about the different tasks performed during the tuning process; and a trained model output that includes information to execute the model generated using the input dataset with the best decision variable configuration. For example, the trained model output includes information to execute the model generated using the input dataset with the best decision variable configuration that may be saved in selected model data 320 and used to score a second dataset 1524 (shown referring to FIG. 15) as discussed further below. For illustration, selected model data 320 may be stored using the SAS ASTORE format developed and provided by SAS Institute Inc. of Cary, N.C., USA for faster in-memory scoring. The other output tables may be stored in model data 318 or another location as specified by the user. For example, one or more of the output tables may be selected by the user for presentation on display 216. As another option, the fifth indicator is not received, and the output is generated automatically.

In an operation 512, a sixth indicator of a model type for which to identify a best decision variable configuration may be received. For example, the sixth indicator indicates a name of a model type. The sixth indicator may be received by model tuning application 222 after selection from a user interface window or after entry by a user into a user interface window. As an example, a model type may be selected from "Decision Tree", "Factorization Machine", "Forest", "Gradient Boosting Tree", "Neural Network", "Support Vector Machine", "Optimization Model", etc. Of course, the model type may be labeled or selected in a variety of different manners by the user as understood by a person of skill in the art. In an alternative embodiment, the model type may not be selectable, and a single model type is implemented in model tuning application 222.

The Decision Tree model may automatically adjust decision tree decision variables to tune a decision tree model for minimum error as measured by a specified objective function. For illustration, a tuneDecisionTree action selects different decision variable configurations to run a dtreeTrain action, optionally a dtreePrune action, and a dtreeScore action (an assess action may be run after each dtreeScore action) multiple times to train and validate a decision tree model as it searches for a model that has reduced validation error. For illustration, the tuneDecisionTree action, the dtreeTrain action, the dtreePrune action, and the dtreeScore action are included in SAS® Viya™ and SAS® Cloud Analytic Services (CAS) developed and provided by SAS Institute Inc. of Cary, N.C., USA.

The Forest model may automatically adjust forest decision variables to tune a Forest model for minimum error as measured by a specified objective function. The Forest model type creates a decision tree recursively by choosing an input variable and using it to create a rule to split the data into two or more subsets. The process is repeated in each subset, and again in each new subset, and so on until a constraint is met. In the terminology of the tree metaphor, the subsets are nodes, the original data table is a root node, and final unpartitioned subsets are leaves or terminal nodes. A node is an internal node if it is not a leaf. The data in a leaf determine estimates of the value of the target variable. These estimates are subsequently applied to predict the target of a new observation that is assigned to the leaf.

For illustration, a FOREST procedure included in SAS® Visual Data Mining and Machine Learning 8.1 may be used to implement the forest model type in SAS® Viya™ developed and provided by SAS Institute Inc. of Cary, N.C., USA.

The FOREST procedure creates a model called a forest, which consists of several decision trees, in SAS Viya. The FOREST procedure creates multiple decision trees that differ from each other in two ways: 1) the training data for each tree constitutes a different sample, and each sample is created by sampling, with replacement, observations from the original training data of the forest, and 2) the input variables that are considered for splitting a node are randomly selected from all available inputs. Among these randomly selected variables, the FOREST procedure chooses a single variable, which is associated the most with the target, when it forms a splitting rule. The FOREST procedure creates an ensemble of decision trees to predict a single target of either continuous or categorical measurement level. An input variable can have an continuous or categorical measurement level.

For illustration, an "autotune" statement used with the FOREST procedure included in SAS® Visual Data Mining and Machine Learning 8.1 may be used to evaluate different decision variable configurations and to select the best configuration of decision variable values for the forest model type. A tuneForest action selects different decision variable configurations to run a forestTrain action and a forestScore action multiple times to train and validate the forest model as it searches for a model that has reduced validation error. For illustration, the tuneForest action, the forestTrain action, and the forestScore action are included in SAS® Viya™ and SAS® Cloud Analytic Services (CAS) developed and provided by SAS Institute Inc. of Cary, N.C., USA.

The Factorization Machine model may automatically adjust factorization machine parameters to tune a factorization machine model for minimum error as measured by a specified objective function. For illustration, a FACTMAC procedure included in SAS® Visual Data Mining and Machine Learning 8.1 may be used to implement the factorization machine model type in SAS® Viya™ all developed and provided by SAS Institute Inc. of Cary, N.C., USA. The Factorization Machine model type generalizes a matrix factorization. The FACTMAC procedure estimates factors for each of the categorical input variables specified, in addition to estimating a global bias and a bias for each level of the categorical input variables. An continuous target variable is also specified. The FACTMAC procedure computes the biases and factors by using a stochastic gradient descent (SGD) algorithm that minimizes a root mean square error (RMSE) criterion.

For illustration, an "autotune" statement used with the FACTMAC procedure included in SAS® Visual Data Mining and Machine Learning 8.1 may be used to evaluate different decision variable configurations and to select the best configuration of decision variable values for the Forest model type. A tuneFactmac action selects different decision variable configurations to run the factmac action of the factmac action set, the score action of the astore action set, and the assess action of the percentile action set to train and validate factorization machine models as it searches for a model that has reduced validation error. For illustration, the factmac action, the score action, and the assess action are included in SAS® Viya™ and SAS® Cloud Analytic Services (CAS) developed and provided by SAS Institute Inc. of Cary, N.C., USA.

The Gradient Boosting Tree model may automatically adjust gradient boosting tree parameters to tune a gradient boosting tree model for minimum error as measured by a specified objective function. The Gradient Boosting Tree model type consists of multiple decision trees. For illustration, a GRADBOOST procedure included in SAS® Visual Data Mining and Machine Learning 8.1 may be used to implement the Gradient Boosting Tree model type in SAS® Viya™ all developed and provided by SAS Institute Inc. of Cary, N.C., USA. The GRADBOOST procedure creates a model called a gradient boosting tree model in SAS Viya. The GRADBOOST procedure creates a model by fitting a set of additive trees.

For illustration, an "autotune" statement used with the GRADBOOST procedure included in SAS® Visual Data Mining and Machine Learning 8.1 may be used to evaluate different decision variable configurations and to select the best configuration of decision variable values for the Forest model type. A tuneGradientBoostTree action selects different decision variable configurations to run the gbtreeTrain and gbtreeScore actions multiple times to train and validate gradient boosting tree models as it searches for a model that has reduced validation error. For illustration, the gbtreeTrain and gbtreeScore actions are included in the decision Tree action set of SAS® Viya™ and SAS® Cloud Analytic Services (CAS) developed and provided by SAS Institute Inc. of Cary, N.C., USA.

The Neural Network model may automatically adjust neural network parameters to tune a neural network model for minimum error as measured by a specified objective function. For illustration, a NNET procedure included in SAS® Visual Data Mining and Machine Learning 8.1 may be used to implement the Neural Network model type in SAS® Viya™ all developed and provided by SAS Institute Inc. of Cary, N.C., USA. The NNET procedure trains a multilayer perceptron neural network. Training a multilayer perceptron neural network relies on an unconstrained minimization of a nonlinear objective function.

For illustration, an "autotune" statement used with the NNET procedure included in SAS® Visual Data Mining and Machine Learning 8.1 may be used to evaluate different decision variable configurations and to select the best configuration of decision variable values for the neural network model type. A tuneNeuralNet action selects different decision variable configurations to run the annTrain and annScore actions multiple times to train and validate neural network models as it searches for a model that has reduced validation error. For illustration, the annTrain and annScore actions are included in the neuralNet action set of SAS® Viya™ and SAS® Cloud Analytic Services (CAS) developed and provided by SAS Institute Inc. of Cary, N.C., USA.

The Support Vector Machine model may automatically adjust support vector machine parameters to tune a support vector machine model for minimum error as measured by a specified objective function. For illustration, a SVMACHINE procedure included in SAS® Visual Data Mining and Machine Learning 8.1 may be used to implement the Support Vector Machine model type in SAS® Viya™ all developed and provided by SAS Institute Inc. of Cary, N.C., USA. The Support Vector Machine model type computes support vector machine learning classifiers for a binary pattern recognition problem. The SVMACHINE procedure uses both linear and low-degree polynomial kernels to conduct the computation.

For illustration, an "autotune" statement used with the SVMACHINE procedure included in SAS® Visual Data Mining and Machine Learning 8.1 may be used to evaluate different decision variable configurations and to select the best configuration of decision variable values for the support vector machine model type. A tuneSvm action selects different decision variable configurations to run the svm Train action of the svm action set, the score action of the astore action set, and the assess action of the percentile action set to train and validate support vector machine models as it searches for a model that has reduced validation error. For illustration, the svm Train action is included in the svm action set of SAS® Viya™ and SAS® Cloud Analytic Services (CAS) developed and provided by SAS Institute Inc. of Cary, N.C., USA.

The Optimization model may automatically adjust the decision variables to evaluate different decision variable configurations and selects the best configuration of decision variable values to solve the mathematical equation defined for the optimization model. The mathematical equation is the objective function that is maximized or minimized using the decision variable values.

In an operation 516, a seventh indicator may be received that defines possible values for one or more of the decision variables to evaluate based on the selected model type. The values for one or more of the decision variables to evaluate may be considered as constraints that represent physical, economic, technological, or other restrictions on what numerical values can be assigned to a respective decision variable. For example, pressures applied during a chemical process may be limited to a range of physically possible values. In constrained optimization models and training machine learning models, values are determined for the decision variables that maximize or minimize the objective function while satisfying the constraints defined by the possible values.

Using the seventh indicator, the user may identify one or more of the decision variables as being defined by a single value such that the defined single value is used for that decision variable when selecting values for each decision variable configuration. When a decision variable is defined by a single value, a default value defined for the decision variable may be used for each decision variable configuration. Using the seventh indicator, the user may select one or more of the decision variables to evaluate using a lower bound value, an upper bound value, and an iteration value and/or a specific value instead of the default value. Using the seventh indicator, the user may identify one or more of the decision variables to evaluate using a list of possible values instead of a range of values. Using the seventh indicator, the user may identify one or more of the decision variables to evaluate using default bounds or a default list of possible values.

For example, the decision tree model type decision variables may include a maximum number of decision tree levels (maxlevel), a number of bins to use for numeric variables during calculation of the decision tree (nbins), and a split criterion for each tree node (criterion). A value for each of these decision variables is defined in each decision variable configuration for the decision tree model type. The methodology by which the values are determined is based on the tuning search method discussed further below and the values, if any, indicated in operation 516.

For example, the factorization machine model type decision variables may include a number of factors (nfactors), a learning step (learnstep), and a maximum number of iterations (maxiter). A value for each of these decision variables is defined in each decision variable configuration for the factorization machine model type. The methodology by which the values are determined is based on the tuning search method discussed further below and the values, if any, indicated in operation 516.

For example, the forest model type decision variables may include a fraction (bootstrap) of a random bootstrap sample of the training data to be used for growing each tree in the forest, where the fraction is a value between 0 and 1 with a default value of 0.6. The forest model type decision variables further may include a maximum depth (maxlevel) of a decision tree to be grown where a number of levels in a tree is equal to a depth value plus one. A default value for the maximum depth may be 20. The forest model type decision variables further may include a number of trees (ntrees) to grow, which by default may be equal to 100. The forest model type decision variables further may include a number of bins to use for numeric variables during a determination of each decision tree (nbins). The forest model type decision variables further may include a number of input variables (vars_to_try) to consider splitting on in a node, where the value is between one and a number of input variables with a default value equal to a square root of the number of input variables. A value for each of these decision variables is defined in each decision variable configuration for the forest model type. The methodology by which the values are determined is based on the tuning search method discussed further below and the values, if any, indicated in operation 516.

For example, the gradient boosting tree model type decision variables may include an L1 norm regularization parameter (lasso) that is greater than or equal to zero with a default value of zero. The gradient boosting tree model type decision variables further may include a learning rate (learningrate) that is between zero and one, inclusive, with a default value of 0.1. The gradient boosting tree model type decision variables further may include a maximum depth (maxlevel) of a decision tree to be grown where a number of levels in a tree is equal to a depth value plus one. The gradient boosting tree model type decision variables further may include a number of trees (ntrees) to grow with a default value of 100. The gradient boosting tree model type decision variables further may include an L2 norm regularization parameter (ridge) that is greater than or equal to zero with a default value of zero. The gradient boosting tree model type decision variables further may include a fraction (samplingrate) of the training data to be used for growing each tree with a default value of 0.5. The gradient boosting tree model type decision variables further may include a number of bins to use for numeric variables during a determination of each decision tree (nbins). The gradient boosting tree model type decision variables further may include a number of input variables (vars_to_try) to consider splitting on in a node where the value is between one and a number of input variables with a default value equal to the number of input variables. A value for each of these decision variables is defined in each decision variable configuration for the gradient boosting tree model type. The methodology by which the values are determined is based on the tuning search method discussed further below and the values, if any, indicated in operation 516.

For example, the neural network model type decision variables may include a range of an annealing rate (annealingrate) to use when a SGD algorithm is used for training. The neural network model type decision variables further may include a learning rate (learningrate) when the SGD algorithm is used for training. The neural network model type decision variables further may include a number of hidden layers (nhidden) in the network between zero and five with a default value of two. The neural network model type decision variables further may include tuning information for neurons in the ith hidden layer, where i is any integer between one and five, inclusive. The neural network model type decision variables further may include an L1 norm regularization parameter (regL1) that is greater than or equal to zero with a default value of zero. The neural network model type decision variables further may include an L2 norm regularization parameter (regL2) that is greater than or equal to zero with a default value of zero. A value for each of these decision variables is defined in each decision variable configuration for the neural network model type. The methodology by which the values are determined is based on the tuning search method discussed further below and the values, if any, indicated in operation 516.

For example, the support vector machine model type decision variables may include a penalty value (C) that is greater than zero. The support vector machine model type decision variables further may include a degree value (degree) that can be between one and three, inclusive. The degree value equal to one is used in a linear kernel. The degree value equal to two or three is used in a polynomial kernel. A value for each of these decision variables is defined in each decision variable configuration for the support vector machine model type. The methodology by which the values are determined is based on the tuning search method discussed further below and the values, if any, indicated in operation 516.

Table 1 below summarizes exemplary decision variables for each model type and the default values or range of values that may be used unless different values are indicated in operation 516:

TABLE 1

| Decision Variable | Initial Value | Lower Bound | Upper Bound |
|---|---|---|---|
| Decision Tree (PROC TREESPLIT) | | | |
| maxlevel | 10 | 1 | 19 |
| nbins | 20 | 20 | 200 |
| criterion | GAIN (nominal target) | GAIN, IGR, GINI, CHISQUARE, CHAID (nominal target) | |
| | VARIANCE (interval target) | VARIANCE, FTEST, CHAID (interval target) | |
| Forest (PROC FOREST) | | | |
| ntrees | 100 | 20 | 150 |
| vars_to_try | sqrt(# inputs) | 1 | # inputs |
| bootstrap | 0.6 | 0.1 | 0.9 |
| maxlevel | 20 | 1 | 29 |
| nbins | 50 | 20 | 100 |
| Gradient Boosting Tree (PROC GRADBOOST) | | | |
| ntrees | 100 | 20 | 150 |
| vars_to_try | # inputs | 1 | # inputs |
| learningrate | 0.1 | 0.01 | 1.0 |
| samplingrate | 0.5 | 0.1 | 1.0 |
| lasso | 0.0 | 0.0 | 10.0 |
| ridge | 0.0 | 0.0 | 10.0 |
| maxlevel | 5 | 2 | 7 |
| nbins | 50 | 20 | 100 |
| Neural Network (PROC NNET) | | | |
| nhidden | 0 | 0 | 5 |
| nunits1, . . . ,5 | 1 | 1 | 100 |
| regL1 | 0 | 0 | 10.0 |
| regL2 | 0 | 0 | 10.0 |
| learn ingrate | 1 E-3 | 1E-6 | 1 E-1 |
| annealingrate | 1 E-6 | 1E-13 | 1 E-2 |
| Support Vector Machine (PROC SVMACHINE) | | | |
| C | 1.0 | 1E-10 | 100.0 |
| degree | 1 | 1 | 3 |
| Factorization Machine (PROC FACTMAC) | | | |
| nfactors | 5 | 5, 10, 15, 20, 25, 30 | |
| maxiter | 30 | 10, 20, 30, . . . , 200 | |
| learnstep | 1 E-3 | 1 E-6, 1 E-5, 1 E-4, 1 E-3, 1 E-2, 1 E-1, 1.0 | |

For illustration, the optimization model type provides an optimization that is a search for a maximum or a minimum of an objective function (also called a cost function), where the decision variables are restricted by particular constraints, where the constraints define a feasible region for the solution. In an illustrative embodiment, the optimization model may minimize f(z) subject to c(z), where z indicates one or more decision variables, f(z) indicates the objective function, and c(z) indicates the possible values for each decision variable. The maximum of f(z) may be a negation of the minimum of −f(z). The objective function is a mathematical formula defined using the decision variables z. For example, the optimization model may be "trained" using linear programming techniques. The objective function may include one or more polynomial functions. An illustrative optimization problem may be defined as minimize $f(x_1,x_2)=100(x_2-x_1^2)^2+(1-x_1)^2$ subject to $25>x_1 \geq 5$ and $100>x_2 \geq 0$, where $x_1$ and $x_2$ are the decision variables.

For illustration, a syntax for specifying custom definitions of decision variables to tune is TUNINGPARAMETERS= (<suboption> <suboption> . . . ) where each <suboption> is specified as: <decision variable name> (LB=LB_number UB=UB_number VALUES=value-list INIT=INIT_number EXCLUDE), where LB_number indicates a lower bound value that overrides the default lower bound value, UB_number indicates an upper bound value that overrides the default upper bound value, value-list indicates a list of values to try, INIT_number indicates an initial value to use in training a baseline model, and EXCLUDE indicates whether to exclude the decision variable from the tuning evaluation by using a fixed value specified for the decision variable or the default value if none is specified.

In an operation 518, an eighth indicator may be received that defines values for one or more bounding parameters. For example, a number of bins $n_b$, a selection number m, a categorical definition value c, a limit boundary flag $f_b$, a number of standard deviations $n_o$ to limit the boundary when the limit boundary flag indicates true, and/or a number of categorical values $n_c$ to choose may be defined by the tenth indicator. The number of bins $n_b$ indicates a number of bins to define using the possible values defined for each decision variable, where $n_b \geq 1$. For illustration, a default value for the number of bins $n_b$ may be $n_b=2$ though other values may be used. The selection number m indicates a number of values of each decision variable to consider each iteration. For illustration, a default value for the selection number m may be m=3 though other values may be used. The categorical definition value c indicates a range of values threshold to distinguish categorical variables from continuous variables. For illustration, a default value for the categorical definition value c may be c=10 though other values may be used. The limit boundary flag $f_b$ indicates whether to further bound each decision variable having a continuous variable type based on the number of standard deviations $n_o$ from a mean value $n_o>0$. For illustration, a default value for the limit boundary flag $f_b$ may be $f_b=1$, and a default value for the number of standard deviations $n_o$ may be $n_o=3$ though other values may be used. The number of categorical values $n_c$ to choose indicates a number of values of each categorical decision variable to consider each iteration where $n_c \geq 0$. For illustration, a default value for the number of categorical values $n_c$ may be $n_c=3$ though other values may be used. When $n_c=0$, each value of the categorical variable may be used that has a non-zero frequency count as described further below In an operation 520, a ninth indicator may be received that defines values for one or more search parameters. The ninth indicator may be received by model tuning application 222 after selection from a user interface window or after entry by a user into a user interface window. For example, a maximum number of configuration evaluations, a maximum number of iterations, a maximum time, and/or a maximum number of configurations to evaluate in a single iteration may be defined by the ninth indicator.

In an operation 522, a tenth indicator of an objective function may be received. For example, the tenth indicator indicates a name of an objective function. The objective function specifies a measure of model error or a measure of model accuracy to be used to identify a best configuration of the decision variables among those evaluated. The objective function defines the criterion for evaluating the solution. It is a mathematical function of the decision variables that converts a solution into a numerical evaluation of that solution. For example, the objective function may measure the profit or cost that occurs as a function of the amount of various products produced. The objective function also specifies a direction of optimization, either to maximize or minimize. An optimal solution for the model is the best solution as measured by that criterion.

The tenth indicator may be received by model tuning application 222 after selection from a user interface window or after entry by a user into a user interface window. A default value for the objective function may further be stored, for example, in computer-readable medium 208. The equation that defines the objective function may further be defined using the tenth indicator when an optimization model is the model type. As an example for a machine learning model type, an objective function may be selected from "ASE", "AUC", "F05", "F1", "GAMMA", "GINI", "KS", "MAE", "MCE", "MCLL", "MISC", "MSE", "MSLE", "RASE", "RMAE", "RMSLE", "TAU", etc. Some values can be specified only when the target variable is of a particular type. For example, a default objective function may be the "MISC" objective function for categorical type targets or "MSE" for continuous type targets. Of course, the objective function may be labeled or selected in a variety of different manners by the user as understood by a person of skill in the art. In an alternative embodiment, the objective function may not be selectable, and a single objective function is implemented in model tuning application 222. For example, the MISC objective function may be used by default or without allowing a selection for categorical type targets and MSE may be used by default or without allowing a selection for continuous type targets.

ASE uses an average squared error as the objective function; AUC uses an area under a curve as the objective function (categorical type only); F05 uses a F0.5 coefficient as the objective function (categorical type only); F1 uses an F1 coefficient as the objective function (categorical type only); GAMMA uses a gamma coefficient as the objective function (categorical type only); GINI uses a Gini coefficient as the objective function (categorical type only); KS uses a Kolmogorov-Smirnov coefficient as the objective function (categorical type only); MAE uses a mean absolute error as the objective function (continuous type only); MCE uses a misclassification rate as the objective function (categorical type only); MCLL uses a multiclass log loss as the objective function (categorical type only); MISC uses a misclassification error percentage as the objective function (categorical type only); MSE uses a mean squared error as the objective function (continuous type only); MSLE uses a mean squared logarithmic error as the objective function (continuous type only); RASE uses a root average squared error as the objective function; RMAE uses a root mean absolute error as the objective function (continuous type only); RMSLE uses a root mean squared logarithmic error as the objective function (continuous type only); TAU uses a tau coefficient as the objective function (categorical type only).

The following notation is used to provide a discussion of fit statistics for illustrative objective functions:

$n_o$ is a number of observations in a dataset,
r is a number of levels for a categorical target,
N is a sum of observation frequencies in the data,
$\omega_i$ is a frequency of observation i, so $$N = \sum_{i=1}^{n_o} \omega_i,$$

$y_i$ is a target value of observation i,
$\hat{y}_i$ is a predicted target value of observation i,
m is a number of target levels,
$t_i$ is a level from the target in observation i,
$\hat{t}_i$ is a predicted level from the target in observation i,
$y_{i,j}$=1 if observation i is assigned to target level j, otherwise $y_{i,j}$=0,
$p_{i,j}$ is a predicted probability that observation i is assigned to target level j,
$m_{tc}$ is a number of total cutoff points,
$a_k$ is a true positive at cutoff point k,
$b_k$ is a false positive at cutoff point k,
$c_k$ is a false negative at cutoff point k, $$\theta = \sum_{k=1}^{m_{tc}} (a_{k-1} - a_k)(b_{k-1} - b_k),$$

$$\mu = \sum_{k=2}^{m_{tc}} \left( (a_{k-1} - a_k) \sum_{j=1}^{k} (b_{j-1} - b_j) \right),$$

$$w = \sum_{k=1}^{m_{tc}} \left( (a_{k-1} - a_k) \sum_{j=k+1}^{m_{tc}} (b_{j-1} - b_j) \right),$$

$\rho = a_0 b_0$,
$a_{m_{tc}} = 0$,
$b_{m_{tc}} = 0$,
$p = a_k/(a_k + b_k)$,
$q = a_k/(a_k + c_k)$, and
$\beta = 0.5$.

For continuous targets, the objective functions may be defined as:

$$ASE = \frac{1}{N} \sum_{i=1}^{n_o} \omega_i (y_i - \hat{y}_i)^2,$$

$$RASE = \sqrt{ASE},$$

$$MSLE = \frac{1}{N} \sum_{i=1}^{n_o} \omega_i (\log(\hat{y}_i + 1) - \log(y_i + 1))^2,$$

$$RMSLE = \sqrt{MSLE},$$

$$MAE = \frac{1}{N} \sum_{i=1}^{n_o} \omega_i |y_i - \hat{y}_i|, \text{ and}$$

RMAE=√MAE.

For categorical targets, the objective functions may be defined as:

$$ASE = \frac{1}{rN} \sum_{i=1}^{n_o} \sum_{j=1}^{m} \omega_i (y_{i,j} - p_{i,j})^2,$$

RASE=√ASE, $$MCE = \frac{1}{N} \sum_{t_i \neq \hat{t}_i} \omega_i, \text{ and}$$

$$MCLL = -\frac{1}{N} \sum_{i=1}^{n_o} \sum_{j=1}^{m} \omega_i y_{i,j} \log p_{i,j}.$$

Additional objective functions may be defined as:

$$AUC = \frac{\mu + \theta/2}{\rho},$$

$$GINI = \frac{\mu - w}{\rho},$$

$$GAMMA = \frac{\mu - w}{\mu + w},$$

$$TAU = \frac{\mu - w}{N/2(N-1)}, \text{ and}$$

$$F05 = \frac{(1+\beta^2)pq}{\beta^2 p + q}.$$

In an operation 524, an eleventh indicator may be received that provides validation parameters that describe a validation process to be used by each session of worker system 106. For example, the eleventh indicator may include a fraction value for a fraction of the input dataset to be used for validation or the number of folds F for cross-validation. In an alternative embodiment, the eleventh indicator may not be received. For example, a default value may be stored, for example, in computer-readable medium 208 and used automatically. In another alternative embodiment, a fixed, predefined value may be used for the fraction value unless the number of folds F is defined by the user. In cross validation, each model evaluation requires F−1 number of training executions and scoring executions with different training subsets as discussed previously. Thus, the evaluation time is increased by approximately a factor of F−1. For small to medium sized the input datasets or for unbalanced the input datasets, cross validation provides on average a better representation of error across the entire the input dataset. When cross-validation is not used, F=1, and a percentage of the input data to include in training dataset subset 414 and validation dataset subset 416, training dataset subset 434 and validation dataset subset 436, and/or any test dataset.

In an operation 526, a twelfth indicator of a tuning search method used to identify a best decision variable configuration may be received. For example, the twelfth indicator indicates a name of one or more tuning search methods. The one or more tuning search methods may be indicated to run simultaneously and/or successively. When executed successively, objective function values from one or more previous iterations are used to determine a next iteration of a set of decision variable configurations to be evaluated.

The twelfth indicator may be received by model tuning application 222 after selection from a user interface window or after entry by a user into a user interface window. A default value for the tuning search method may further be stored, for example, in computer-readable medium 208. As an example, the one or more tuning search methods may be selected from "Grid", "Random", LHS", "Genetic Algorithm (GA)", "Genetic Set Search (GSS)", "Bayesian", "DIRECT", "Nelder-Mead Simplex", "DIRECT/Nelder-Mead Hybrid", "Random+GA", "Random+GA/GSS", "Random+Bayesian", "LHS+GA", "LHS+GA/GSS", "LHS+Bayesian", etc. In the illustrative selections, "+" indicates a successive execution. Simultaneous execution may be indicated by a comma delimited list of tuning search method selections such as "LHS, GA1, Bayesian". Multiple search methods of the same search method type may be defined with different parameter values. For example, "LHS, LHS" may be specified. The twelfth indicator may further include one or more tuning search parameter values associated with each indicated tuning search method. For example, a random seed value may be specified for each search method that may be the same for all search methods or may be defined separately for each search method.

A default tuning search method may be the "LHS+GA/GSS" tuning search method in which an LHS search method is used to generate a first set of decision variable configurations that are each executed to generate an objective function value using the objective function indicated in operation 522. The objective function values and the decision variable configuration associated with each are used to initialize a GA search method. Each population of the GA search method may be enhanced with a "growth step" in which a GSS search method is used to locally improve some of the more promising members of the GA population. Of course, the tuning search method may be labeled or selected in a variety of different manners by the user as understood by a person of skill in the art. In an alternative embodiment, the one or more tuning search methods may not be selectable, and a single tuning search method is implemented in model tuning application 222. For example, the "LHS+GA/GSS" tuning search method may be used by default or without allowing a selection.

For illustration, the Grid search method generates uniform decision variable values across the range of each decision variable and combines them across decision variables. If the Grid search method is selected, a grid size (number of samples value) may be specified for all or for each decision variable that defines the size of the grid and therefore, the number of decision variable configurations to evaluate in a single iteration.

For illustration, the Random search method randomly generates decision variable values across the range of each decision variable and combines them across decision variables. If the Random search method is selected, a sample size value may be specified for all or for each decision variable that defines the number of decision variable configurations to evaluate in a single iteration.

Figure 9C:
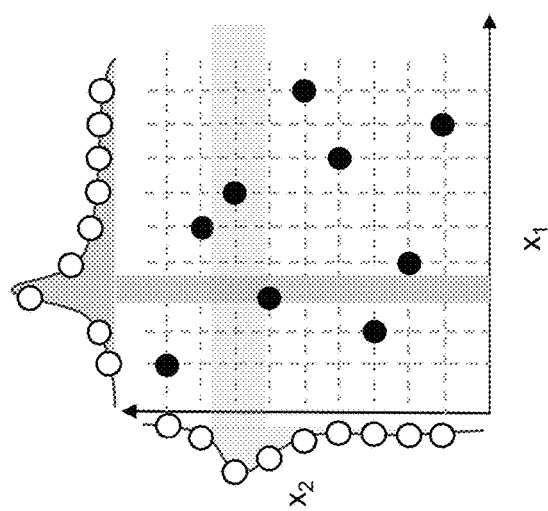
FIGS. 9A to 9C depict a grid, a random grid, and a Latin hypercube sample grid, respectively, in accordance with an illustrative embodiment.

For illustration, the LHS search method generates uniform decision variable values across the range of each decision variable and randomly combines them across decision variables. If the decision variable is continuous or discrete with more levels than a requested sample size, a uniform set of samples is taken across the decision variable range including a lower and an upper bound. If the decision variable is discrete with fewer levels than the requested sample size, each level is repeated an equal number of times across the set of decision variable configurations determined by the LHS search method. If a last set of decision variable configurations is less than the number of levels, the last set of values for the decision variable is uniformly sampled across the set of levels given the remaining set size. The samples for each decision variable are randomly shuffled so that the combination of decision variables is random—the first values for each decision variable are combined, followed by all the second values, etc. This LHS search method ensures that the lower and upper bounds of the decision variable tuning range are included, and for discrete decision variables with a number of levels less than the requested sample size, the levels are sampled evenly with the possible exception of the last set of values when the number of samples is not evenly divisible by the number of levels. Otherwise, with random selection from n bins, when the number of levels is much less than the requested sample size, the level values are likely to not be sampled uniformly. If the LHS search method is selected, a sample size and a random continuous flag may be specified. The sample size defines the number of decision variable configurations to evaluate in a single iteration. The random continuous flag defines a Boolean option value to randomize samples for continuous decision variable values within each LHS continuous Referring to FIG. 9A, a grid search approach to exploring alternative decision variable configurations is shown in accordance with an illustrative embodiment. Each decision variable of interest is discretized into a desired set of values to be evaluated, and models are trained and assessed for all combinations of the values across all decision variables (that is, a "grid"). Although fairly simple and straightforward to carry out, a grid search is quite costly because expense grows exponentially with the number of decision variables and the number of discrete levels of each. FIG. 9A illustrates hypothetical distributions of two decision variables denoted $X_1$ and $X_2$ with respect to a training objective and depicts the difficulty of finding a good combination with a coarse standard grid search. The grayed areas indicate a region of statistically better values of the respective decision variable. The decision variable values selected for model training and scoring (performance assessment) are indicated by dots within the grid. In the illustration, none of the grid selections are within the grayed region for either decision variable.

Figure 9B:
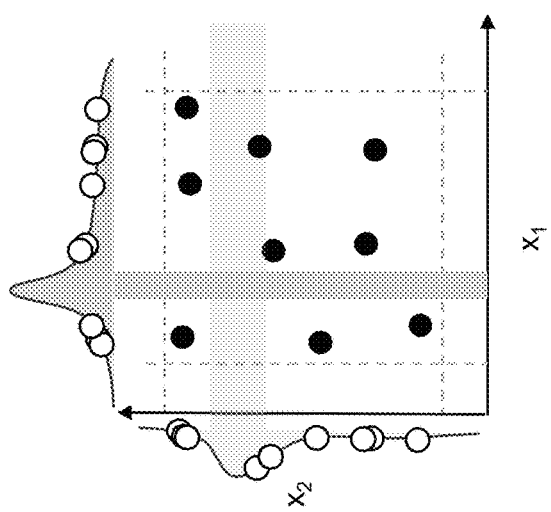
Figure 9A:
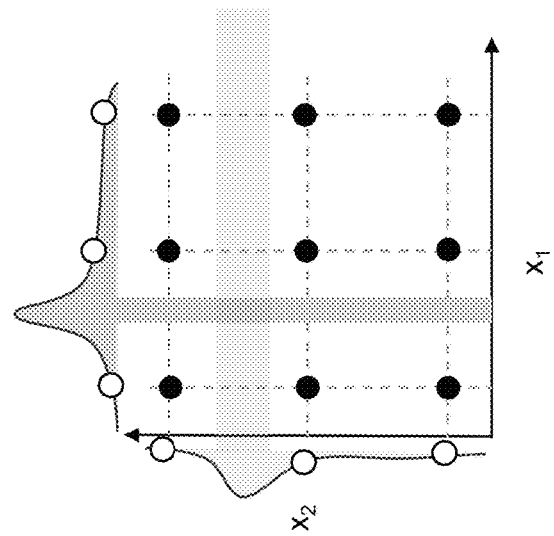

Referring to FIG. 9B, a random grid search approach to exploring alternative decision variable configurations is shown in accordance with an illustrative embodiment. Given the disparity in the sensitivity of model accuracy to different decision variables, a set of candidates that incorporates a larger number of trial values for each decision variable may have a much greater chance of finding effective values for each decision variable. Because some of the decision variables might actually have little to no effect on the model for certain datasets, it is prudent to avoid wasting the effort to evaluate all combinations, especially for higher-dimensional decision variable spaces. Rather than focusing on studying a full-factorial combination of all decision variable values, studying random combinations enables exploration of more values of each decision variable at the same cost (the number of candidate models that are trained and scored). FIG. 9B depicts a potential random distribution with the same budget of evaluations (nine decision variable configurations in this example) as shown for the grid search in FIG. 9A, highlighting the potential to find better decision variable values. Nevertheless, the effectiveness of evaluating purely random combinations of decision variable values is subject to the size and uniformity of the sample; candidate combinations can be concentrated in regions that completely omit the most effective values of one or more of the decision variables.

Referring to FIG. 9C, the LHS search method approach to exploring alternative decision variable configurations is shown in accordance with an illustrative embodiment. LHS samples are exactly uniform across each decision variable, but random in combinations. See, for example, a paper by M. D. McKay titled "Latin Hypercube Sampling as a Tool in Uncertainty Analysis of Computer Models" and published In Proceedings of the 24th Conference on Winter Simulation (WSC 1992), edited by J. J. Swain, D. Goldsman, R. C. Crain, and J. R. Wilson, 557-564. New York: ACM (1992), for more information. LHS samples are approximately equidistant from one another in order to fill the space efficiently. This sampling allows for coverage across an entire range of each decision variable and is more likely to find good values of each decision variable, as illustrated in FIG. 9C, which can be used to identify good decision variable combinations.

Figure 10C:
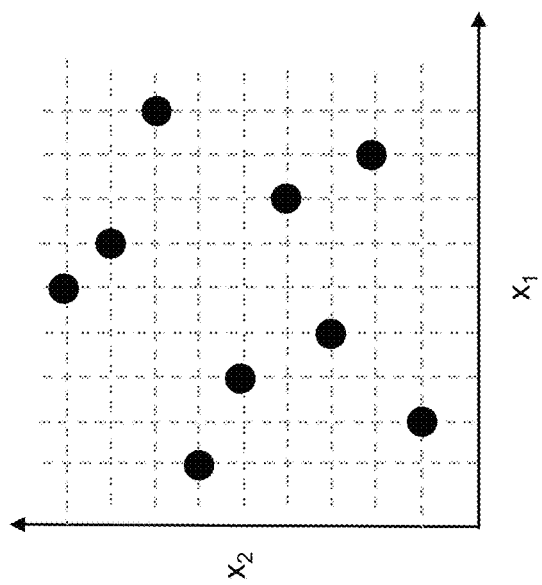
FIGS. 10A to 10C depict a plurality of Latin hypercube sample grids in accordance with an illustrative embodiment.
Figure 10B:
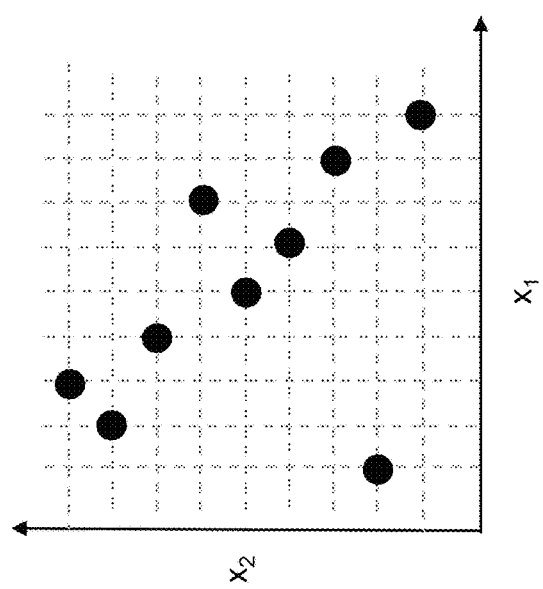
Figure 10A:
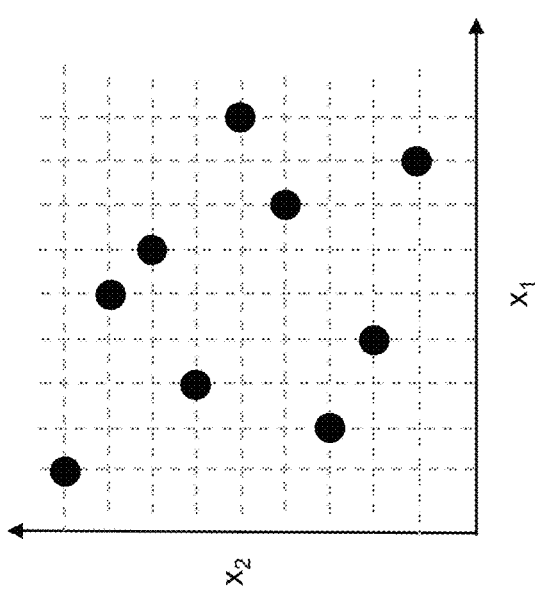

Referring to FIG. 10A, a first set of LHS decision variable configurations is shown for illustration. Referring to FIG. 10B, a second set of LHS decision variable configurations is shown for illustration. Referring to FIG. 10C, a third set of LHS decision variable configurations is shown for illustration.

For illustration, the GA search method defines a family of local search algorithms that seek optimal solutions to problems by applying the principles of natural selection and evolution. A GA search method can be applied to almost any optimization problem and is especially useful for problems for which other calculus-based techniques do not work, such as when the objective function has many local optima, when the objective function is not differentiable or continuous, or when solution elements are constrained to be integers or sequences. In most cases, genetic algorithms require more computation than specialized techniques that take advantage of specific problem structures or characteristics. However, for optimization problems for which no such techniques are available, genetic algorithms provide a robust general method of solution.

There are two competing factors to balance in the selection process of the GA search method: selective pressure and genetic diversity. Selective pressure, the tendency to select only the best decision variable values of the current generation to propagate to the next, is used to direct the GA search method to an optimum. Genetic diversity, the maintenance of a diverse solution population, is also used to ensure that the solution space is adequately searched, especially in early iterations. Too much selective pressure can lower the genetic diversity so that the global optimum is overlooked, and the GA search method converges prematurely. Yet, with too little selective pressure, the GA search method might not converge to an optimum in a reasonable amount of computing time. A proper balance between the selective pressure and genetic diversity is maintained so the GA search method converges in a reasonable time to a global optimum. A tournament selection process may be used to randomly choose a group of members from the current population, compare their fitness, and select the fittest from the group to propagate to the next generation. The selective pressure can be controlled by specifying the tournament size, the number of members chosen to compete in each tournament. Members of the current generation that have passed the selection process either go to a crossover operator or are passed unchanged into the next generation based on a pre-defined crossover probability. Members of the current generation that have passed the cross-over process either go to a mutation operator or are passed unchanged into the next generation based on a pre-defined mutation probability. If the GA search method is selected, a population size, a maximum number of generations, a number of global searches, a number of local searches, a heuristic flag, and a maximum number of iterations may be specified where the population size defines the number of decision variable configurations to evaluate each iteration. The heuristic flag indicates whether a no clone heuristic should be used.

For illustration, the GSS search method is designed for problems that have continuous variables and have the advantage that, in practice, they often require significantly fewer evaluations to converge than does a GA search method. Furthermore, a GSS search method can provide a measure of local optimality that is very useful in performing multimodal optimization. The GSS search method may add additional "growth steps" to the GA search method whenever the decision variable is a continuous variable. For example, a local search selection may include a small subset of decision variable values selected based on their fitness score and distance to other decision variable values and on pre-existing locally optimal decision variable values. A local search optimization may be applied such that the lower and upper bounds of the decision variable are modified to temporarily fix integer variables to their current setting. These additional growth steps may be performed each iteration to permit selected decision variable configurations of the population (based on diversity and fitness) to benefit from local optimization over the continuous variables. If only integer decision variables are present, the GSS search method may not be used to supplement the GA search method. An iteration of the GA search method may be performed before the GSS search method is started to identify additional decision variable configurations.

For illustration, the Bayesian search method is based on creating and exploring a kriging surrogate model to search for improved solutions. A Kriging model is a type of interpolation algorithm for which the interpolated values are modeled by a Gaussian process governed by prior covariance values. The basic idea of Kriging is to predict the value of a function at a given point by computing a weighted average of the known values of the function in the neighborhood of the point. The method is mathematically closely related to regression analysis. The results from the previous iteration may be used to generate the initial Kriging model or update the previous Kriging model. The Bayesian search method may be used to generate new decision variable configurations (evaluation points) by exploring the model both using the DIRECT solver to find a global optimum of a surrogate model and by generating consecutive LHS points and calculating an acquisition function that accounts for the uncertainty of the surrogate model. If the Bayesian search method is selected, a population size, an initial LHS size for the Kriging model, a maximum number of points in the Kriging model, a number of trial points when optimizing the Kriging model using LHS sampling at each iteration, and a maximum number of iterations may be specified where the population size defines the number of decision variable configurations to evaluate each iteration.

For illustration, the DIRECT search method is an implicit branch and bound type algorithm that divides a hyper-rectangle defined by variable bounds into progressively smaller rectangles where the relevance of a given rectangle is based on its diameter and the objective value at the center point. The former is used to quantify uncertainty, the latter is used to estimate the best value within. A pareto-set is maintained for these two quantities and used to select which of the hyper-rectangles to trisect at the next iteration. If the DIRECT search method is selected, an iteration size and a maximum number of iterations may be specified where the iteration size defines the number of decision variable configurations to evaluate each iteration. Additional information regarding an illustrative DIRECT search method can be found in D. R. Jones, C. D. Perttunen and B. E. Stuckman, "Lipschitzian Optimization without the Lipschitz Constant," Journal of Optimization Theory and Applications, Vol. 79, No. 1, 1993, pp. 157-181.

For illustration, the Nelder-Mead Simplex search method is a variable shape simplex direct-search optimization method that maintains the objective values of the vertices of a polytope whose number is one greater than the dimension being optimized. It then predicts new promising vertices for the simplex based on current values using a variety of simplex transformation operations. If the Nelder-Mead Simplex search method is selected, an iteration size and a maximum number of iterations may be specified where the iteration size defines the number of decision variable configurations to evaluate each iteration. Additional information regarding an illustrative Nelder-Mead Simplex search method can be found in J. A. Nelder and R. Mead, "A Simplex Method for Function Minimization," Computer Journal, Vol. 7, No. 4, 1965, pp. 308-313.

For illustration, the DIRECT/Nelder-Mead Hybrid search method is a tightly coupled hybrid algorithm that uses DIRECT principles to divide and sort the feasible regions into a set of hyper-rectangles of varying dimension based on likelihood of containing a global minimizer. As the hyper-rectangles are divided, the size of the rectangles as measured by the distance between its center and corners reduces. When this size is small enough, a Nelder-Mead optimization is created based on the small hyper-rectangle to further refine the search and the small hyper-rectangle is no longer considered for division. A best value found by a small hyper-rectangle's Nelder-Mead optimizer is used to represent that given rectangle. If the DIRECT/Nelder-Mead Hybrid search method is selected, an iteration size, a maximum number of iterations, and a rectangle size threshold value may be specified. The iteration size defines the number of decision variable configurations to evaluate each iteration. The rectangle size threshold value defines a threshold used to determine when the rectangle size is small enough to start Nelder-Mead optimization.

In an operation 528, a thirteenth indicator may be received that defines a cache tolerance value and a scaling factor value for each decision variable. The cache tolerance value is used to determine when a subsequent decision variable configuration is "close enough" to a previously executed configuration to not repeat execution with the subsequent decision variable configuration. The scaling factor value for each decision variable is used to scale the decision variables relative to each other. In an alternative embodiment, the thirteenth indicator may not be received. For example, default value may be stored, for example, in computer-readable medium 208 and used automatically. An illustrative default value for the cache tolerance value is 1 e-9. An illustrative default value for the scaling factor value for each decision variable is one. In another alternative embodiment, the cache tolerance value and the scaling factor value for each decision variable may not be selectable. Instead, fixed, predefined values may be used.

For illustration, the following statements request creation of a gradient boosting tree model type with the listed target variable and input variables included in the input dataset "mycaslib.dmagecr" with the results stored in "mycaslib.mymodel" where the tuning evaluation parameters include a population size of 5, a maximum of three iterations, the ASE objective function, the default search method, with the "ntrees" decision variable selected between 10 and 50 with an initial value of 10, with the "vars_to_try" decision variable selected as 4, 8, 12, 16, or 20 with an initial value of 4, and with the remaining decision variables for the gradient boosting tree model type using the default values:

proc gradboost data=mycaslib.dmagecr outmodel=mycaslib.mymodel;
   target good_bad/level=categorical;
   input checking duration history amount savings employed installp
     marital coapp resident property age other housing exister job
   depends telephon foreign/level=continuous;
   input purpose/level=categorical;
   autotune popsize=5 maxiter=3 objective=ASE
   tuningparameters=(
     ntrees(lb=10 ub=50 init=10)
     vars_to_try(values=4 8 12 16 20 init=4))
);

In an operation 530, the tuning evaluation parameters that may include the parameters indicated in operations 502 to 528 are made available to selection manager device 104. For example, the values of any of the parameters that are not default values may be sent to selection manager device 104. As another option, a location of the values of any of the parameters that are not default values may be sent to selection manager device 104.

In an operation 532, a tuning evaluation to select decision variables is requested of selection manager device 104 using the tuning evaluation parameters.

In an operation 534, tuning evaluation results are accessed. For example, an indicator may be received that indicates that the tuning process is complete. For example, one or more of the output tables may be presented on display 216 when the tuning process is complete. As another option, display 216 may present a statement indicating that the tuning process is complete. The user can then access the output tables in the specified location.

In an operation 536, the user can select decision variables from the accessed tuning evaluation results. For example, the user can select the decision variables included in the "Best Configuration" output table. As another option, the user can select a decision variable configuration included in the "Tuner Results" output table that is less complex, but provides a similar objective function value in comparison to the decision variables included in the "Best Configuration" output table.

In an operation 538, the selected decision variables may be used to score second dataset 1524 with selected model data 320.

Figure 6A:
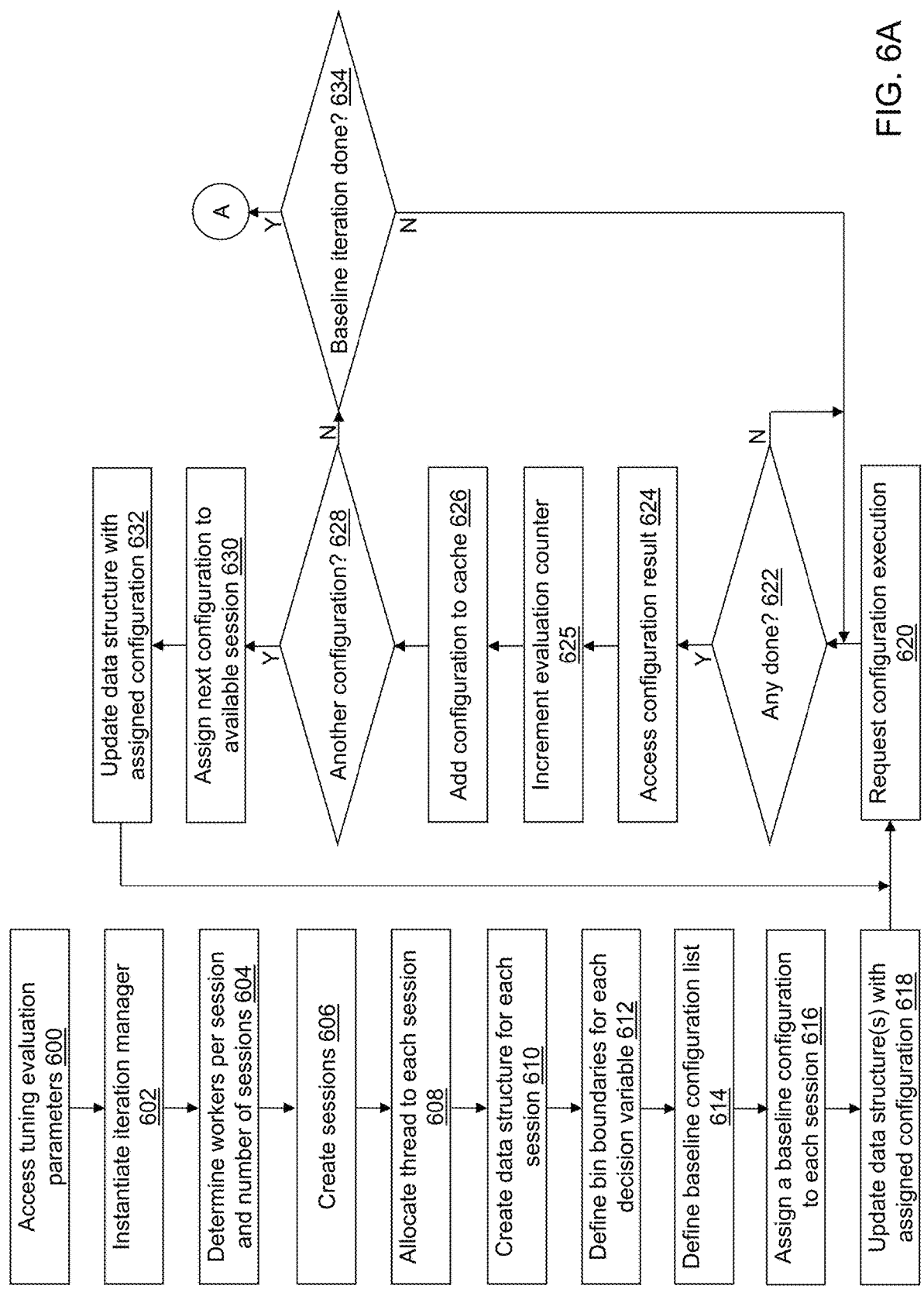
FIGS. 6A to 6C and 7 depict a flow diagram illustrating examples of operations performed by the selection manager device of FIG. 3 in accordance with an illustrative embodiment.
Figure 6B:
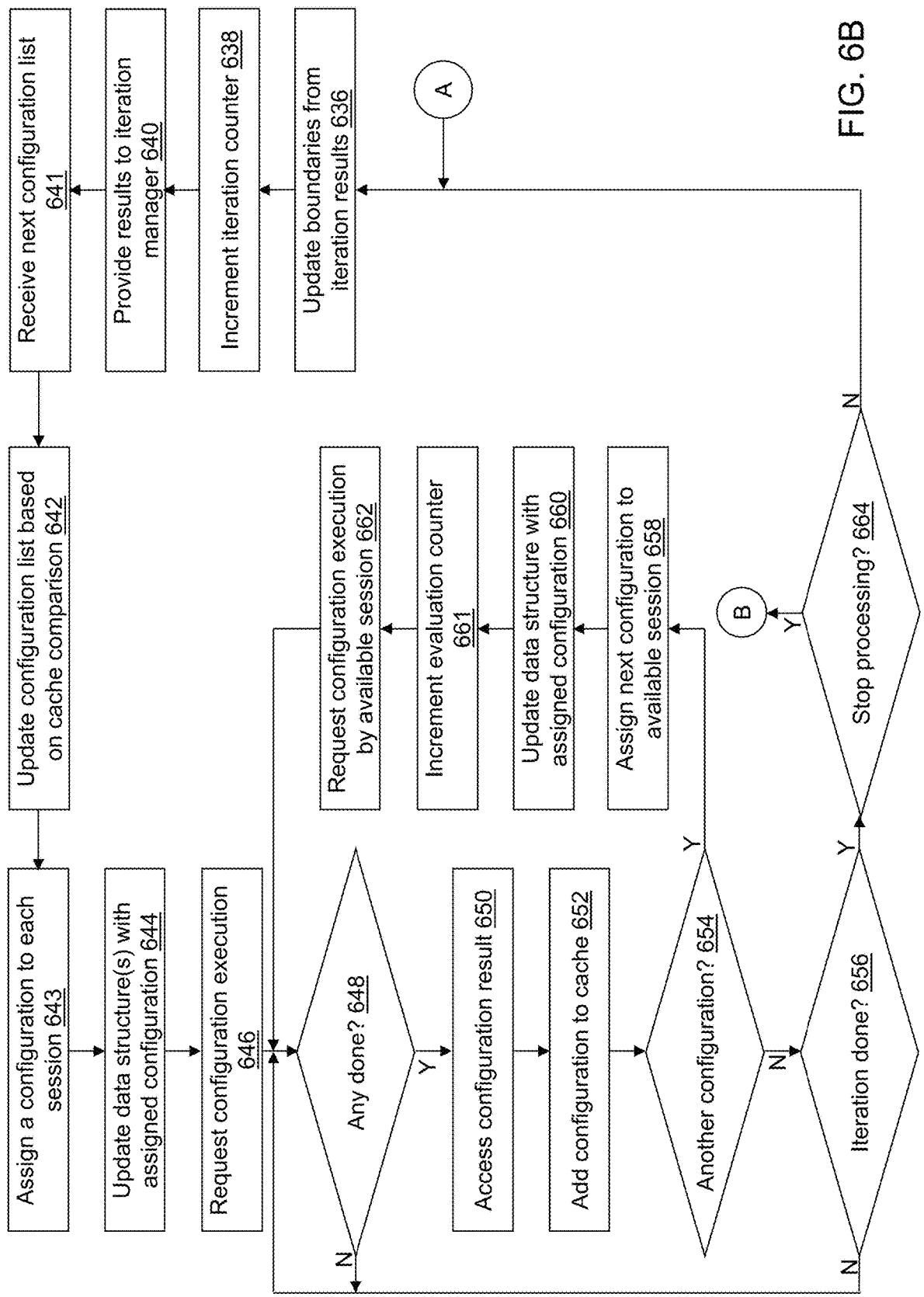
Figure 6C:
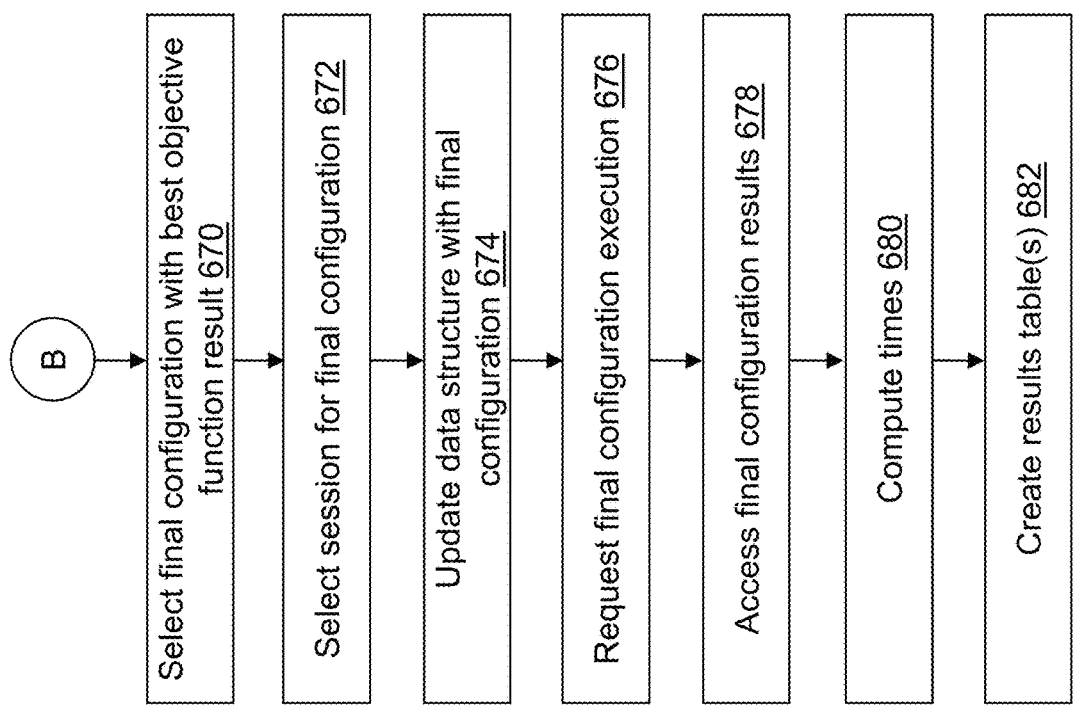

Referring to FIGS. 6A, 6B, and 6C, example operations associated with selection manager application 312 are described. Additional, fewer, or different operations may be performed depending on the embodiment. The order of presentation of the operations of FIGS. 6A, 6B, and 6C is not intended to be limiting. Selection manager device 104 establishes communication with the computing devices of worker system 106, sends instructions to each session manager device 400 associated with each session established by selection manager device 104, collects and aggregates the results of computations from each session, and communicates final results to user device 200. Selection manager device 104 may utilize itself as a worker computing device of worker system 106. The computing devices of worker system 106 receive instructions from selection manager device 104, store and process data, and send the results of computations back to selection manager device 104 under control of each session manager device 400 of each session. Worker computing devices of each session may also communicate to each other directly to complete tasks.

In an operation 600, tuning evaluation parameters obtained by model tuning application 222 are accessed. For example, values for parameters indicated in operations 502 to 528 and made available to selection manager device 104 in operation 530 are accessed.

In an operation 602, iteration manager 314 is instantiated. Iteration manager 314 determines the configuration list each iteration that includes a set of decision variable configurations to evaluate as described further below. Again, a decision variable configuration includes a value for each decision variable to evaluate based on the selected model type. A set of decision variable configurations includes a plurality of decision variable configurations selected for evaluation before a next set of decision variable configurations is selected for evaluation based on the tuning search method(s) and the objective function values computed for each decision variable configuration.

In an operation 604, the number of workers per session M and the number of sessions $N_s$ are determined. For example, when the second indicator specifies $N_s$, that value is used for the number of sessions, or when the second indicator specifies M, that value is used for the number of workers per session. If W is equal to all of the workers that are connected to selection manager device 104 and there are at least 16 worker computing devices included in worker system 106, $N_s$ may be limited to eight so that the number of workers per session M is at least two. Optionally, the second indicator may indicate that M is set based on a size of the input dataset. For example, M may be set based on a number of rows r and a number of columns c of the input dataset and a distribution factor d. For illustration, M=1+rcd. An illustrative value of $d=2e^{-8}$ may be used so that another session worker device 420 is added to each session for every 50 million data values. The value of d may be selected by a user of user device 200. The number of columns c further may be the number of variables to use indicated in operation 508 instead of a total number of columns.

$N_s$ may be determined as either one less than a population size specified for the GA tuning search method or the Bayesian search method because one decision variable configuration is carried forward each iteration. The best point is carried forward so that if the next iteration does not find an improvement, the returned set of evaluations still includes the current best for consideration in generating the next iteration of decision variable configurations. If the GSS tuning search method is selected, twice the number of decision variables is added to the value of N. For the LHS, Grid, or Random tuning search methods, $N_s$ is determined as one less than a sample size. $N_s$ may then be limited by a configuration of selection manager device 104. When selection manager device 104 is configured in single-machine mode and $N_s$ is greater than four and not specified by the second indicator, $N_s$ is limited to four. When selection manager device 104 is configured in single-machine mode and $N_s$ is specified by the second indicator, $N_s$ may be limited to 32 or a number of threads of selection manager device 104. When selection manager device 104 is configured in distributed mode, and $N_s$ is not specified by the second indicator, $N_s \leq W/M$ may be used. When selection manager device 104 is configured in distributed mode and n is specified by the second indicator, $N_s \leq 2W/M$ may be applied.

For illustration, if a population size specified for a GA search method is ten, even if W=100 and M=2 based on a size of the input dataset, $N_s$=10 instead of $N_s$=50 because the GA population size (number of decision variable configurations created each iteration by the GA search method) limits the number of decision variable configurations created. The user could increase the population size of the GA search method to allow evaluation of more decision variable configurations each iteration, if not limited by an administrator. For example, an administrator may define limits so that no single user can use all of the computing devices of worker system 106.

When $N_s$ is greater than one and M is equal to one, selection manager application 312 is executed in a model parallel mode; when M is greater than one and $N_s$ is equal to one, selection manager application 312 is executed in a data parallel mode; and when both M and $N_s$ are greater than one, selection manager application 312 is executed in a data and model parallel mode. In an automatic mode, $N_s$ may be selected to be as large as possible with M as small as possible subject to the size of the input dataset because model parallel is more efficient than data parallel.

In an operation 606, the number of sessions $N_s$ are created to include the number of workers per session M with session manager device 400 selected for each created session.

In an operation 608, a thread is allocated from an available thread pool to each created session. The allocated threads each manage the communications between selection manager device 104 and each session manager device 400.

In an operation 610, a data structure is created for each session through which each session is notified of the input dataset, of the decision variable values for the assigned decision variable configuration, of the model type to train and score, and of other input values for the model type. An illustrative data structure includes a thread identifier that links the data structure to each thread, a session handle for the thread, a parameter list for training with the model type, a data filter for the training dataset based on whether the training mode is using cross validation or a single partition, the decision variable values assigned to the thread, a pruning parameter list when a decision tree model type is used, a parameter list for scoring with the model type, a data filter for the validation dataset based on whether the training mode is using cross validation or a single partition, a training time, a scoring time, a total time, a format link, a completion indicator, a number of folds completed indicator, and an extension for reading results. The session handle contains information about the session that was started in a new process to run actions. The training time, the scoring time, the total time, and the completion indicator may be set by session manager device 400 when the evaluation is complete. The format link is added to each data structure if formats were used to define how data is read from the input dataset and is a link to a list of formats defined by the user using model tuning application 222. For example, the user may have specified a variable order and a data type for each variable in operation 508 that is passed to session manager device 400.

In an operation 612, bin boundaries are defined for each decision variable based on the number of bins $n_b$ indicated in operation 518. For example, when the lower bound value and the upper bound value is defined for a decision variable and $n_b$=1, there is a single bin with bin boundaries defined by the lower bound value $l_b$ and the upper bound value $u_b$ defined for a respective decision variable. When the lower bound value and the upper bound value is defined for a decision variable and $n_b$>1, bin boundaries are defined starting with the lower bound value $l_b$ and successively adding $(u_b-l_b)/n_b$ until the upper bound value $u_b$ is reached for the respective decision variable. When a list of possible values is defined for a decision variable and $n_b$=1, there is a single bin with bin boundaries defined using a first list value as the lower bound value $l_b$ and a last list value as the upper bound value $u_b$ for a respective decision variable. When a list of possible values is defined for a decision variable and $n_b$>1, bin boundaries are defined starting with the first list value and ending with the last list value and including a number of intermediate list values selected based on a number of values of the list of possible values divided by $n_b$.

In an operation 614, a baseline configuration list is defined that includes a number of configurations $n_c$ determined, for example, using $n_c = n_{dve} * n_b$, where $n_{dve}$ is a number of the decision variables for which more than one value is to be evaluated based on the possible values indicated in operation 516. In an illustrative embodiment, the number of configurations $n_c$ and the defined bin boundaries for each decision variable are provided to iteration manager 314. Iteration manager 314 determines a first set of decision variable configurations to evaluate in a baseline iteration. Again, each decision variable configuration includes a specific value for each decision variable based on the selected model type. For example, iteration manager 314 executes a first tuning search method of the tuning search method specified in operation 526 and returns the list. For illustration, the LHS, the Random, and/or the Grid search methods may be used to define the baseline configuration list.

In an operation 616, each decision variable configuration is selected from baseline configuration list and assigned to a session. For example, if the model type is support vector machine, a first value for the penalty parameter C and a second value for the degree parameter is assigned as a pair to a session with different values for the pair assigned to different sessions. Iteration manager 314 defined the pair of values for each decision variable configuration included in the baseline configuration list.

In an operation 618, the data structure associated with the selected session is loaded with the assigned decision variable configuration. For example, the parameter list for training with the model type, the data filter for the training dataset, the assigned decision variable values, optionally the pruning parameter list, the parameter list for scoring with the model type, etc. are defined in the data structure linked to the selected session.

In an operation 620, a request is sent to each session manager device 400 to execute model manager application 412 and/or model worker application 432 with the assigned decision variable configuration included in the created data structure. Separate train and score requests may be made. If cross validation is performed, there may be multiple train and score requests based on a number of folds.

In an operation 622, a determination is made concerning whether any execution is done. For example, session manager device 400 may set the completion indicator to indicate done in the data structure associated with it. If no execution is done, processing continues in operation 622 until indication that a session is done is received. If any execution is done, processing continues in an operation 624. For illustration, selection manager device 104 loops through each of its thread handles, checking to see if that particular thread is busy or free. When a session finishes evaluating its assigned decision variable configuration, session manager device 400 returns the computed values back to selection manager device 104 and sets its completion indicator indicating that it is free to receive a new decision variable configuration for evaluation.

In an operation 624, results generated by the now free session are accessed. For example, the objective function value is received that was computed for the assigned decision variable configuration.

In an operation 625, an evaluation counter e may be incremented by one using e=e+1. The evaluation counter e may have been initialized to zero before operation 620. An iteration counter k also may have been initialized using k=0 before operation 620.

In an operation 626, the decision variable configuration and the configuration results are stored in evaluation cache 316 and in model data 318.

In an operation 628, a determination is made concerning whether the baseline configuration list includes another decision variable configuration to evaluate that has not been assigned to a session. If the baseline configuration list includes another decision variable configuration to evaluate, processing continues in an operation 630. If the baseline configuration list does not include another decision variable configuration to evaluate, processing continues in an operation 634.

In operation 630, a next decision variable configuration is selected from the baseline configuration list and assigned to the now free session.

In an operation 632, the data structure associated with the now free session is loaded with the next assigned decision variable configuration, and processing continues in operation 620 to request that session manager device 400 associated with the now free session execute model manager application 412 and/or model worker application 432 with the decision variable configuration included in the data structure.

In operation 634, a determination is made concerning whether the baseline iteration is done such that each decision variable configuration on the baseline configuration list has been evaluated. If the iteration is done, processing continues in an operation 636 shown referring to FIG. 6B. If the iteration is not done, processing continues in operation 622 to continue to wait for sessions to complete execution with their assigned decision variable configuration.

Referring to FIG. 6B, in operation 636, the boundaries are updated for each decision variable based on the iteration results that includes the objective function value computed for each decision variable configuration included in the most recently executed configuration list. For example, the boundaries are updated referring to the operations of FIG. 7 described further below. When $n_b=1$, operation 636 may be skipped after operation 634 because the baseline configuration list includes a single baseline decision variable configuration. On a first iteration of operation 636 when $n_b>1$, the most recently executed configuration list is the baseline configuration list that may be called iteration zero when k=0; on a second iteration of operation 636, the most recently executed configuration list is the configuration list processed as part of the first iteration when k=1; on a third iteration of operation 636, the most recently executed configuration list is the configuration list processed as part of the second iteration when k=2; and so on.

In an operation 638, the iteration counter is incremented, for example using k=k+1.

In an operation 640, the iteration results and the updated boundaries for each decision variable are provided to iteration manager 314. Based on the results and decision variables, iteration manager 314 determines a next set of decision variable configurations to evaluate in a next iteration. Again, each decision variable configuration includes a specific value for each decision variable based on the selected model type. For example, iteration manager 314 executes a next tuning search method of the tuning search method specified in operation 526. Alternatively, multiple tuning search methods may be executed concurrently such that iteration manager 314 executes each tuning search method to determine a set of decision variables that are combined to define the next set of decision variable configurations.

The best model decision variable configurations from the previous iteration are used to generate the next population of decision variable configurations to evaluate with the selected mode type. If multiple search methods are running concurrently, the results from all of the decision variable configurations included in the next configuration list as part of the current iteration are used to determine the next population irrespective of whether that search method requested evaluation of a specific decision variable configuration. This process is repeated for remaining iterations based on the search method(s) chosen. In this manner, a search method gains information based on one or more decision variable configurations generated by another search method.

For example, iteration manager 314 executes a next tuning search method of the tuning search method specified in operation 526. For illustration, after a first iteration, a GA search method and/or a Bayesian search method may be used by iteration manager 314 to determine the next set of decision variable configurations. Each population of the GA search method may be enhanced with a "growth step" in which a GSS is used to locally improve some of the more promising members of the GA population.

Iteration manager 314 makes sure that all of the computing devices of worker system 106 are used as efficiently as possible by balancing the workload across the available computing devices of worker system 106 thereby reducing a computation time for the decision variable configurations selected by each search method.

In an operation 641, a next configuration list associated with the iteration counter is received that includes a new set of decision variable configurations generated by iteration manager 314.

In an operation 642, the next configuration list is updated based on a comparison of each decision variable configuration included in the next configuration list with each decision variable configuration included in evaluation cache 316, and processing continues in an operation 643 to evaluate the remaining decision variable configurations included in the next configuration list for the next iteration. For example, each decision variable configuration in the next configuration list is compared to previously evaluated decision variable configurations to determine if they are "close enough" to decision variable configuration values that have already been evaluated, where "close enough" is evaluated based on the cache tolerance value. If so, the decision variable configuration is removed from the next configuration list to avoid expending computing resources reevaluating a too similar decision variable configuration.

In operation 643, each decision variable configuration is selected from the next configuration list and assigned to a session.

In an operation 644, the data structure associated with the selected session is loaded with the assigned decision variable configuration.

In an operation 646, a request is sent to each session manager device 400 to execute model manager application 412 and/or model worker application 432 with the assigned decision variable configuration included in the created data structure.

In an operation 648, a determination is made concerning whether any execution is done. If any execution is done, processing continues in an operation 650. Otherwise, processing continues in operation 648 to continue to wait for a completed execution.

In operation 650, results generated by the now free session are accessed.

In an operation 652, the decision variable configuration and the configuration results are stored in evaluation cache 316 and in model data 318.

In an operation 654, a determination is made concerning whether the next configuration list includes another decision variable configuration to evaluate that has not been assigned to a session. If the next configuration list includes another decision variable configuration to evaluate, processing continues in an operation 658. If the next configuration list does not include another decision variable configuration to evaluate, processing continues in an operation 656.

In operation 656, a determination is made concerning whether the iteration is done such that each decision variable configuration on the next configuration list has been evaluated. If the iteration is done, processing continues in an operation 664. If the iteration is not done, processing continues in operation 648 to continue to wait for sessions to complete execution with their assigned decision variable configuration.

In operation 658, a next decision variable configuration is selected from the next configuration list and assigned to the now free session.

In an operation 660, the data structure associated with the now free session is loaded with the next assigned decision variable configuration.

In an operation 661, the evaluation counter e may be incremented using e=e+1.

In an operation 662, a request is sent to session manager device 400 associated with the now free session to execute model manager application 412 and/or model worker application 432 with the decision variable configuration included in the data structure, and processing continues in operation 648 to continue to monitor for sessions that have completed their assigned decision variable configuration evaluation.

In operation 664, a determination is made concerning whether processing should be stopped. If processing should be stopped, processing continues in an operation 670 shown referring to FIG. 6C. If processing should not be stopped, processing continues in operation 636. For example, processing is terminated when a maximum number of iterations have been performed, when a maximum number of decision variable configuration evaluations have been performed, when a maximum time (computing time or wall clock time) has been exceeded, etc. As another option, processing is terminated if the current tuning search method(s) have each completed based on the parameters defined for each search method in operation 526. For example, a maximum number of iterations may have been exceeded by each of the current tuning search method(s).

Referring to FIG. 6C, in operation 670, a final decision variable configuration is selected based on the decision variable configuration that generated the best objective function value. When the objective function is a measure of error, the decision variable configuration associated with a lowest objective function values is selected. When the objective function is a measure of accuracy, the decision variable configuration associated with a highest objective function values is selected.

In an operation 672, a session is selected to execute the final decision variable configuration.

In an operation 674, the data structure associated with the selected session is updated with the final decision variable configuration.

In an operation 676, the selected session is requested to execute the final decision variable configuration based on the parameter values in the data structure.

In an operation 678, results generated from the final decision variable configuration are accessed. Characteristics that define the trained model using the final decision variable configuration may be provided back to the main thread on which selection manager application 312 is instantiated. For example, the ASTORE procedure may be used to store the trained model for use in predicting a target value for a new observation vector included in new data such as second dataset 1524.

In an operation 680, computation times used to perform the decision variable tuning are computed for example, using the training time, the scoring time, and the total time included in the data structure associated with each session manager device 400 that contains times for the model train and score executions for that session. The wall clock time may also be computed for each iteration and/or evaluation.

In an operation 682, results tables are created. For example, the results tables indicated in operation 510 are created and returned to or otherwise made accessible by user device 200.

Figure 7:
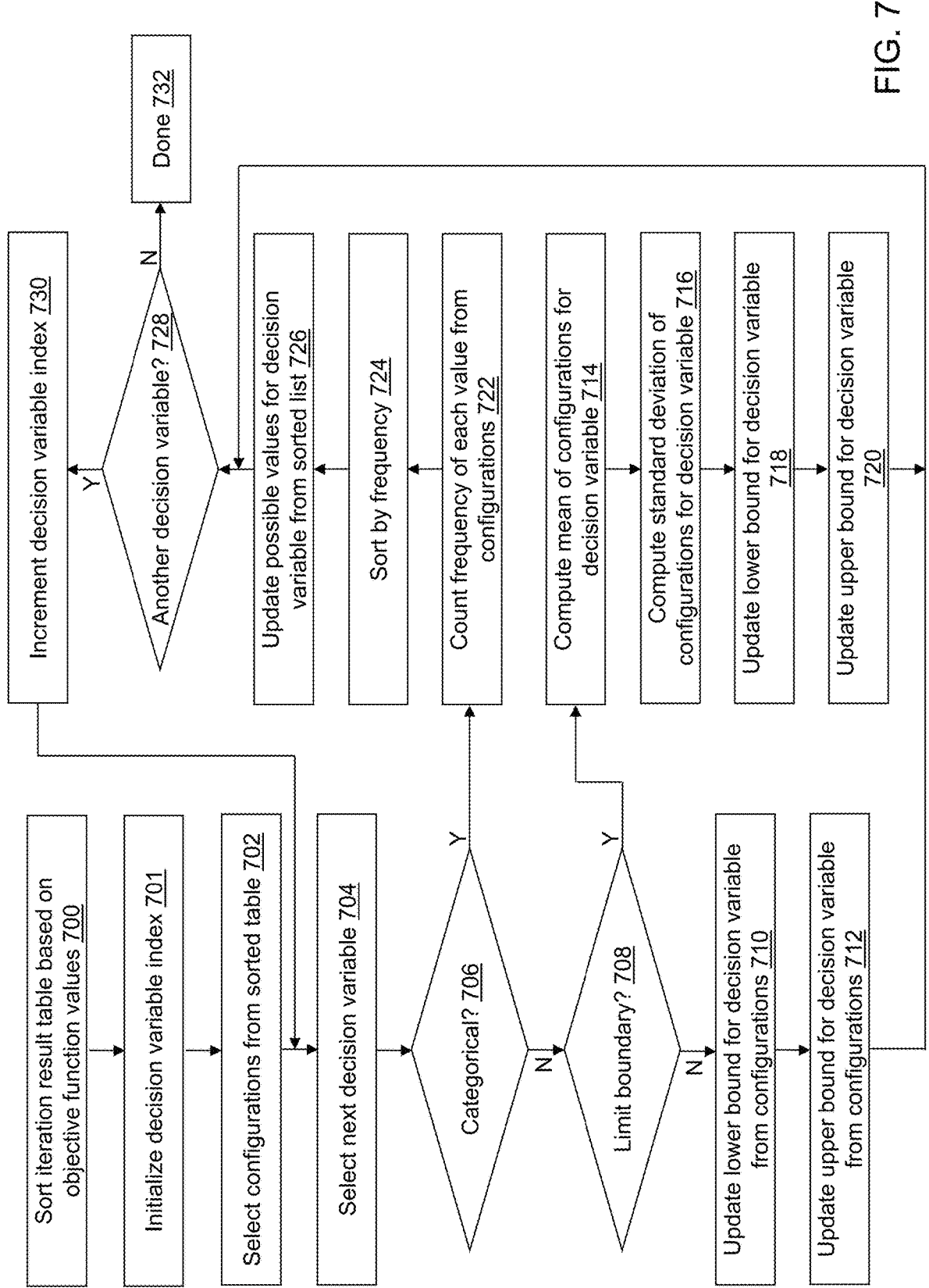

Referring to FIG. 7, example operations associated with selection manager application 312 in updating decision variable boundaries in operation 636 are described. Additional, fewer, or different operations may be performed depending on the embodiment. The order of presentation of the operations of to FIG. 7 is not intended to be limiting.

In an operation 700, the iterations results are sorted based on the objective function value. The iteration results include each decision variable configuration and the resulting objective function value computed for each decision variable configuration included in the most recently executed configuration list. For example, the iteration results may be stored in a table $C_k$ defined for each iteration $$C_k = \begin{bmatrix} z_{1,1}^k & \cdots & f(Z_1^k) \\ \vdots & \ddots & \vdots \\ z_{n_k,1}^k & \cdots & f(Z_{n_k}^k) \end{bmatrix}$$

where k is the iteration counter, $n_k$ is a number of decision variable configurations included in the most recently executed configuration list, $Z_j^k$, j=1, . . . , $n_k$ is a $j^{th}$ decision variable configuration, $Z_j^k = z_{j,i}^k$, i=1, . . . , $n_{dv}$, j=1, . . . , $n_k$, $z_{j,i}^k$ is an $i^{th}$ decision variable value for the $j^{th}$ decision variable configuration, $n_{dv}$ is a number of decision variables, $f(Z_j^k)$, j=1, . . . , $n_k$ is the $j^{th}$ objective function value computed using the $j^{th}$ decision variable configuration. When the objective function is a measure of error, the iteration results are sorted in increasing order such that $f(Z_1^k)$ is a minimum objective function value of $f(Z_j^k)$, j=1, . . . , $n_k$. When the objective function is a measure of accuracy, the iteration results are sorted in decreasing order such that $f(Z_1^k)$ is a maximum objective function value of $f(Z_j^k)$, $j=1, \ldots, n_k$.

In an operation 701, a decision variable index i is initialized to one using i=1.

In an operation 702, the selection number m of the "best" decision variable configurations selected from the sorted table. For example, the $Z_j^k$, $j=1, \ldots, m$ decision variable configurations are selected from $C_k$ after sorting $C_k$ based on the objective function value, where m is the selection number defined in operation 518.

In an operation 704, a next decision variable is selected from the $n_{dv}$ number of decision variables, for example, using $z_i$.

In an operation 706, a determination is made concerning whether $z_i$ has a categorical variable type. If $z_i$ has a categorical variable type, processing continues in an operation 722. If $z_i$ is not a categorical variable type, processing continues in an operation 708. For example, $z_i$ may have been defined as having the categorical variable type in operation 516. As another example, $z_i$ may be determined to have the categorical variable type when $(u_i^k - l_i^k) < c$, where $u_i^k$ is a current upper boundary value for the next decision variable for the just processed iteration k, $l_i^k$ is a current lower boundary value for the next decision variable for the just processed iteration k, and c is the categorical definition value defined in operation 518.

In an operation 708, a determination is made concerning whether the limit boundary flag $f_b$ is true, where $f_b$ is the limit boundary flag defined in operation 518. If $f_b$ is true, processing continues in an operation 714. If $f_b$ is not true, processing continues in an operation 710.

In operation 710, the lower boundary value for the next decision variable is updated for the next iteration, for example, using $$l_i^{k+1} = \min_{1 \le j \le m} z_{j,i}^k.$$

In an operation 712, the upper boundary value for the next decision variable is updated for the next iteration, for example, using $$u_i^{k+1} = \max_{1 \le j \le m} z_{j,i}^k,$$

and processing continues in an operation 728.

In operation 714, a mean µ of the decision variable values for the next decision variable is computed using $$\mu = \frac{1}{m} \sum_{j=1}^{m} z_{j,i}^k.$$

In an operation 716, a standard deviation σ of the decision variable values for the next decision variable is computed using $$\sigma = \sqrt{\frac{1}{m-1} \sum_{j=1}^{m} (z_{j,i}^k - \mu)^2}.$$

In operation 718, the lower boundary value for the next decision variable is updated for the next iteration, for example, using $l_i^{k+1} = \min(l_i^k, \mu - n_o \sigma)$, where $n_o$ is the number of standard deviations to limit the boundary defined in operation 518.

In an operation 720, the upper boundary value for the next decision variable is updated for the next iteration, for example, using $u_i^{k+1} = \min(u_i^k, \mu + n_o \sigma)$, and processing continues in operation 728.

In operation 722, a frequency of occurrence of each decision variable value $z_{j,i}^k$, $j=1, \ldots, m$ is counted. For example, the possible values of $z_i^k$ may be $z_i^k \in \{a, b, c, d, e, f, g\}$. The frequency of occurrence may be $\{(a, 5), (b, 1), (c, 8), (d, 7), (e, 0), (f, 4), (g, 0)\}$, where m=25. For categorical variables, the use of a maximum value, a minimum value, a mean value, and a standard deviation value have no true meaning. Instead, frequency counts for each categorical variable value are used to define the pair of a decision variable value and a number of times the value was included.

In an operation 724, the frequency of occurrence is sorted from most frequent to least frequent. For example, the sorted frequency of occurrence may be $\{(c, 8), (d, 7), (a, 5), (f, 4), (b, 1), (e, 0), (g, 0)\}$.

In an operation 726, the possible values for $z_i^k$ may be limited to the first $n_c$ entries selected from the sorted frequency of occurrence, where $n_c$ is the number of categorical values defined in operation 518. When $n_c=0$, the possible values for $z_i^k$ may be any of the values associated with a non-zero frequency of occurrence. For example, when $n_c=3$, the possible values for $z_i^{k+1} \in \{c, d, a\}$. For example, when $n_c=0$, the possible values for $z_i^{k+1} \in \{c, d, a, f, b\}$.

In operation 728, a determination is made concerning whether there is another decision variable to process. When $i < n_{dv}$, processing continues in an operation 730. If $i \ge n_{dv}$, processing continues in an operation 732.

In operation 730, the decision variable index i is incremented, for example, using i=i+1, and processing continues in operation 704 to update the upper and lower boundaries for the next decision variable.

In operation 732, processing is done, and upper and lower boundaries for the decision variables have been updated and processing continues in operation 638.

Figure 8:
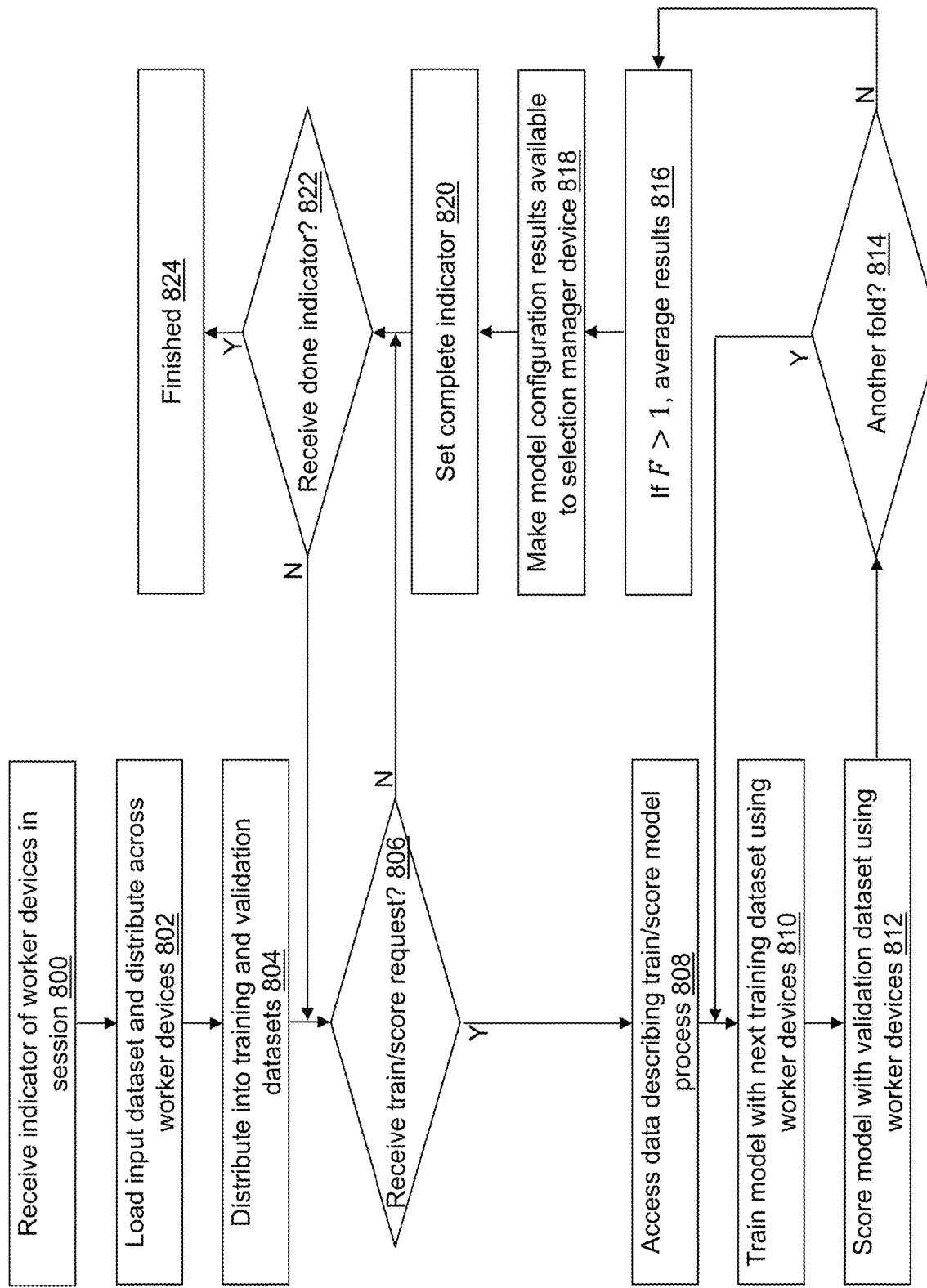
FIG. 8 depicts a flow diagram illustrating examples of operations performed by the session manager device of FIG. 4 in accordance with an illustrative embodiment.

Referring to FIG. 8, example operations associated with model manager application 412 are described. Additional, fewer, or different operations may be performed depending on the embodiment. The order of presentation of the operations of FIG. 8 is not intended to be limiting.

In an operation 800, an indicator of worker devices in the session to which session manager device 400 is assigned is received from selection manager device 104.

In an operation 802, the input dataset is loaded and distributed across the computing devices of the session such that each computing device is loaded with a portion of the input dataset.

In an operation 804, the portion of the input dataset distributed to each computing device of the session is distributed into training dataset subset 434 and validation dataset subset 436 at each session worker device 420 of the session and optionally into training dataset subset 414 and validation dataset subset 416 at session manager device 400. The distribution is based on whether a single partition between training dataset subset 434 and validation dataset subset 436 is created or whether k-folds or partitions are used to form a plurality of training dataset subsets 434 and validation dataset subset 436.

For example, session manager device 400 may request that each session worker device 420 create training dataset subset 434 and validation dataset subset 436 as a single-partition based on the fraction value indicated in operation 524 such that F=1. In this process, session manager device 400 may also partition its portion of the input dataset into training dataset subset 414 and validation dataset subset 416. For illustration, if fraction value is 0.3 or 30%, 30% of the observation vectors in the portion of the input dataset at each session worker device 420 of the session is extracted to create validation dataset subset 436 and the remaining 70% of the observation vectors in the portion of the input dataset at each session worker device 420 of the session forms training dataset subset 434. Similarly, if session manager device 400 also hosts a portion of the input dataset, 30% of the observation vectors in the portion of the input dataset at session manager device 400 is extracted to create validation dataset subset 416 and the remaining 70% of the observation vectors in the portion of the input dataset at session manager device 400 forms training dataset subset 414.

When F>1, the portion of the input dataset distributed to each computing device of the session is distributed into a plurality of training dataset subsets 434 and into validation dataset subset 436 at each session worker device 420 of the session and optionally into a plurality of training dataset subsets 414 and into validation dataset subset 416 at session manager device 400. For example, session manager device 400 may request that each session worker device 420 create training dataset subsets 434 and validation dataset subset 436 from multiple partitions based on the number of folds F defined for cross-validation and indicated in operation 510. F−1 partitions form F−1 training dataset subsets 434 with the remaining partition forming validation dataset subset 436.

In an operation 806, a determination is made concerning whether a train/score request is received from selection manager device 104. If a train/score request is received, processing continues in an operation 808. If a train/score request is not received, processing continues in operation 822.

In operation 808, the data describing the train model process including the decision variable configuration is accessed. For example, data in the data structure associated with the thread is accessed.

In an operation 810, the model type is trained using the decision variable configuration accessed and training dataset subset 434 at each session worker device 420 and optionally training dataset subset 414 at session manager device 400. As discussed previously, using cross validation, each model evaluation requires F−1 training and scoring executions with different training dataset subsets. For example, if the number of folds value F=4, each session worker device 420 partitions its portion of the input dataset into four subsets A, B, C, D. For a first execution loop, a first partition (e.g., A) is selected to form a first training dataset subset 434 at each session worker device 420 with a fourth partition D selected to form validation dataset subset 436. For a second execution loop, a second partition (e.g., B) is selected to form a second training dataset subset 434 at each session worker device 420 with the fourth partition D again forming validation dataset subset 436. For a third execution loop, a third partition (e.g., C) is selected to form a third training dataset subset 434 at each session worker device 420 with the fourth partition D again forming validation dataset subset 436. Thus, the training and scoring process is repeated F−1 times with different training datasets used to define the trained model and the same validation dataset used to determine scoring performance. The partitions may similarly be formed at session manager device 400 if a portion of the input dataset is stored to computer-readable medium 208. As a result, when F>1, a first iteration of operation 810 after receipt of the train/score request, selects the first partition; a second iteration of operation 810 after receipt of the train/score request, selects the second partition; and so on up to the F−1th partition is processed.

In an operation 812, the trained model is scored using the decision variable configuration accessed, the trained model defined in operation 810, and validation dataset subset 436 at each session worker device 420 and optionally validation dataset subset 416 at session manager device 400 to determine one or more objective function values based on the objective function indicated in operation 522.

In an operation 814, a determination is made concerning whether the F−1 folds have been processed. If the F−1 folds have been processed, processing continues in an operation 816. If the F−1 folds have not been processed, processing continues in operation 810 to process the next partition of training dataset subset 434 and optionally training dataset subset 414.

In operation 816, if F>1, the objective function values computed for each partition are averaged to obtain a single objective function value.

In an operation 818, the model configuration results are made available to selection manager device 104, for example, by including them in the data structure and/or updating a globally accessible table and/or storing them in model configuration data 418.

In an operation 820, the completion indicator of the data structure is set to notify selection manager device 104 that processing of the decision variable configuration is complete.

In operation 822, a determination is made concerning whether a finished indicator is received from selection manager device 104. If the finished indicator is received, processing continues in an operation 824. If the finished indicator is not received, processing continues in operation 806 to await receipt of another request from selection manager device 104.

In operation 824, processing is finished.

To demonstrate the effectiveness of model tuning application 222 using initial bins and bounds updated each iteration for each decision variable, a first experiment was performed that optimized the hyperparameters of a machine learning model such that the decision variables are the hyperparameters of a Gaussian process model type using a gpReg action set of SAS® Visual Data Mining and Machine Learning. Gaussian process modeling may be used to solve regression problems. The input data was an "Abalone" dataset used to predict an age of abalone from physical measurements. The "Abalone" dataset includes 8 variables and 4177 observation vectors. The objective function used was a root mean square error (RMSE) so the smaller the value, the better the model performance.

Figure 12:
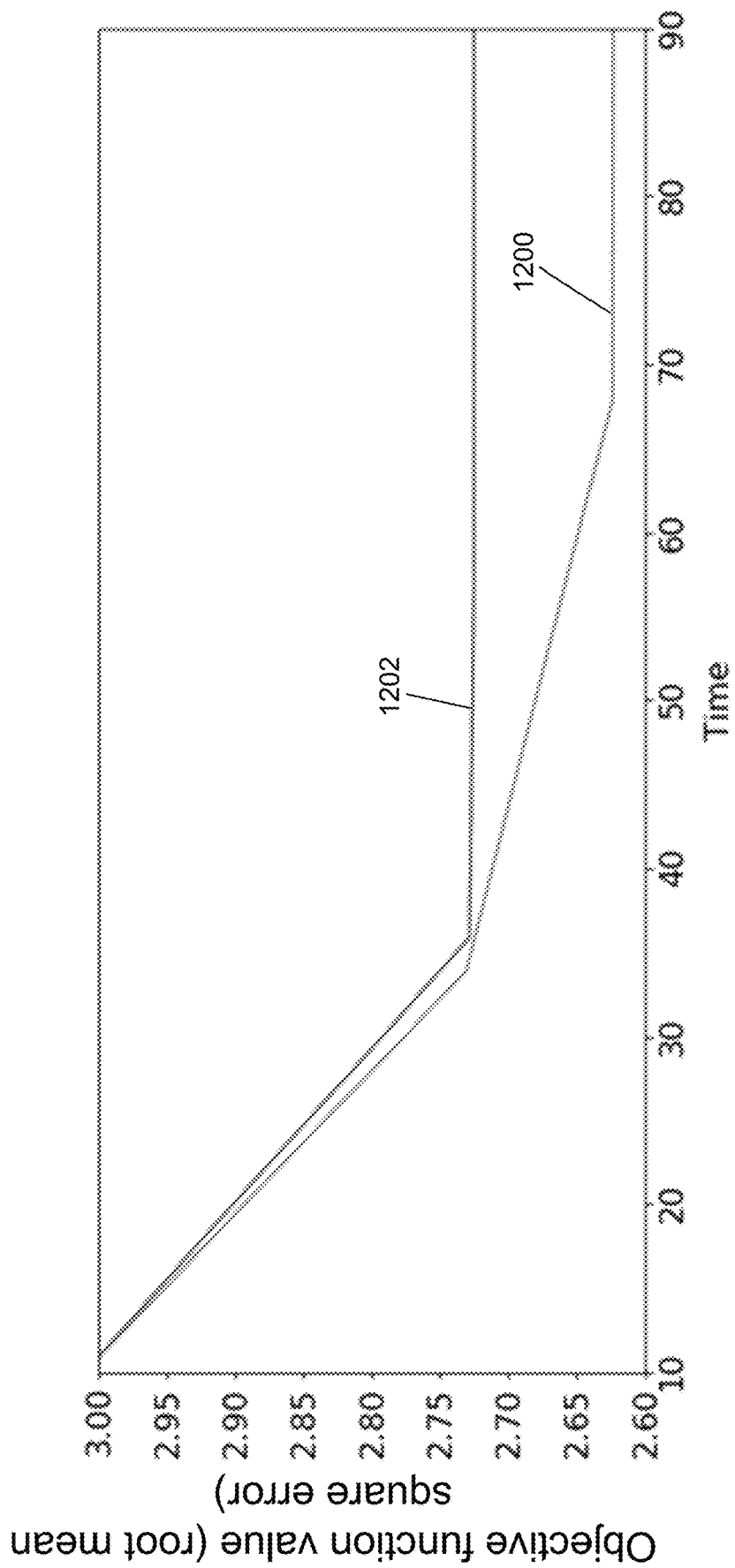
FIG. 12 shows a best objective function value computed for a first dataset as a function of time by the decision variable selection system of FIG. 1 without binning in accordance with an illustrative embodiment.

Referring to FIG. 12, a first curve 1200 shows a RMSE as a function of wall clock time while executing model tuning application 222 using $n_b$=1 and bounds updated each iteration for each decision variable with the "Abalone" dataset. A second curve 1202 shows the RMSE as a function of wall clock time while executing an existing model tuning application without binning or bounding. At about a 68 second wall clock time, first curve 1200 drops well below second curve 1202 showing that model tuning application 222 using $n_b$=1 and bounds updated each iteration for each decision variable achieves an RMSE error of ~2.62% compared to ~2.73% for the existing model tuning application.

Figure 13A:
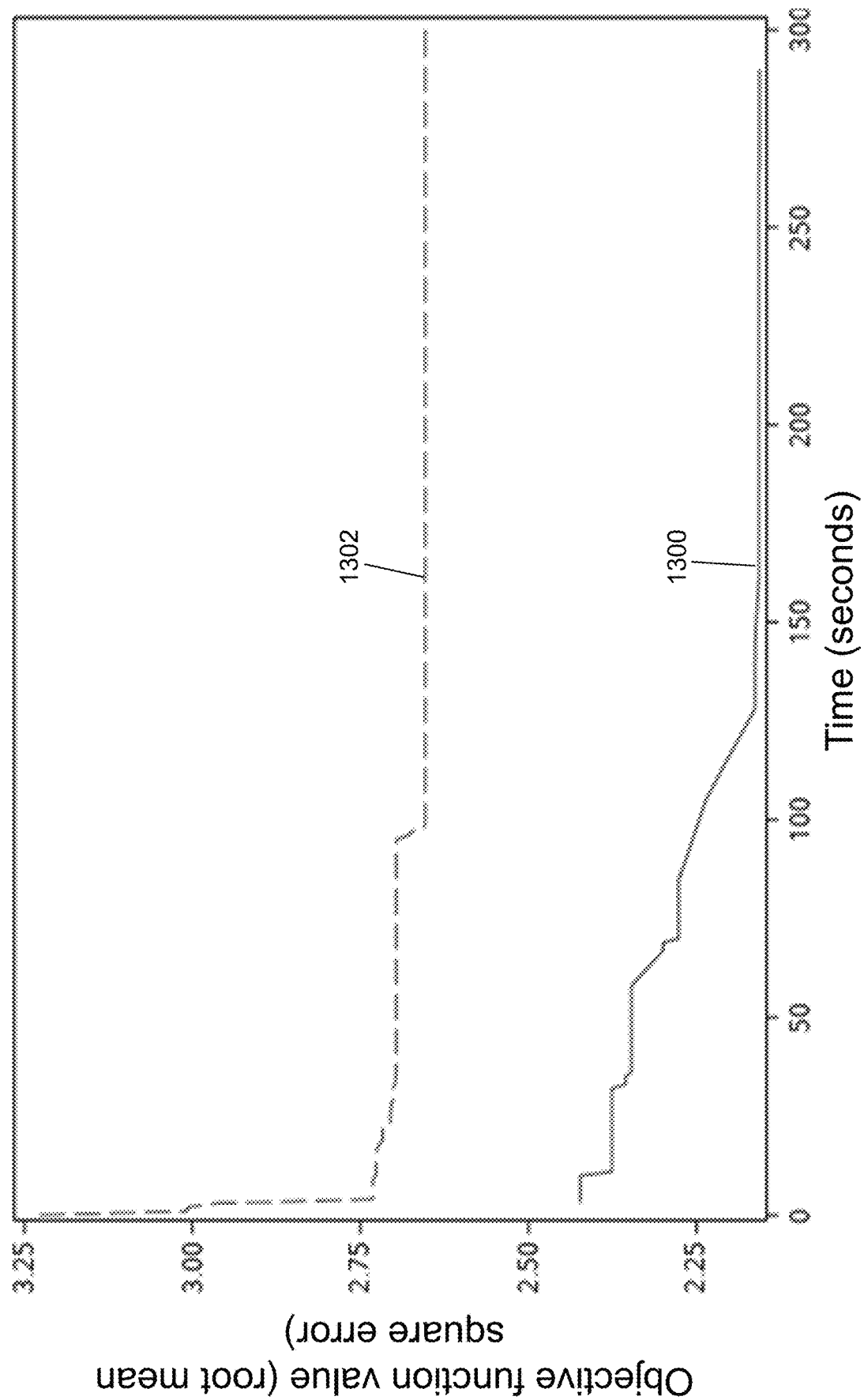
FIG. 13A shows a best objective function value computed for the first dataset as a function of time by the decision variable selection system of FIG. 1 with binning in accordance with an illustrative embodiment.

Referring to FIG. 13A, a first curve 1300 shows a RMSE as a function of wall clock time while executing model tuning application 222 using $n_b=2$ and bounds updated each iteration for each decision variable with the "Abalone" dataset. A second curve 1302 shows the RMSE as a function of wall clock time while executing the existing model tuning application. A comparison between first curve 1300 and second curve 1302 shows that the RMSE error is much improved immediately due to the binning for the baseline iteration.

Figure 13B:
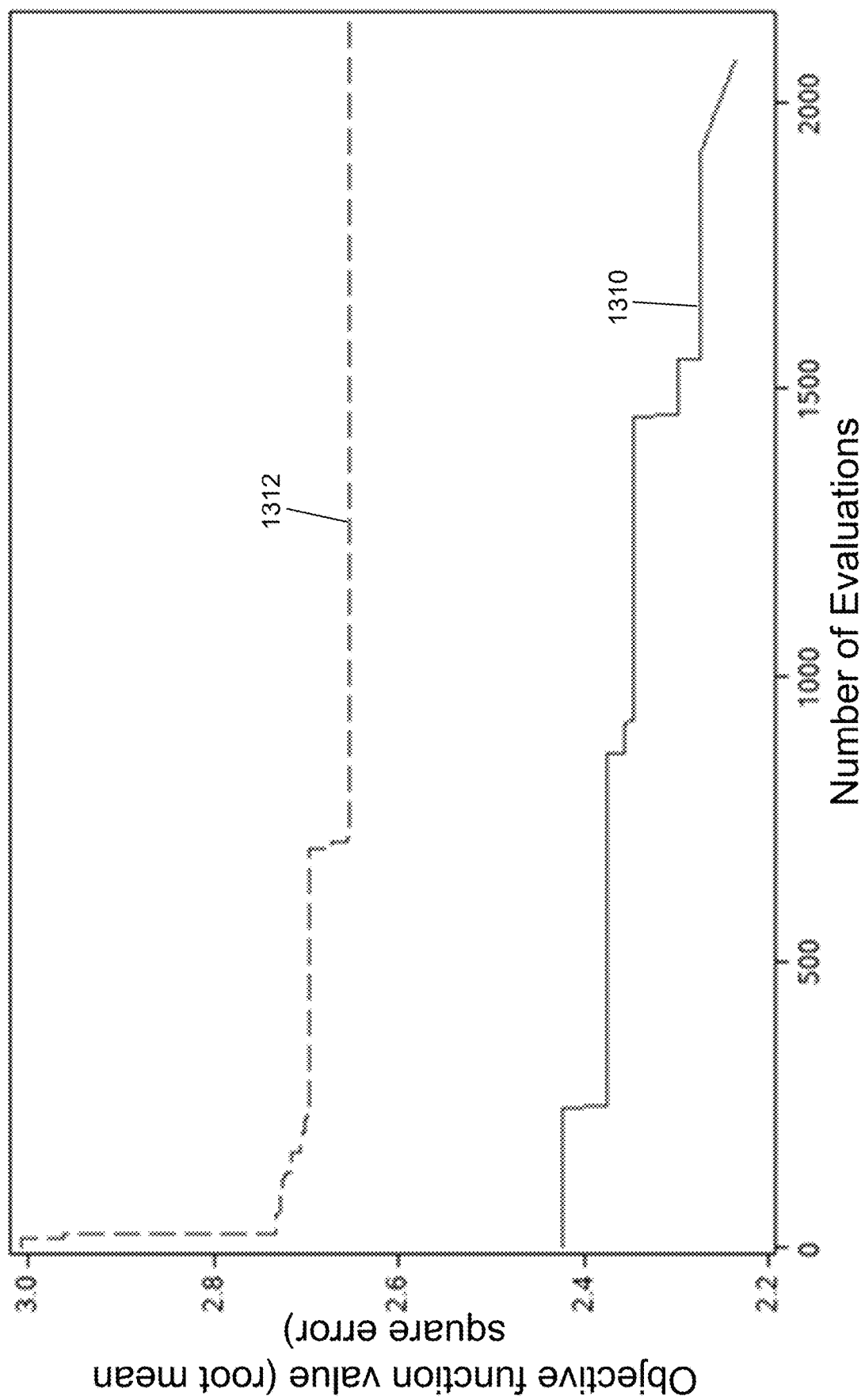
FIG. 13B shows a best objective function value computed for the first dataset as a function of an evaluation number by the decision variable selection system of FIG. 1 with binning in accordance with an illustrative embodiment.

Referring to FIG. 13B, a first curve 1310 shows a RMSE as a function of a number of evaluations while executing model tuning application 222 using $n_b=2$ and bounds updated each iteration for each decision variable with the "Abalone" dataset. A second curve 1312 shows the RMSE as a function of the number of evaluations while executing the existing model tuning application. A comparison between first curve 1310 and second curve 1312 shows that the RMSE error is much improved after the baseline iteration due to the binning for the baseline iteration. The improvement after 2000 evaluations is ~0.4.

To further demonstrate the effectiveness of model tuning application 222 using initial bins and bounds updated each iteration for each decision variable, a second experiment was performed that optimized the hyperparameters of a machine learning model such that the decision variables are the hyperparameters of the Gaussian process model type using the gpReg action set of SAS® Visual Data Mining and Machine Learning. The input data was a "SineWave" dataset, where the data was generated using the equation $y=\sin(6x_1-4x_2)+\text{rand}(\text{"Normal"}, 0,0.01)$, $x_1$ and $x_2$ were random values drawn from a Uniform distribution, and rand("Normal", 0,0.01) is a noise value drawn from a Gaussian distribution with zero mean and standard deviation of 0.01. The "SineWave" dataset includes 1 variable and 1000 observation vectors. The objective function used was RMSE.

Figure 14A:
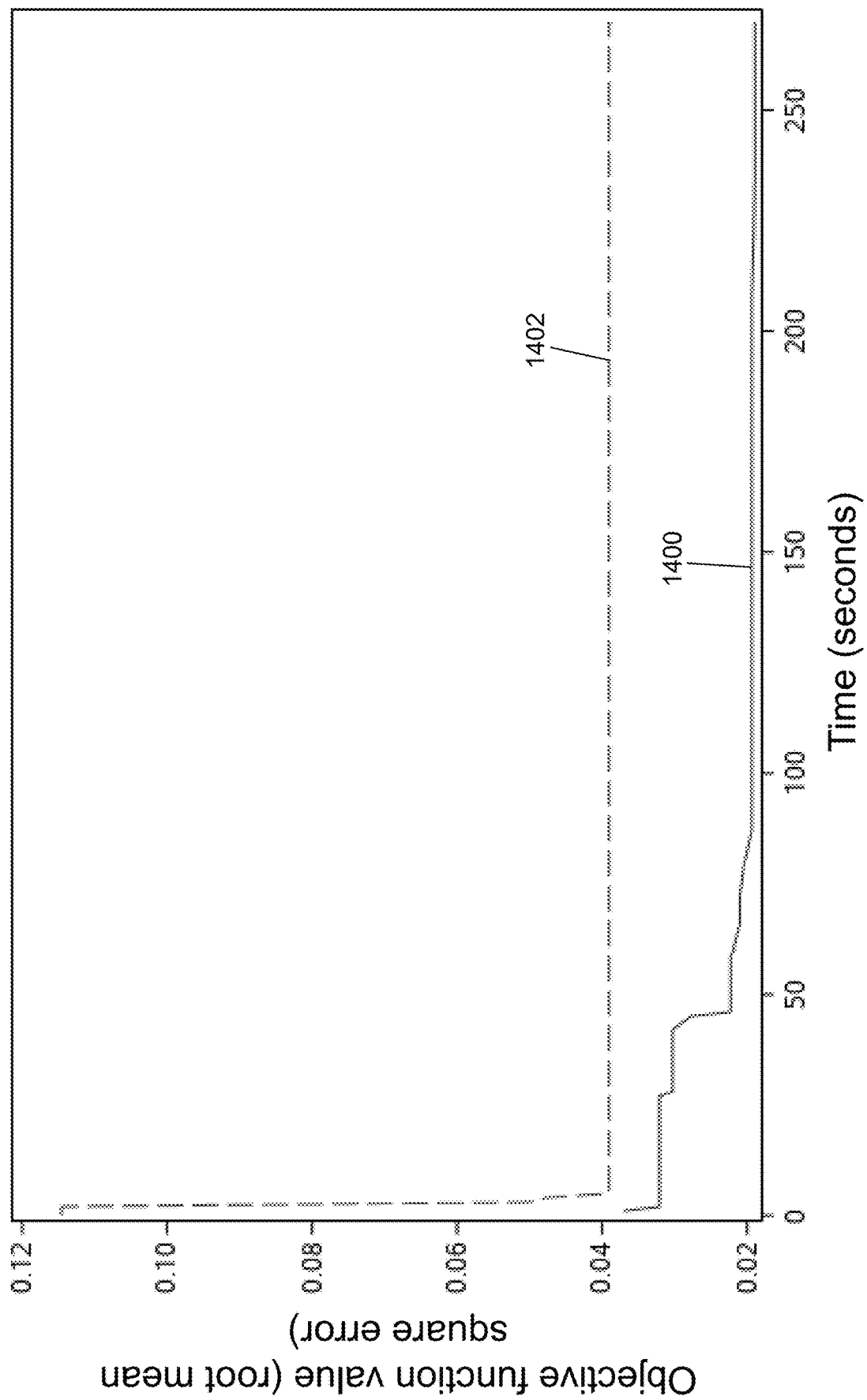
FIG. 14A shows a best objective function value computed for a second dataset as a function of time by the decision variable selection system of FIG. 1 with binning in accordance with an illustrative embodiment.

Referring to FIG. 14A, a first curve 1400 shows a RMSE as a function of wall clock time while executing model tuning application 222 using $n_b=2$ and bounds updated each iteration for each decision variable with the "SineWave" dataset. A second curve 1402 shows the RMSE as a function of wall clock time while executing the existing model tuning application. A comparison between first curve 1400 and second curve 1402 shows that the RMSE error is much improved immediately due to the binning for the baseline iteration.

Figure 14B:
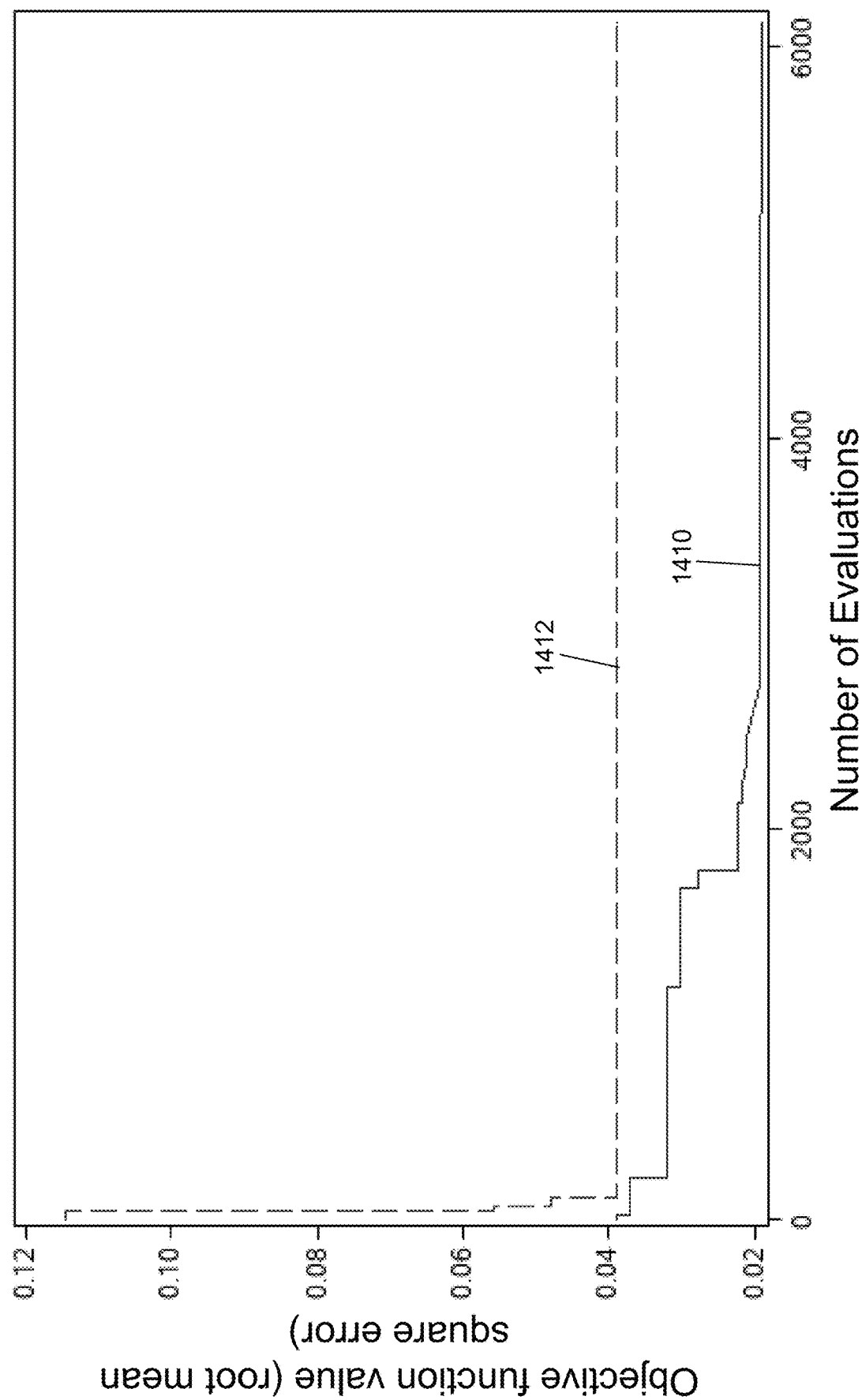
FIG. 14B shows a best objective function value computed for the second dataset as a function of an evaluation number by the decision variable selection system of FIG. 1 with binning in accordance with an illustrative embodiment.

Referring to FIG. 14B, a first curve 1410 shows a RMSE as a function of a number of evaluations while executing model tuning application 222 using $n_b=2$ and bounds updated each iteration for each decision variable with the "SineWave" dataset. A second curve 1412 shows the RMSE as a function of the number of evaluations while executing the existing model tuning application. A comparison between first curve 1410 and second curve 1412 shows that the RMSE error is much improved after the baseline iteration due to the binning for the baseline iteration. The improvement after less than 100 seconds and less than 3000 evaluations is ~0.02.

Figure 15:
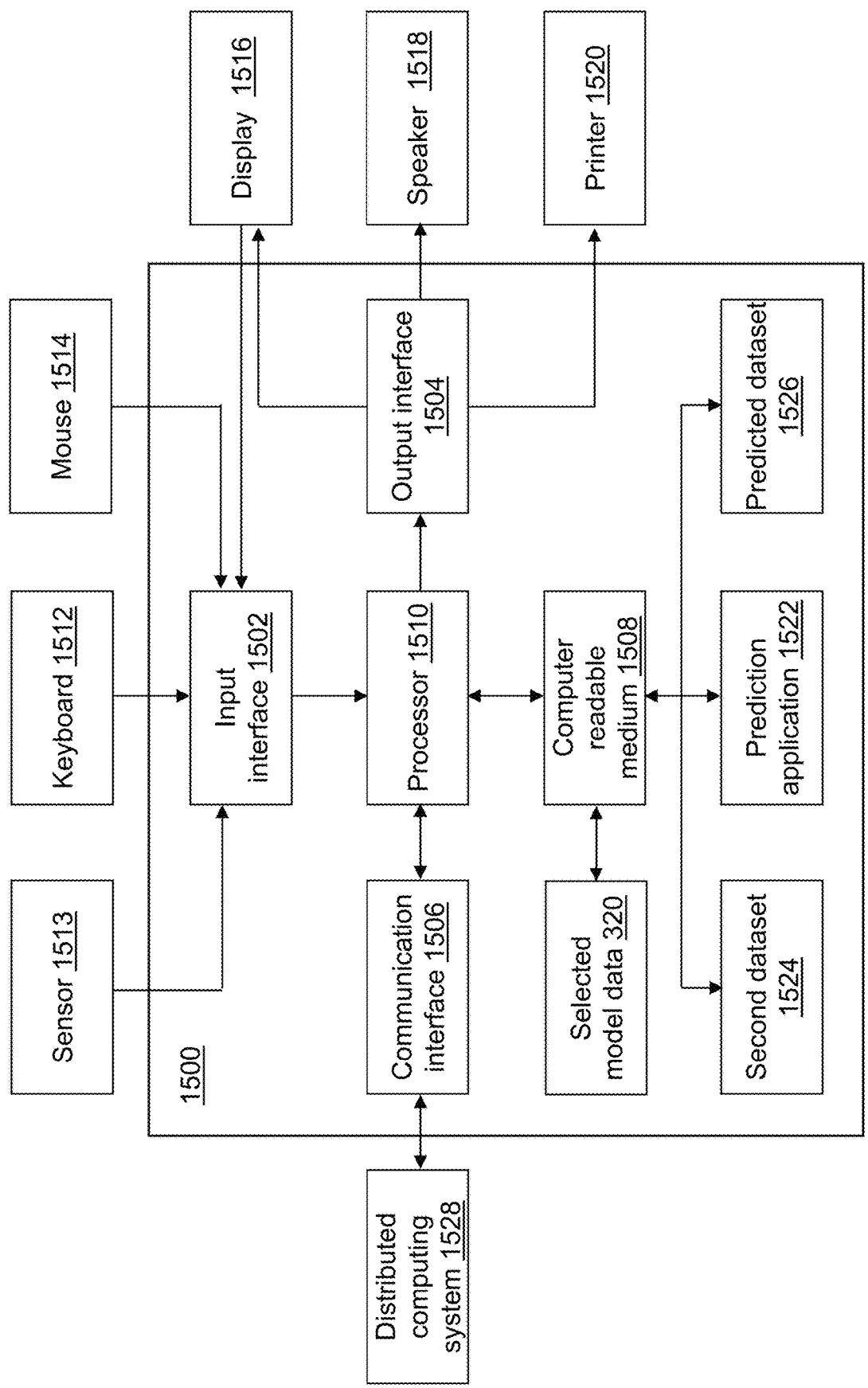
FIG. 15 depicts a block diagram of a prediction device in accordance with an illustrative embodiment.

Referring to FIG. 15, a block diagram of a prediction device 1500 is shown in accordance with an illustrative embodiment. Prediction device 1500 may include a fifth input interface 1502, a fifth output interface 1504, a fifth communication interface 1506, a fifth non-transitory computer-readable medium 1508, a fifth processor 1510, a prediction application 1522, selected model data 320, second dataset 1524, and predicted dataset 1526. Fewer, different, and/or additional components may be incorporated into prediction device 1500. Prediction device 1500 and user device 200 and/or selection manager device 104 may be the same or different devices.

Fifth input interface 1502 provides the same or similar functionality as that described with reference to input interface 202 of user device 200 though referring to prediction device 1500. Fifth output interface 1504 provides the same or similar functionality as that described with reference to output interface 204 of user device 200 though referring to prediction device 1500. Fifth communication interface 1506 provides the same or similar functionality as that described with reference to communication interface 206 of user device 200 though referring to prediction device 1500. Data and messages may be transferred between prediction device 1500 and a distributed computing system 1528 using fifth communication interface 1506. Fifth computer-readable medium 1508 provides the same or similar functionality as that described with reference to computer-readable medium 208 of user device 200 though referring to prediction device 1500. Fifth processor 1510 provides the same or similar functionality as that described with reference to processor 210 of user device 200 though referring to prediction device 1500.

Prediction application 1522 performs operations associated with classifying or predicting a characteristic of data stored in second dataset 1524 and/or identifying outliers in second dataset 1524 to support various data analysis functions as well as provide alert/messaging related to the classified data and/or identified outliers. Dependent on the type of data stored in the input dataset and second dataset 1524, prediction application 1522 may identify anomalies as part of process control, for example, of a manufacturing process, for machine condition monitoring, for example, an electro-cardiogram device, for image classification, for intrusion detection, for fraud detection, etc. Some or all of the operations described herein may be embodied in prediction application 1522. The operations may be implemented using hardware, firmware, software, or any combination of these methods.

Referring to the example embodiment of FIG. 15, prediction application 1522 is implemented in software (comprised of computer-readable and/or computer-executable instructions) stored in fifth computer-readable medium 1508 and accessible by fifth processor 1510 for execution of the instructions that embody the operations of prediction application 1522. Prediction application 1522 may be written using one or more programming languages, assembly languages, scripting languages, etc. Prediction application 1522 may be integrated with other analytic tools. As an example, prediction application 1522 may be part of an integrated data analytics software application and/or software architecture such as that offered by SAS Institute Inc. of Cary, N.C., USA. For example, prediction application 1522 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, prediction application 1522 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of prediction application 1522 further may be performed by an ESPE. Prediction application 1522, model tuning application 222, selection manager application 312, and model manager application 412 may be the same or different applications that are integrated in various manners to select decision variables for and execute a model using the input dataset and/or second dataset 1524 in a single computing device or a plurality of distributed computing devices.

Prediction application 1522 may be implemented as a Web application. Prediction application 1522 may be integrated with other system processing tools to automatically process data generated as part of operation of an enterprise, to classify data in the processed data, to identify any outliers in the processed data, and/or to provide a warning or alert associated with the data classification and/or outlier identification using fifth input interface 1502, fifth output interface 1504, and/or fifth communication interface 1506 so that appropriate action can be initiated in response. For example, a warning or an alert may be presented using a second display 1516, a second speaker 1518, a second printer 1520, etc. or sent to one or more computer-readable media, display, speaker, printer, etc. of distributed computing system 1528.

The input dataset and second dataset 1524 may be generated, stored, and accessed using the same or different mechanisms. Similar to the input dataset, second dataset 1524 may include a plurality of rows and a plurality of columns with the plurality of rows referred to as observations or records, and the columns referred to as variables that are associated with an observation. Second dataset 1524 may be transposed.

Similar to the input dataset, second dataset 1524 may be stored on fifth computer-readable medium 1508 or on one or more computer-readable media of distributed computing system 1528 and accessed by prediction device 1500 using fifth communication interface 1506. Data stored in second dataset 1524 may be a sensor measurement or a data communication value, for example, from a sensor 1513, may be generated or captured in response to occurrence of an event or a transaction, generated by a device such as in response to an interaction by a user with the device, for example, from a second keyboard 1512 or a second mouse 1514, etc. The data stored in second dataset 1524 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 1524 may be captured at different time points periodically, intermittently, when an event occurs, etc. One or more columns may include a time value. Similar to the input dataset, data stored in second dataset 1524 may be generated as part of the IoT, and some or all data may be pre- or post-processed by an ESPE.

Similar to the input dataset, second dataset 1524 may be stored in various compressed formats such as a coordinate format, a compressed sparse column format, a compressed sparse row format, etc. Second dataset 1524 further may be stored using various structures as known to those skilled in the art including a file system, a relational database, a system of tables, a structured query language database, etc. on prediction device 1500 and/or on distributed computing system 1528. Prediction device 1500 and/or distributed computing system 1828 may coordinate access to second dataset 1524 that is distributed across a plurality of computing devices. For example, second dataset 1524 may be stored in a cube distributed across a grid of computers as understood by a person of skill in the art. As another example, second dataset 1524 may be stored in a multi-node Hadoop® cluster. As another example, second dataset 1524 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 1524.

Figure 16:
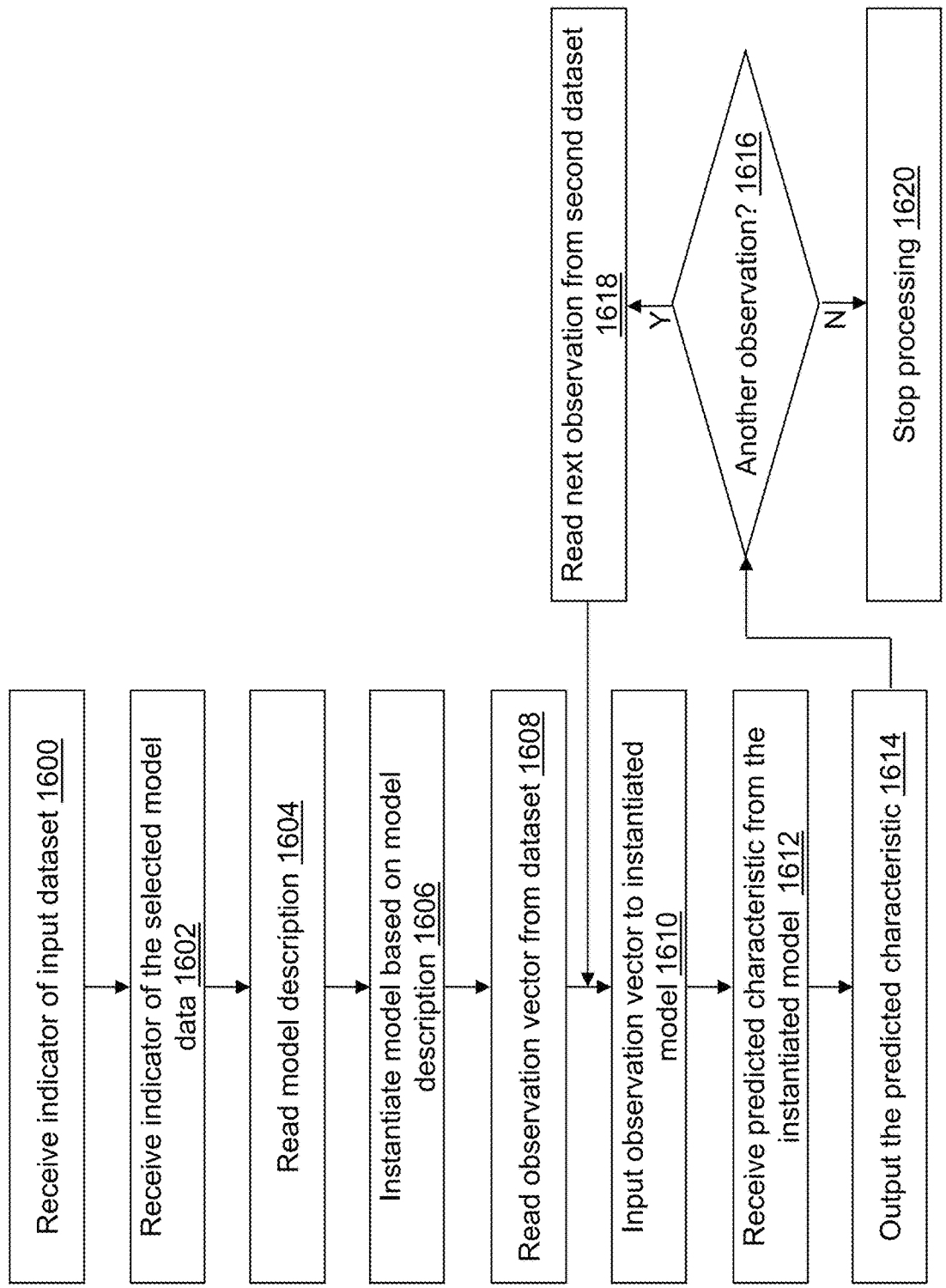
FIG. 16 depicts a flow diagram illustrating examples of operations performed by the prediction device of FIG. 15 in accordance with an illustrative embodiment.

Referring to FIG. 16, example operations of prediction application 1522 are described. Additional, fewer, or different operations may be performed depending on the embodiment of prediction application 1522. The order of presentation of the operations of FIG. 16 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1600, a fourteenth indicator may be received that indicates second dataset 1524. For example, the fourteenth indicator indicates a location and a name of second dataset 1524. As an example, the fourteenth indicator may be received by prediction application 1522 after selection from a user interface window or after entry by a user into a user interface window. In an alternative embodiment, second dataset 1524 may not be selectable. For example, a most recently created dataset may be used automatically. As another example, second dataset 1524 may be provided automatically as part of integration with model tuning application 222, selection manager application 312, and/or model manager application 412.

In an operation 1602, a fifteenth indicator may be received that indicates selected model data 320. For example, the fifteenth indicator indicates a location and a name of selected model data 320. As an example, the fifteenth indicator may be received by prediction application 1522 after selection from a user interface window or after entry by a user into a user interface window. In an alternative embodiment, selected model data 320 may not be selectable. For example, most recently created model data may be used automatically. As another example, selected model data 320 may be provided automatically as part of integration with model tuning application 222, selection manager application 312, and/or model manager application 412.

In an operation 1604, a model description is read from selected model data 320.

In an operation 1606, a model is instantiated with information read from the model description. For example, the type of model, its decision variable values, and other characterizing elements are read and used to instantiate the model. For illustration, the model may be instantiated using the ASTORE procedure provided by SAS® Visual Data Mining and Machine Learning software.

In an operation 1608, an observation vector is read from second dataset 1524.

In an operation 1610, the observation vector is input to the instantiated model.

In an operation 1612, an output of the instantiated model is received. The output may indicate a predicted characteristic of the observation vector.

In an operation 1614, the predicted characteristic may be output, for example, by storing the predicted characteristic with the observation vector to predicted dataset 1526. In addition, or in the alternative, the predicted characteristic may be presented on second display 1516, printed on second printer 1520, a message including the predicted characteristic may be sent to another computing device using fifth communication interface 1506, an alarm or other alert signal may be sounded through second speaker 1518, etc.

In an operation 1616, a determination is made concerning whether second dataset 1524 includes another observation vector. When second dataset 1524 includes another observation vector, processing continues in an operation 1618. When second dataset 1524 does not include another observation vector, processing continues in an operation 1620.

In operation 1618, a next observation vector is read from second dataset 1524, and processing continues in operation 1610.

In operation 1620, processing stops and cleanup is performed as needed.

There are applications for model tuning application 222, selection manager application 312, model manager application 412, and/or prediction application 1522 in many areas such as process control and equipment health monitoring, image processing and classification, data segmentation, data analysis, etc. Model tuning application 222, selection manager application 312, and model manager application 412 automatically tune decision variables of modeling algorithms that include decision tree models, forest models, gradient boosting models, neural network models, support vector machine models, factorization machine models, etc. Given the inherent expense of training numerous candidate models, model tuning application 222, selection manager application 312, model manager application 412, and model worker application 432 provide efficient distributed and parallel computing device implementations for training and tuning models. The presented results demonstrate the improved model accuracies and the improved execution times.

The explosion of digital data is generating many opportunities for big data analytics, which in turn provides many opportunities for tuning models to capitalize on the information contained in the data—to make better predictions that lead to better decisions. Decision variable selection system 100 supports better decision making by providing a system that can identify and evaluate many more decision variable configurations in parallel by allocating the computing devices of worker system 106 in an effective data and model parallel manner.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a first computing device cause the first computing device to:
   access a plurality of tuning evaluation parameters, wherein the plurality of tuning evaluation parameters include a model type, a search method type, and one or more values to evaluate for each decision variable of a plurality of decision variables associated with the model type, wherein a lower boundary value and an upper boundary value is defined for at least one decision variable of the plurality of decision variables;
   (A) determine a plurality of decision variable configurations using a search method of the search method type, wherein a decision variable configuration includes a value for each decision variable of the plurality of decision variables, wherein each decision variable configuration of the plurality of decision variable configurations is unique, wherein the value for the at least one decision variable of the plurality of decision variables is between the lower boundary value and the upper boundary value;
   (B) select a decision variable configuration from the plurality of decision variable configurations;
   (C) train a model of the model type using the selected decision variable configuration and a training dataset;
   (D) score the trained model to compute an objective function value, wherein the trained model is scored using the selected decision variable configuration and a validation dataset;
   (E) store the computed objective function value and the selected decision variable configuration;
   (F) repeat (B) through (E) until each decision variable configuration of the plurality of decision variable configurations is selected in (B);
   (G) update the lower boundary value and the upper boundary value of the at least one decision variable using the objective function value and the decision variable configuration stored for the plurality of decision variable configurations in (E);
   (H) repeat (A) through (F) wherein the lower boundary value and the upper boundary value are those updated in (G);
   identify a best decision variable configuration based on an extreme value of the stored objective function values, wherein the value for the at least one decision variable of the plurality of decision variables is between the updated lower boundary value and the updated upper boundary value; and
   output the identified best decision variable configuration.

2. The non-transitory computer-readable medium of claim 1, wherein the value for the at least one decision variable of the plurality of decision variables is between the lower boundary value and the upper boundary value, inclusive.

3. The non-transitory computer-readable medium of claim 1, wherein after (H) and before identifying the best decision variable configuration, the computer-readable instructions further cause the first computing device to:
   (I) update the updated lower boundary value and the updated upper boundary value of the at least one decision variable using the objective function value and the decision variable configuration stored for the plurality of decision variable configurations in (E) when repeated in (H); and repeat (A) through (F).

4. The non-transitory computer-readable medium of claim 1, wherein, after accessing the plurality of tuning evaluation parameters and before (A), the computer-readable instructions further cause the first computing device to:

define a lower bin boundary value and an upper bin boundary value for each bin of a plurality of bins for the at least one decision variable by dividing a difference between the upper boundary value and the lower boundary value by a number of the plurality of bins;

(I) determine a bin decision variable configuration for each bin using a first search method of a first search method type and the defined lower bin boundary value and the defined upper bin boundary value for a respective bin;

(J) select a first decision variable configuration from the bin decision variable configuration determined for each bin;

(K) train the model of the model type using the selected first decision variable configuration and the training dataset;

(L) score the model trained in (K) to compute the objective function value, wherein the model trained in (K) is scored using the selected first decision variable configuration and the validation dataset;

(M) store the objective function value computed in (L) and the selected first decision variable configuration; and (N) repeat (J) through (M) until the bin decision variable configuration for each bin of the plurality of bins is selected in (J), wherein the lower boundary value and the upper boundary value of the at least one decision variable in (A) is defined using the objective function value and the selected first decision variable configuration stored in (M).

5. The non-transitory computer-readable medium of claim 4, wherein the first search method type is one or more of a grid search method, a random search method, and a Latin hypercube sampling search method.

6. The non-transitory computer-readable medium of claim 5, wherein the search method type is one or more of a grid search method, a random search method, a Latin hypercube sampling search method, a genetic algorithm search method, a genetic set search method, a Bayesian search method, a DIRECT search method, and a Nelder-Mead simplex search method.

7. The non-transitory computer-readable medium of claim 1, wherein the objective function value is a measure of model error of the trained model.

8. The non-transitory computer-readable medium of claim 1, wherein the objective function value is a measure of model accuracy of the trained model.

9. The non-transitory computer-readable medium of claim 1, wherein the model type is selected from the group consisting of a decision tree model type, a factorization machine model type, a forest model type, a gradient boosting tree model type, a neural network model type, a Gaussian process model type, a support vector machine model type, and an optimization model.

10. The non-transitory computer-readable medium of claim 1, wherein the search method type is one or more of a grid search method, a random search method, a Latin hypercube sampling search method, a genetic algorithm search method, a genetic set search method, a Bayesian search method, a DIRECT search method, and a Nelder-Mead simplex search method.

11. The non-transitory computer-readable medium of claim 1, wherein, after identifying the best decision variable configuration, the computer-readable instructions further cause the first computing device to:

train a final model of the model type using the training dataset and the identified best decision variable configuration; and store the trained final model.

12. The non-transitory computer-readable medium of claim 11, wherein, after identifying the best decision variable configuration, the computer-readable instructions further cause the first computing device to:

read an observation vector from a second dataset;

instantiate a prediction model from the trained final model;

compute a predicted characteristic of the read observation vector using the instantiated prediction model; and output the computed predicted characteristic of the read observation vector.

13. The non-transitory computer-readable medium of claim 1, wherein updating the lower boundary value and the upper boundary value comprises:

sorting the plurality of decision variable configurations based on an extreme value of the objective function; and selecting a predefined number of configurations from the sorted plurality of decision variable configurations, wherein the lower boundary value of the at least one decision variable is updated using $$l = \min_{1 \leq j \leq m} z_j,$$

where l is the lower boundary value of the at least one decision variable, m is the predefined number of configurations, and $z_j$ is a $j^{th}$ value for the at least one decision variable in the selected predefined number of configurations, wherein the upper boundary value of the at least one decision variable is updated using $$l = \max_{1 \leq j \leq m} z_j.$$

14. The non-transitory computer-readable medium of claim 13, wherein the objective function value is a measure of model error of the trained model, and the plurality of decision variable configurations are sorted in increasing order.

15. The non-transitory computer-readable medium of claim 13, wherein the objective function value is a measure of model accuracy of the trained model, and the plurality of decision variable configurations are sorted in decreasing order.

16. The non-transitory computer-readable medium of claim 1, wherein updating the lower boundary value and the upper boundary value comprises:

sorting the plurality of decision variable configurations based on an extreme value of the objective function; and selecting a predefined number of configurations from the sorted plurality of decision variable configurations;
computing a mean value using $$\mu = \frac{1}{m}\sum_{j=1}^{m} z_j,$$

where $\mu$ is me mean value, m is the predefined number of configurations, and $z_j$ is a $j^{th}$ value for the at least one decision variable in the selected predefined number of configurations;
computing a standard deviation value using $$\sigma = \sqrt{\frac{1}{m-1}\sum_{j=1}^{m}(z_j - \mu)^2},$$

where $\sigma$ is the standard deviation value;
wherein the lower boundary value of the at least one decision variable is updated using l=min ($l^p$, $\mu+n_o\sigma$), where l is the lower boundary value updated in (G), $l^p$ is the lower boundary value prior to the update in (G), $n_o$ is the number of standard deviations,
wherein the upper boundary value of the at least one decision variable is updated using l=max ($l^p$, $\mu+n_o\sigma$).

17. The non-transitory computer-readable medium of claim 1, wherein, when a decision variable of the plurality of decision variables has a categorical variable type, instead of updating the lower boundary value and the upper boundary value, the computer-readable instructions further cause the first computing device to:
sort the plurality of decision variable configurations based on an extreme value of the objective function;
select a predefined number of configurations from the sorted plurality of decision variable configurations;
count a frequency of occurrence of each unique value of the decision variable included in the selected predefined number of configurations;
sort unique values of the decision variable included in the selected predefined number of configurations based on the frequency of occurrence counted for each unique value; and
select a second predefined number of unique values of the decision variable from the sorted unique values,
wherein the search method of the search method type determines the plurality of decision variable configurations using the selected second predefined number of unique values of the decision variable in a next iteration of (A).

18. The non-transitory computer-readable medium of claim 1, wherein, when a decision variable of the plurality of decision variables has a categorical variable type, instead of updating the lower boundary value and the upper boundary value, the computer-readable instructions further cause the first computing device to:
sort the plurality of decision variable configurations based on an extreme value of the objective function;
select a predefined number of configurations from the sorted plurality of decision variable configurations;
count a frequency of occurrence of each unique value of the decision variable included in the selected predefined number of configurations; and
select unique values of the decision variable from the unique values that have a frequency of occurrence value that is greater than zero,
wherein the search method of the search method type determines the plurality of decision variable configurations using the selected unique values of the decision variable in a next iteration of (A).

19. A computing device comprising:
a processor; and
a computer-readable medium operably coupled to the processor, the computer-readable medium having computer-readable instructions stored thereon that, when executed by the processor, cause the computing device to
access a plurality of tuning evaluation parameters, wherein the plurality of tuning evaluation parameters include a model type, a search method type, and one or more values to evaluate for each decision variable of a plurality of decision variables associated with the model type, wherein a lower boundary value and an upper boundary value is defined for at least one decision variable of the plurality of decision variables;
(A) determine a plurality of decision variable configurations using a search method of the search method type, wherein a decision variable configuration includes a value for each decision variable of the plurality of decision variables, wherein each decision variable configuration of the plurality of decision variable configurations is unique, wherein the value for the at least one decision variable of the plurality of decision variables is between the lower boundary value and the upper boundary value;
(B) select a decision variable configuration from the plurality of decision variable configurations;
(C) train a model of the model type using the selected decision variable configuration and a training dataset;
(D) score the trained model to compute an objective function value, wherein the trained model is scored using the selected decision variable configuration and a validation dataset;
(E) store the computed objective function value and the selected decision variable configuration;
(F) repeat (B) through (E) until each decision variable configuration of the plurality of decision variable configurations is selected in (B);
(G) update the lower boundary value and the upper boundary value of the at least one decision variable using the objective function value and the decision variable configuration stored for the plurality of decision variable configurations in (E);
(H) repeat (A) through (F) wherein the lower boundary value and the upper boundary value are those updated in (G);
identify a best decision variable configuration based on an extreme value of the stored objective function values, wherein the value for the at least one decision variable of the plurality of decision variables is between the updated lower boundary value and the updated upper boundary value; and
output the identified best decision variable configuration.

20. A method of automatically selecting decision variable values based on objective criteria to train a model, the method comprising:

accessing, by a computing device, a plurality of tuning evaluation parameters, wherein the plurality of tuning evaluation parameters include a model type, a search method type, and one or more values to evaluate for each decision variable of a plurality of decision variables associated with the model type, wherein a lower boundary value and an upper boundary value is defined for at least one decision variable of the plurality of decision variables;

(A) determining, by the computing device, a plurality of decision variable configurations using a search method of the search method type, wherein a decision variable configuration includes a value for each decision variable of the plurality of decision variables, wherein each decision variable configuration of the plurality of decision variable configurations is unique, wherein the value for the at least one decision variable of the plurality of decision variables is between the lower boundary value and the upper boundary value;

(B) selecting, by the computing device, a decision variable configuration from the plurality of decision variable configurations;

(C) training, by the computing device, a model of the model type using the selected decision variable configuration and a training dataset;

(D) scoring, by the computing device, the trained model to compute an objective function value, wherein the trained model is scored using the selected decision variable configuration and a validation dataset;

(E) storing, by the computing device, the computed objective function value and the selected decision variable configuration;

(F) repeating, by the computing device, (B) through (E) until each decision variable configuration of the plurality of decision variable configurations is selected in (B);

(G) updating, by the computing device, the lower boundary value and the upper boundary value of the at least one decision variable using the objective function value and the decision variable configuration stored for the plurality of decision variable configurations in (E);

(H) repeating, by the computing device, (A) through (F) wherein the lower boundary value and the upper boundary value are those updated in (G);

identifying, by the computing device, a best decision variable configuration based on an extreme value of the stored objective function values, wherein the value for the at least one decision variable of the plurality of decision variables is between the updated lower boundary value and the updated upper boundary value; and outputting, by the computing device, the identified best decision variable configuration.

21. The method of claim 20, further comprising, after (H) and before identifying the best decision variable configuration:

(I) updating, by the computing device, the updated lower boundary value and the updated upper boundary value of the at least one decision variable using the objective function value and the decision variable configuration stored for the plurality of decision variable configurations in (E) when repeated in (H); and repeating, by the computing device, (A) through (F).

22. The method of claim 20, further comprising, after accessing the plurality of tuning evaluation parameters and before (A):

defining, by the computing device, a lower bin boundary value and an upper bin boundary value for each bin of a plurality of bins for the at least one decision variable by dividing a difference between the upper boundary value and the lower boundary value by a number of the plurality of bins;

(I) determining, by the computing device, a bin decision variable configuration for each bin using a first search method of a first search method type and the defined lower bin boundary value and the defined upper bin boundary value for a respective bin;

(J) selecting, by the computing device, a first decision variable configuration from the bin decision variable configuration determined for each bin;

(K) training, by the computing device, the model of the model type using the selected first decision variable configuration and the training dataset;

(L) scoring, by the computing device, the model trained in (K) to compute the objective function value, wherein the model trained in (K) is scored using the selected first decision variable configuration and the validation dataset;

(M) storing, by the computing device, the objective function value computed in (L) and the selected first decision variable configuration; and (N) repeating, by the computing device, (J) through (M) until the bin decision variable configuration for each bin of the plurality of bins is selected in (J), wherein the lower boundary value and the upper boundary value of the at least one decision variable in (A) is defined using the objective function value and the selected first decision variable configuration stored in (M).

23. The method of claim 22, wherein the first search method type is one or more of a grid search method, a random search method, and a Latin hypercube sampling search method.

24. The method of claim 23, wherein the search method type is one or more of a grid search method, a random search method, a Latin hypercube sampling search method, a genetic algorithm search method, a genetic set search method, a Bayesian search method, a DIRECT search method, and a Nelder-Mead simplex search method.

25. The method of claim 20, wherein updating the lower boundary value and the upper boundary value comprises:

sorting the plurality of decision variable configurations based on an extreme value of the objective function; and selecting a predefined number of configurations from the sorted plurality of decision variable configurations;

wherein the lower boundary value of the at least one decision variable is updated using $$l = \min_{1 \leq j \leq m} z_j,$$

where l is the lower boundary value of the at least one decision variable, m is the predefined number of configurations, and $z_j$ is a $j^{th}$ value for the at least one decision variable in the selected predefined number of configurations, wherein the upper boundary value of the at least one decision variable is updated using $$l = \max_{1 \leq j \leq m} z_j.$$

26. The method of claim 25, wherein the objective function value is a measure of model error of the trained model, and the plurality of decision variable configurations are sorted in increasing order.

27. The method of claim 25, wherein the objective function value is a measure of model accuracy of the trained model, and the plurality of decision variable configurations are sorted in decreasing order.

28. The method of claim 20, wherein updating the lower boundary value and the upper boundary value comprises:
sorting the plurality of decision variable configurations based on an extreme value of the objective function; and
selecting a predefined number of configurations from the sorted plurality of decision variable configurations;
computing a mean value using $$\mu = \frac{1}{m}\sum_{j=1}^{m} z_j,$$

where $\mu$ is the mean value, m is the predefined number of configurations, and $z_j$ is a $j^{th}$ value for the at least one decision variable in the selected predefined number of configurations;
computing a standard deviation value using $$\sigma = \sqrt{\frac{1}{m-1}\sum_{j=1}^{m}(z_j-\mu)^2},$$

where $\sigma$ is the standard deviation value;
wherein the lower boundary value of the at least one decision variable is updated using l=min ($l^p$, $\mu-n_\sigma\sigma$), where l is the lower boundary value updated in (G), $l^p$ is the lower boundary value prior to the update in (G), $n_\sigma$ is the number of standard deviations,
wherein the upper boundary value of the at least one decision variable is updated using l=max ($l^p$, $\mu+n_\sigma\sigma$).

29. The method of claim 20, wherein, when a decision variable of the plurality of decision variables has a categorical variable type, instead of updating the lower boundary value and the upper boundary value:
sorting, by the computing device, the plurality of decision variable configurations based on an extreme value of the objective function;
selecting, by the computing device, a predefined number of configurations from the sorted plurality of decision variable configurations;
counting, by the computing device, a frequency of occurrence of each unique value of the decision variable included in the selected predefined number of configurations;
sorting, by the computing device, unique values of the decision variable included in the selected predefined number of configurations based on the frequency of occurrence counted for each unique value; and
selecting, by the computing device, a second predefined number of unique values of the decision variable from the sorted unique values,
wherein the search method of the search method type determines the plurality of decision variable configurations using the selected second predefined number of unique values of the decision variable in a next iteration of (A).

30. The method of claim 20, wherein, when a decision variable of the plurality of decision variables has a categorical variable type, instead of updating the lower boundary value and the upper boundary value:
sorting, by the computing device, the plurality of decision variable configurations based on an extreme value of the objective function;
selecting, by the computing device, a predefined number of configurations from the sorted plurality of decision variable configurations;
counting, by the computing device, a frequency of occurrence of each unique value of the decision variable included in the selected predefined number of configurations; and
selecting, by the computing device, unique values of the decision variable from the unique values that have a frequency of occurrence value that is greater than zero,
wherein the search method of the search method type determines the plurality of decision variable configurations using the selected unique values of the decision variable in a next iteration of (A).

* * * * *

UNITED STATES PATENT AND TRADEMARK OFFICE
CERTIFICATE OF CORRECTION

| | | |
|---|---|---|
| PATENT NO. | : 10,963,802 B1 | Page 1 of 3 |
| APPLICATION NO. | : 17/120340 | |
| DATED | : March 30, 2021 | |
| INVENTOR(S) | : Steven Joseph Gardner et al. | |

It is certified that error appears in the above-identified patent and that said Letters Patent is hereby corrected as shown below:

In the Specification

Column 5, Lines 28-29:
Delete the phrase "indicated by N." and replace with --indicated by $N_s$.--.

Column 22, Lines 16-17:
Delete the phrase "minimize $f(x_1, x_2) = 100(x_2 - x_1{}^2)^2 + (1 - x_1)^{2}$" and replace with --minimize $f(x_1, x_2) = 100(x_2 - x_1^2)^2 + (1 - x_1)^2$--.

Column 22, Line 39:
Delete the phrase "categorical values n," and replace with --categorical values $n_c$--.

Column 32, Line 58:
Delete the phrase "the value of N." and replace with --the value of $N_s$.--.

Column 38, Line 58:
Delete the phrase "$Z_j{}^k, j = 1, \ldots, n_k$" and replace with --$Z_j^k, j = 1, \ldots, n_k$--.

Column 38, Lines 59-60:
Delete the phrase "$Z_j^k = z_{j,i}{}^k, i = 1, \ldots, n_{dv}, j = 1, \ldots, n_k, z_{j,i}{}^k$" and replace with --$Z_j^k = z_{j,i}^k, i = 1, \ldots, n_{dv}, j = 1, \ldots, n_k, z_{j,i}^k$--.

Column 38, Line 62:
Delete the phrase "$f(Z_j{}^k), j = 1, \ldots, n_k$" and replace with --$f(Z_j^k), j = 1, \ldots, n_k$--.

Column 38, Line 66:
Delete the phrase "$f(Z_j{}^k)$" and replace with --$f(Z_j^k)$--.

Signed and Sealed this
Tenth Day of August, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)

Column 38, Lines 66-67:
Delete the phrase "$f(Z_j{}^k), j = 1, \ldots, n_k$" and replace with --$f(Z_j^k), j = 1, \ldots, n_k$--.

Column 39, Line 2:
Delete the phrase "$f(Z_j{}^k)$" and replace with --$f(Z_j^k)$--.

Column 39, Line 3:
Delete the phrase "$f(Z_j{}^k), j = 1, \ldots, n_k$" and replace with --$f(Z_j^k), j = 1, \ldots, n_k$--.

Column 39, Line 8:
Delete the phrase "$Z_j{}^k, j = 1, \ldots, m$" and replace with --$Z_j^k, j = 1, \ldots, m$--.

Column 39, Lines 21-22:
Delete the phrase "$(u_i{}^k - l_i{}^k) < c$, where $u_i{}^k$" and replace with --$(u_i^k - l_i^k) < c$, where $u_i^k$--.

Column 39, Line 23:
Delete the phrase "iteration $k$, $l_i{}^k$" and replace with --iteration $k$, $l_i^k$--.

Column 40, Line 3:
Delete the phrase "$l_i{}^{k+1} = \min(l_i{}^k, \mu - n_\sigma \sigma)$," and replace with --$l_i^{k+1} = \min(l_i^k, \mu - n_\sigma \sigma),$--.

Column 40, Line 8:
Delete the phrase "$u_i{}^{k+1} = \min(u_i{}^k, \mu + n_\sigma \sigma)$," and replace with --$u_i^{k+1} = \min(u_i^k, \mu + n_\sigma \sigma),$--.

Column 40, Line 11:
Delete the phrase "$z_{j,i}{}^k, j = 1, \ldots, m$" and replace with --$z_{j,i}^k, j = 1, \ldots, m$--.

Column 40, Lines 12-13:
Delete the phrase "$z_i{}^k$ may be $z_i{}^k \in \{a, b, c, d, e, f, g\}$." and replace with --$z_i^k$ may be $z_i^k \in \{a, b, c, d, e, f, g\}$--.

Column 40, Line 24:
Delete the phrase "$z_i{}^k$" and replace with --$z_i^k$--.

Column 40, Line 28:
Delete the phrase "$z_i{}^k$" and replace with --$z_i^k$--.

Column 40, Line 30:
Delete the phrase "$z_i{}^{k+1} \in \{c, d, a\}$." and replace with --$z_i^{k+1} \in \{c, d, a\}$--.

Column 40, Line 31:

Delete the phrase "$z_i{}^{k+1} \in \{c, d, a, f, b\}$." and replace with -- $z_i^{k+1} \in \{c, d, a, f, b\}.$ --.

In the Claims

Claim 16, Column 51, Line 10:

Delete the phrase "where $\mu$ is me mean value," and replace with --where $\mu$ is the mean value,--.